(12) United States Patent
Ishizaki

(10) Patent No.: US 9,531,992 B2
(45) Date of Patent: Dec. 27, 2016

(54) DISPLAY APPARATUS, PORTABLE TERMINAL, TELEVISION RECEIVER, DISPLAY METHOD, PROGRAM, AND RECORDING MEDIUM

(71) Applicant: SHARP KABUSHIKI KAISHA, Osaka-shi, Osaka (JP)

(72) Inventor: Kenji Ishizaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/762,006

(22) PCT Filed: Mar. 19, 2014

(86) PCT No.: PCT/JP2014/057574
§ 371 (c)(1),
(2) Date: Jul. 20, 2015

(87) PCT Pub. No.: WO2014/156896
PCT Pub. Date: Oct. 2, 2014

(65) Prior Publication Data
US 2015/0365625 A1    Dec. 17, 2015

(30) Foreign Application Priority Data

Mar. 26, 2013 (JP) .................. 2013-065205
Mar. 26, 2013 (JP) .................. 2013-065208
(Continued)

(51) Int. Cl.
*H04N 9/74* (2006.01)
*H04N 7/01* (2006.01)
(Continued)

(52) U.S. Cl.
CPC .............. *H04N 7/0122* (2013.01); *G06F 3/14* (2013.01); *G06F 3/1423* (2013.01); *G09G 3/36* (2013.01);
(Continued)

(58) Field of Classification Search
USPC ....... 348/581, 566, 565, 563, 561, 556, 555, 348/530, 529, 628, 838, 398.1, 376, 158, 140,348/14.01; 345/169, 629, 698; 386/241
See application file for complete search history.

(56) References Cited

U.S. PATENT DOCUMENTS 5,382,972 A  *  1/1995  Kannes ................... H04N 5/445
                                                        348/14.01
5,467,144 A  *  11/1995  Saeger ................. H04N 7/0122
                                                         348/566
(Continued)

FOREIGN PATENT DOCUMENTS

JP       64-13686 A      1/1989
JP       7-184045 A      7/1995
(Continued)

OTHER PUBLICATIONS

"OCR Technology Explanation 2", Webpage of Media Drive Corporation, http://mediadrive.jp/technology/techocr06.html.
(Continued)

*Primary Examiner* — Jefferey Harold
*Assistant Examiner* — Mustafizur Rahman
(74) *Attorney, Agent, or Firm* — Birch, Stewart, Kolasch & Birch, LLP

(57) ABSTRACT

A television (10) in accordance with an aspect of the present invention includes a display size calculating unit (135) and a video processing circuit (107) in order to adjust a display size of a main image and a display size of a sub-image so
(Continued)

that the main image and the sub-image are displayed in different regions on an LCD (110). The display size calculating unit (135) adjusts, based on aspect ratios of the main image and the sub-image, a location at which the main image is displayed on the LCD (110) and a location at which the sub-image is displayed on the LCD (110).

20 Claims, 39 Drawing Sheets

(30) Foreign Application Priority Data

Mar. 26, 2013 (JP) .................................. 2013-065209
Mar. 26, 2013 (JP) .................................. 2013-065210

(51) Int. Cl.
| | |
|---|---|
| *H04N 21/431* | (2011.01) |
| *G06F 3/14* | (2006.01) |
| *G09G 3/36* | (2006.01) |
| *G09G 5/14* | (2006.01) |
| *G09G 5/36* | (2006.01) |
| *G09G 5/391* | (2006.01) |
| *H04N 5/66* | (2006.01) |
| *H04N 5/765* | (2006.01) |
| *H04N 5/775* | (2006.01) |
| *G09G 5/22* | (2006.01) |

(52) U.S. Cl.
CPC .............. *G09G 5/14* (2013.01); *G09G 5/227* (2013.01); *G09G 5/363* (2013.01); *G09G 5/391* (2013.01); *H04N 5/66* (2013.01); *H04N 5/765* (2013.01); *H04N 5/775* (2013.01); *H04N 21/4312* (2013.01); *H04N 21/4318* (2013.01); *G09G 2320/06* (2013.01); *G09G 2320/0613* (2013.01); *G09G 2340/02* (2013.01); *G09G 2340/0407* (2013.01); *G09G 2340/0442* (2013.01); *G09G 2340/12* (2013.01); *G09G 2340/14* (2013.01); *G09G 2354/00* (2013.01)

(56) References Cited

U.S. PATENT DOCUMENTS

| | | | |
|---|---|---|---|
| 6,081,831 A | 6/2000 | Miura | |
| 6,310,656 B1* | 10/2001 | Miyazaki | H04N 5/45 348/565 |
| 6,563,547 B1* | 5/2003 | Smith | H04N 5/44543 348/563 |
| 2002/0063800 A1* | 5/2002 | Cho | H04N 5/45 348/565 |
| 2003/0043303 A1* | 3/2003 | Karuta | G02B 27/0025 348/744 |
| 2003/0194207 A1* | 10/2003 | Chung | G06F 17/30056 386/241 |
| 2006/0150230 A1* | 7/2006 | Chung | H04N 5/4401 725/118 |
| 2007/0008338 A1* | 1/2007 | Kim | G09G 5/003 345/629 |
| 2007/0139400 A1* | 6/2007 | Neuman | H04N 7/0122 345/204 |
| 2009/0162036 A1* | 6/2009 | Fujii | H04N 5/85 386/244 |
| 2009/0238491 A1 | 9/2009 | Mizutani | |
| 2010/0026722 A1* | 2/2010 | Kondo | G09G 3/2007 345/660 |
| 2010/0150462 A1* | 6/2010 | Okada | H04N 19/503 382/236 |
| 2011/0187925 A1* | 8/2011 | Onoda | H04N 7/00 348/468 |
| 2011/0200092 A1* | 8/2011 | Todoroki | H04N 21/4884 375/240.01 |
| 2011/0298980 A1* | 12/2011 | Adhikari | H04N 21/44218 348/561 |
| 2012/0212518 A1* | 8/2012 | Ohnishi | G06F 3/147 345/690 |
| 2013/0120461 A1* | 5/2013 | Takahashi | G06T 5/004 345/660 |
| 2014/0146358 A1* | 5/2014 | Morita | H04N 1/00352 358/1.15 |
| 2014/0333833 A1* | 11/2014 | Mountain | H04N 5/44513 348/468 |

FOREIGN PATENT DOCUMENTS

| | | |
|---|---|---|
| JP | 10-31666 A | 2/1998 |
| JP | 2000-259142 A | 9/2000 |
| JP | 2001-94900 A | 4/2001 |
| JP | 2002-14664 A | 1/2002 |
| JP | 2009-259223 A | 11/2009 |

OTHER PUBLICATIONS

International Search Report, issued in PCT/JP2014/057574, dated Jun. 26, 2014.
Written Opinion of the International Searching Authority, issued in PCT/JP2014/057574, dated Jun. 26, 2014.

\* cited by examiner

F I G. 5
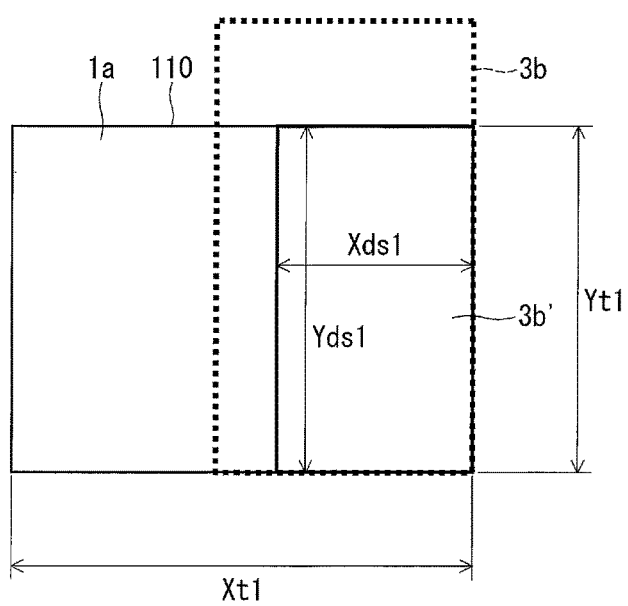

F I G. 6
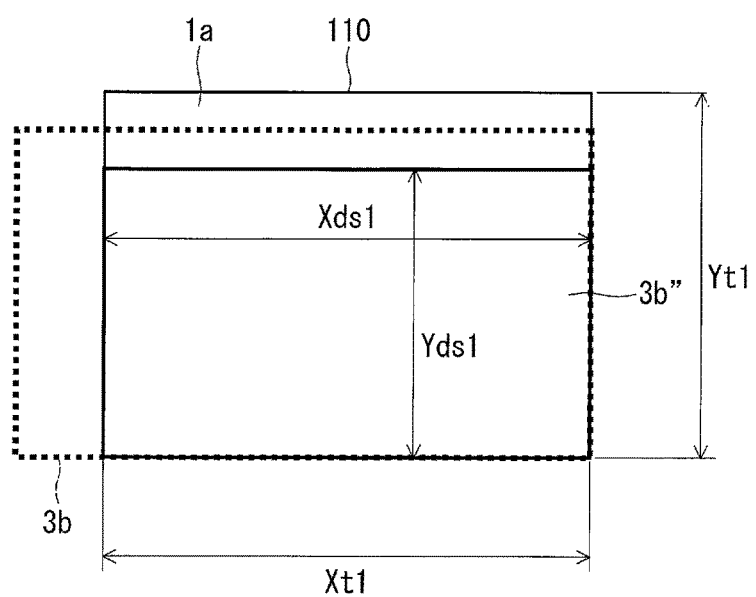

F I G. 9
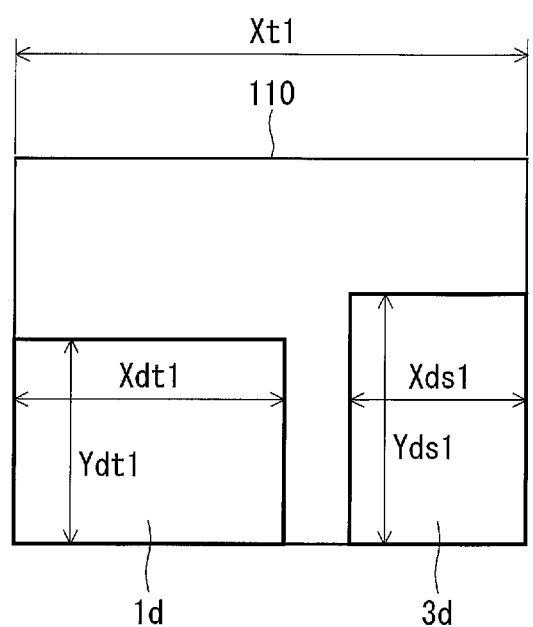

F I G. 1 0
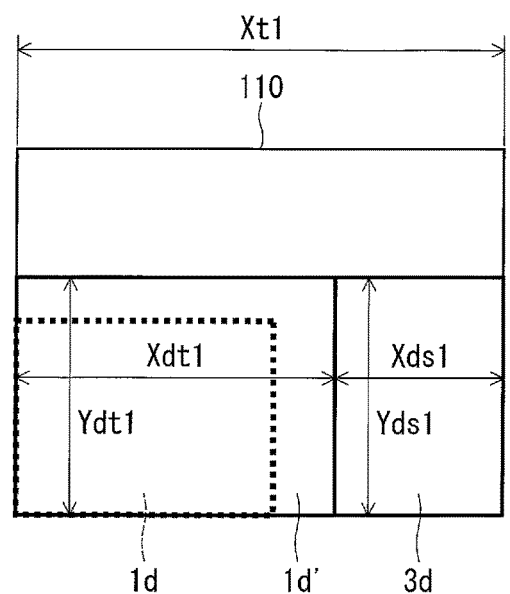

F I G. 1 1
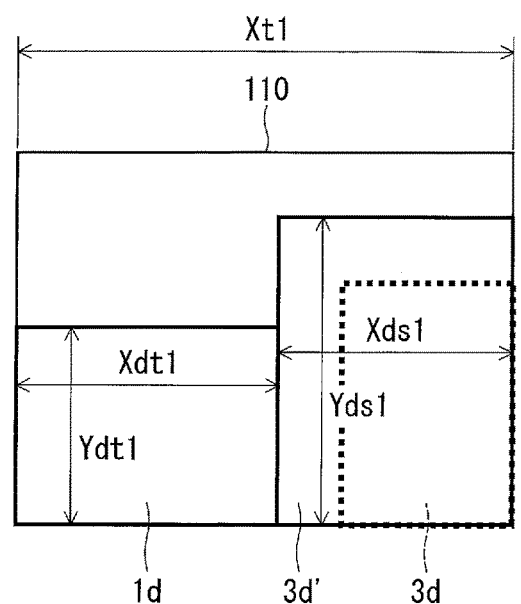

F I G. 1 2
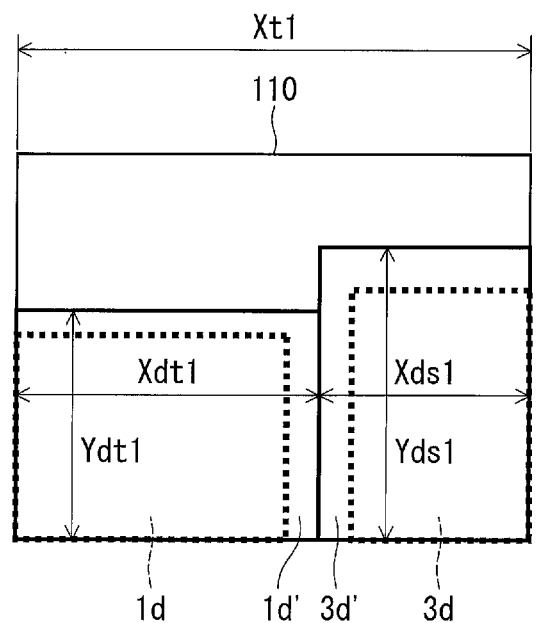

F I G. 1 4
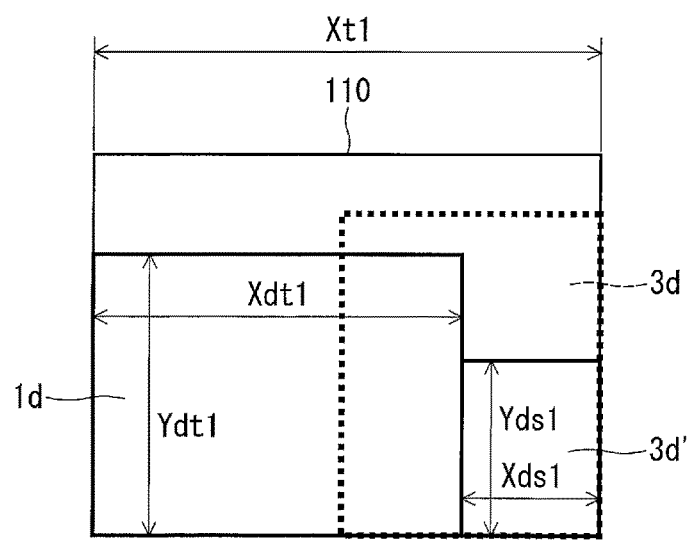

F I G. 1 5
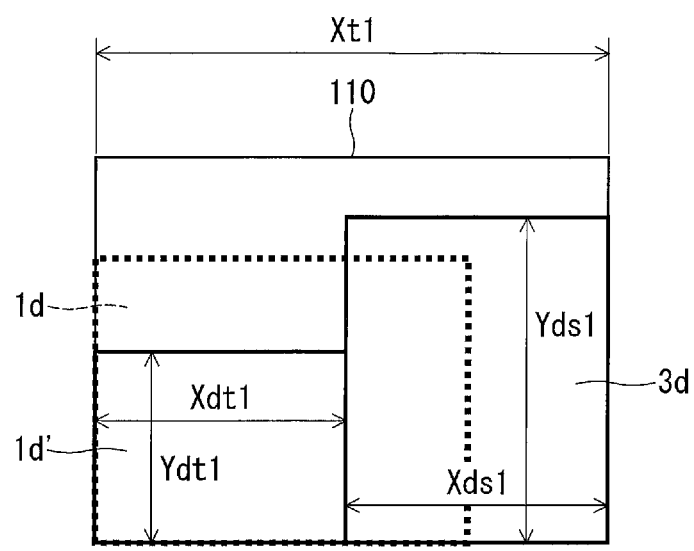

F I G. 1 6
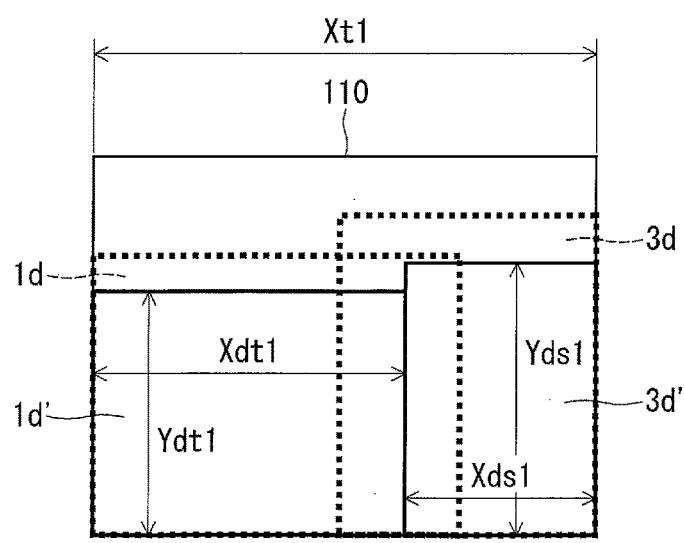

F I G. 2 2
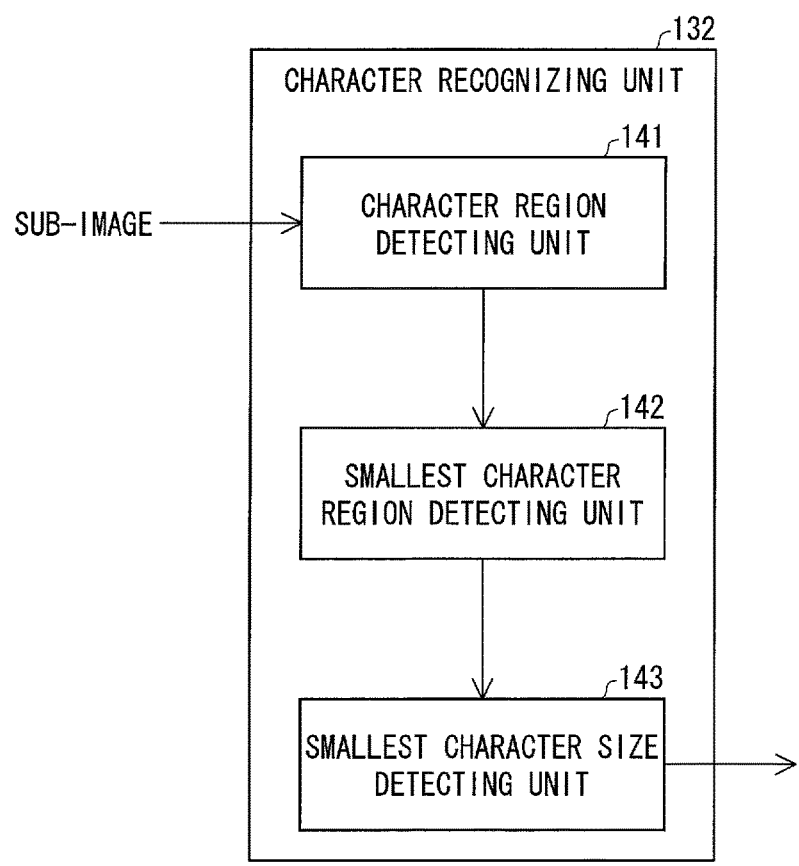

F I G. 2 9

| SIZE RATIO DATA (8bit) | SMALLEST CHARACTER SIZE RATIO (Xs2/Xs1) | SMALLEST CHARACTER SIZE RATIO (Ys2/Ys1) |
|---|---|---|
| 00000000 | 0 (CASE WHERE SUB-IMAGE DOES NOT INCLUDE CHARACTER) | 0 (CASE WHERE SUB-IMAGE DOES NOT INCLUDE CHARACTER) |
| 00000001 | 1/300 | 1/300 |
| 00000010 | 1/280 | 1/280 |
| . . . | . . . | . . . |
| 00000110 | 1/200 | 1/200 |
| . . . | . . . | . . . |
| 00010000 | 1/100 | 1/100 |
| . . . | . . . | . . . |
| 00101000 | 1/45 | 1/45 |
| . . . | . . . | . . . |
| 01000001 | 1/30 | 1/30 |
| . . . | . . . | . . . |
| 01110011 | 1/20 | 1/20 |
| . . . | . . . | . . . |
| 11111111 | 1 | 1 |

F I G. 3 0

| SMALLEST CHARACTER SIZE RATIO CHANGE FLAG (1bit) | MEANING OF FLAG |
|---|---|
| 0 | SMALLEST CHARACTER SIZE RATIO IS NOT CHANGED FROM IMMEDIATELY PREVIOUS FRAME |
| 1 | SMALLEST CHARACTER SIZE RATIO IS CHANGED FROM IMMEDIATELY PREVIOUS FRAME |

F I G. 3 6
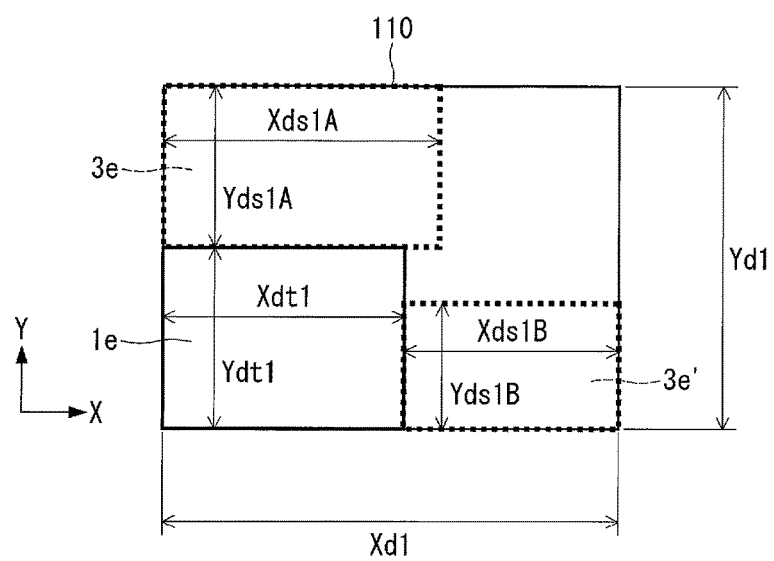

F I G. 3 9
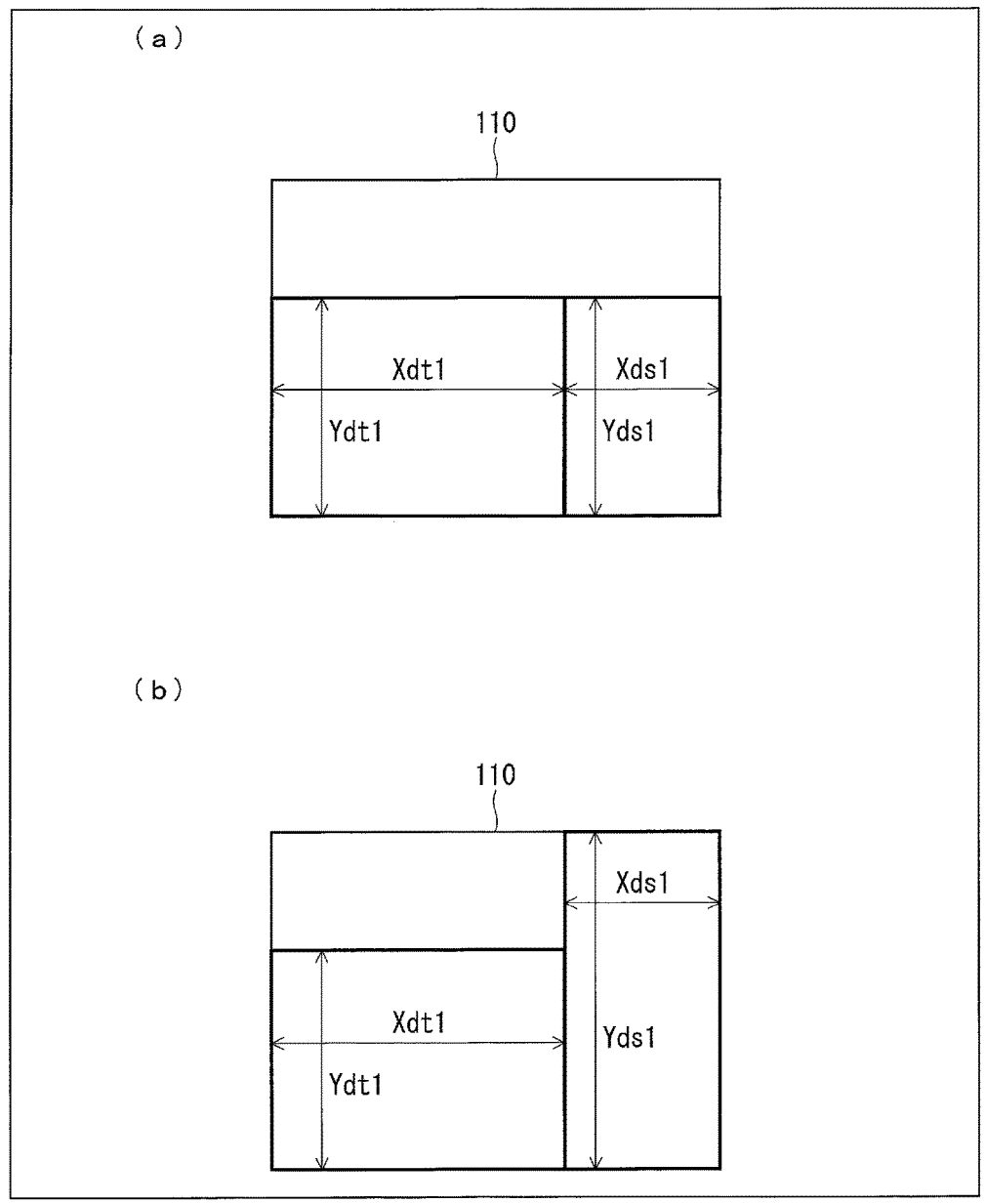

DISPLAY APPARATUS, PORTABLE TERMINAL, TELEVISION RECEIVER, DISPLAY METHOD, PROGRAM, AND RECORDING MEDIUM

TECHNICAL FIELD

The present invention relates to a display apparatus, a portable terminal, a television receiver including the display apparatus, and a display method of the display apparatus. Moreover, the present invention relates to (i) a program of the display method and (ii) a recording medium.

BACKGROUND ART

In recent years, in accordance with growing diversity of a method for using a television receiver (television), a using method has been newly proposed in which, for example, an image (portable image) which is displayed on a portable terminal such as a smart phone is displayed on a large display of a television.

Here, a user of the portable terminal usually uses the portable terminal at a close range of the user, e.g., the user operates the portable terminal while holding the portable terminal in the hand. Therefore, on the portable terminal, characters are displayed in a size in which the characters can be read by the user at the close range. Meanwhile, a user of a television usually views the television at a position which is apart from the television to some extent.

Under the circumstances, in a case where a portable image is displayed on a display of the television in a size that is identical with a size in which the portable image is displayed on the portable terminal, it is difficult for the user to read characters included in the portable image displayed on the display.

Patent Literature 1 discloses an image processing device which determines a target image size when a size of an original image changes with the use of (i) a ratio between a standard character size and a character size relating to character data included in original image data and (ii) an image size of the original image data, in order to display the original image in an image formation region (displaying unit).

Note that Non-patent Literature 1 discloses, as a method for detecting characters included in an image, a method in which (i) a character region is first extracted from the image, (ii) then the character region including a plurality of rows or columns is divided for each of the plurality of rows or columns, and (iii) then characters included in a character region thus divided for each of the plurality of rows or columns are detected.

CITATION LIST

Patent Literature

[Patent Literature 1]
Japanese Patent Application Publication Tokukai No. 2009-259223 (Publication date: Nov. 5, 2009)

Non-Patent Literature

[Non-Patent Literature 1]
"Explanation of OCR technique 2", [online], Media Drive Corporation, [searched on Feb. 26, 2013], Internet <URL: http://mediadrive.jp/technology/techocr06.html>

SUMMARY OF INVENTION

Technical Problem

Here, when a portable image is to be displayed on a display of a television, it sometimes happens that a content such as a television program is being displayed on the display and the user wants to have the content be displayed together with the portable image. However, in a case where the content is displayed together with the portable image, a part of the content may not be displayed because the portable image overlaps with the content. Under the circumstances, in order to prevent the portable image from being displayed while overlapping with the content, a configuration has been conceived in which (i) a display size of the content is reduced and (ii) the content thus scaled down and the portable image are displayed in respective different regions on the display.

However, in such a case where the portable image and the content are merely displayed in respective different regions on the display of the television, there is a problem that at least any of the portable image and the content cannot be displayed in an optimal display size.

The present invention is accomplished in view of the problem, and its main object is to provide a display apparatus that can display a content and an input image, which has been externally inputted, in respective optimal display sizes.

Solution to Problem

In order to attain the object, a display apparatus in accordance with an aspect of the present invention includes: a display section for causing a content and an input image to be displayed in respective different regions of a displaying unit, the input image being inputted from an external apparatus; and an adjusting section for adjusting a display size of the content and a display size of the input image so that the content and the input image are displayed in the respective different regions of the displaying unit, the adjusting section adjusting, based on an aspect ratio of the content and an aspect ratio of the input image, (i) a location at which the content is displayed on the displaying unit and (ii) a location at which the input image is displayed on the displaying unit.

Moreover, a display method of a display apparatus in accordance with another aspect of the present invention includes the steps of: (a) displaying a content and an input image in respective different regions of a displaying unit, the input image being externally inputted; and (b) adjusting a display size of the content and a display size of the input image so that the content and the input image are displayed in the respective different regions of the displaying unit, in the step (b), (i) a location at which the content is displayed on the displaying unit and (ii) a location at which the input image is displayed on the displaying unit being adjusted based on an aspect ratio of the content and an aspect ratio of the input image.

Advantageous Effects of Invention

According to the configuration, the adjusting section adjusts, based on the respective aspect ratios (i.e., a ratio of a vertical length to a horizontal length), the locations at which the content and the input image are respectively displayed.

From this, the display apparatus can display the content and the input image, each of which has an adjusted display size, at respective appropriate display locations on the displaying unit based on the respective aspect ratios of the content and the input image. Therefore, the display apparatus can display both the content and the input image in respective optimal display sizes.

BRIEF DESCRIPTION OF DRAWINGS

FIG. 5 is a view illustrating an example of a post-scaling sub-image which is displayed on an LCD in a case B.

FIG. 6 is a view illustrating an example of a post-scaling sub-image which is displayed on an LCD in a case C.

FIG. 9 is a view illustrating an example of a display screen displayed on an LCD in a case D.

FIG. 10 is a view illustrating an example of a display screen displayed on an LCD in a case D1.

FIG. 11 is a view illustrating an example of a display screen displayed on an LCD in a case D2.

FIG. 12 is a view illustrating an example of a display screen displayed on an LCD in a case D3.

FIG. 14 is a view illustrating an example of a display screen displayed on an LCD in a case E1.

FIG. 15 is a view illustrating an example of a display screen displayed on an LCD in a case E2.

FIG. 16 is a view illustrating an example of a display screen displayed on an LCD in a case E3.

FIG. 22 is a block diagram illustrating a configuration of a character recognizing unit of a controlling unit included in a television in accordance with an embodiment of the present invention.

FIG. 29 is a view illustrating an example of a size ratio table in accordance with another embodiment of the present invention.

FIG. 30 is a view illustrating an example of a change flag table in accordance with another embodiment of the present invention.

FIG. 36 is a view illustrating an example of a display screen displayed on a television in accordance with still another embodiment of the present invention.

FIG. 39 is a view illustrating another example of a display screen displayed on an LCD of a television in accordance with still another embodiment of the present invention. (a) of FIG. 39 illustrates an example of a display screen in a case where an aspect ratio of a sub-image and a post-scaling sub-image is kept constant, and (b) of FIG. 39 illustrates an example of a display screen in a case where an aspect ratio of a sub-image and a post-scaling sub-image is not kept constant.

DESCRIPTION OF EMBODIMENTS

Embodiment 1

The following description will discuss a display apparatus in accordance with one embodiment of the present invention, with reference to drawings. The display apparatus in accordance with the present embodiment is configured as a television receiver, and therefore the display apparatus is hereinafter referred to as "television". Note, however, that the applicable scope of the present invention is not limited to a television.

[Configuration of Television]

Figure 2:
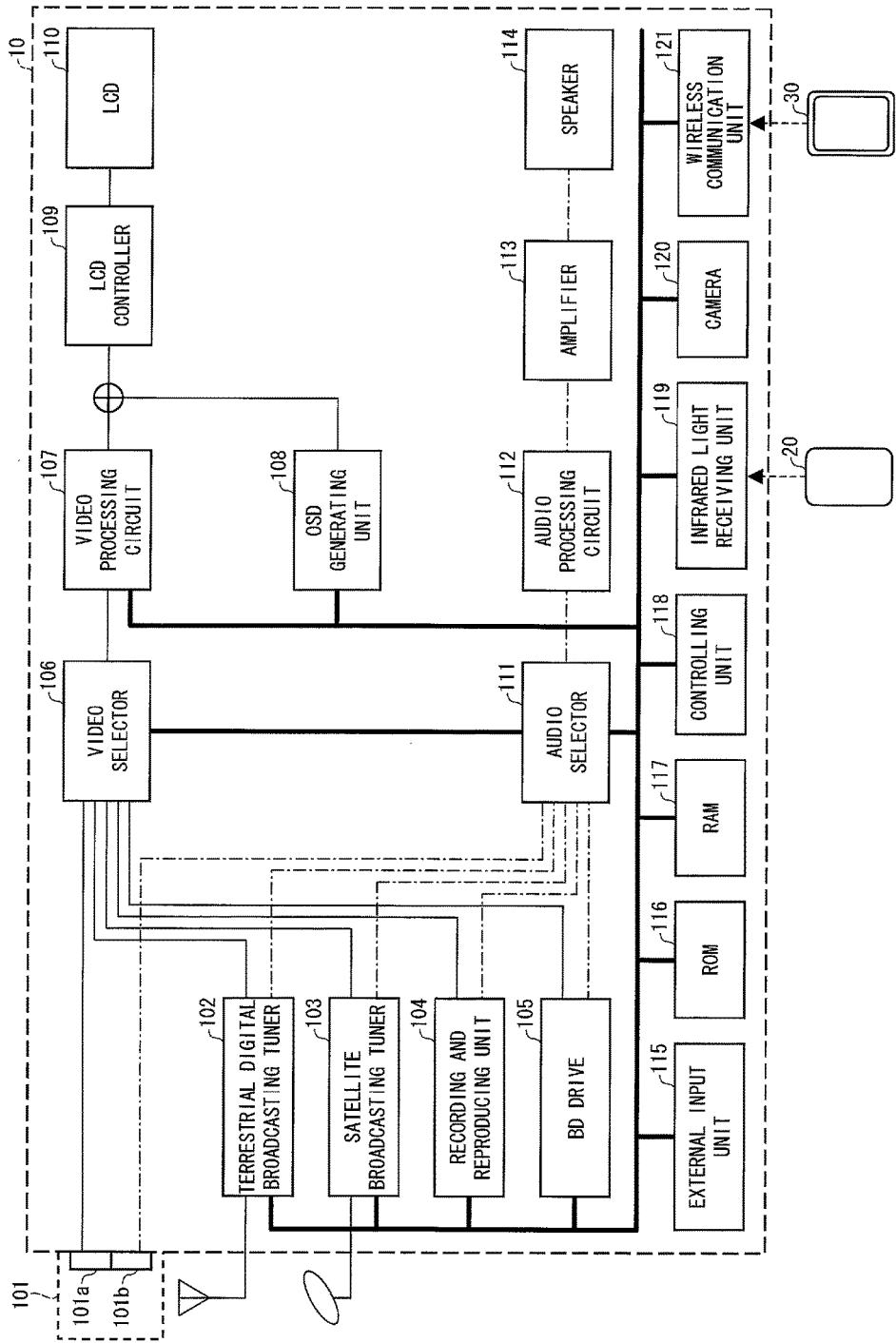
FIG. 2 is a block diagram illustrating a configuration of a television in accordance with an embodiment of the present invention.

First, a description will be provided as to a configuration of a television 10 in accordance with the present embodiment, with reference to FIG. 2. FIG. 2 is a block diagram illustrating the configuration of the television 10 in accordance with the present embodiment.

As illustrated in FIG. 2, the television 10 includes an external input terminal 101, a terrestrial digital broadcasting tuner 102, a satellite broadcasting tuner 103, a recording and reproducing unit 104, a BD drive 105, a video selector 106, a video processing circuit (adjusting section) 107, an OSD (On-Screen Display) generating unit 108, an LCD (Liquid Crystal Display) controller (display section) 109, an LCD (displaying unit) 110, an audio selector 111, an audio processing circuit 112, an amplifier 113, a speaker 114, an external input unit 115, a ROM 116, a RAM 117, a controlling unit 118, an infrared light receiving unit 119, a camera 120, and a wireless communication unit 121.

In FIG. 2, a path of video signals is illustrated in solid lines, a path of audio signals is illustrated in dashed dotted lines, and paths (buses) of data and control signals are illustrated in thick lines. Further, as illustrated in FIG. 2, the television 10 is connectable to a portable terminal (external apparatus) 30 via the external input unit 115 or the wireless communication unit 121. As illustrated in FIG. 2, the television 10 is configured to be remotely operable via a remote controller 20.

(External Input Terminal)

The external input terminal 101 includes a video input terminal 101a and an audio input terminal 101b. The video input terminal 101a (i) is a terminal via which a video signal is to be inputted and (ii) can be, for example, a DVI terminal. The audio input terminal 101b (i) is a terminal via which an audio signal is to be inputted and (ii) can be, for example, an S/PDIF terminal. Note that the external input terminal 101 is not limited to these terminals, and can be an HDMI terminal in which the video input terminal 101a and the audio input terminal 101b are integrated with each other.

(Tuner)

The terrestrial digital broadcasting tuner 102 is a tuner for receiving a broadcast program broadcasted by the terrestrial digital broadcasting. For example, the terrestrial digital broadcasting tuner 102 can demodulate an MPEG2 stream from a received signal and decode a video signal and an audio signal from the MPEG2 stream.

The MPEG2 stream demodulated by the terrestrial digital broadcasting tuner 102 is supplied to the recording and reproducing unit 104 via a bus. The video signal and the audio signal which have been decoded by the terrestrial digital broadcasting tuner 102 are supplied to the video selector 106 and the audio selector 111, respectively. The controlling unit 118 controls which channel is selected as a target for demodulation by the terrestrial digital broadcasting tuner 102.

It is preferable that the terrestrial digital broadcasting tuner 102 is a double tuner which is capable of simultaneously demodulating two MPEG2 streams broadcasted via different channels. Of course, the terrestrial digital broadcasting tuner 102 of the present invention is not limited to the double tuner. As an alternative, the terrestrial digital broadcasting tuner 102 can be a single tuner or a plurality of tuners including three or more tuners.

The satellite broadcasting tuner 103 is a tuner for receiving a broadcast program broadcasted by satellite broadcasting. The satellite broadcasting tuner 103 includes a BS broadcasting tuner for receiving BS broadcast programs broadcasted by the use of a broadcasting satellite, and a CS broadcasting tuner for receiving CS broadcast programs broadcasted by the use of a communication satellite. For example, the satellite broadcasting tuner 103 can demodulate an MPEG2 stream from a received signal and decode a video signal from the MPEG2 stream.

The MPEG2 stream demodulated by the satellite broadcasting tuner 103 is supplied to the recording and reproducing unit 104. The video signal and the audio signal which have been demodulated by the satellite broadcasting tuner 103 are supplied to the video selector 106 and the audio selector 111, respectively. The controlling unit 118 selects which channel of the MPEG2 data stream is to be demodulated by the satellite broadcasting tuner 103.

Similarly with the terrestrial digital broadcasting tuner 102, it is preferable that the BS broadcasting tuner and the CS broadcasting tuner which are included in the satellite broadcasting tuner 103 in accordance with the present embodiment are each a double tuner capable of simultaneously receiving two broadcast programs broadcasted via different channels.

(Recording and Reproducing Unit)

The recording and reproducing unit 104 obtains an MPEG2 stream from any one of the terrestrial digital broadcasting tuner 102 and the satellite broadcasting tuner 103 and causes the MPEG2 stream thus obtained to be written in a storage device. Furthermore, the recording and reproducing unit 104 reads out an MPEG2 stream from the storage device, decodes a video signal and an audio signal from the MPEG2 stream thus read out, and supplies the video signal and the audio signal to the video selector 106 and the audio selector 111, respectively.

Note that, for the recording and reproducing unit 104, it is possible to use, as the storage device in which the MPEG2 stream is to be stored, the BD drive 105 built in the television 10, an HD drive (not illustrated) built in the television 10, a USB-HD drive (not illustrated) connected to a USB (Universal Serial Bus) interface (not illustrated), and the like.

(Video Selector)

The four types of the video signals above are supplied to the video selector 106. Namely, (1) a video signal supplied from the external input terminal 101 (video input terminal 101a in particular), (2) a video signal decoded by the terrestrial digital broadcasting tuner 102, (3) a video signal decoded by the satellite broadcasting tuner 103, and (4) a video signal decoded by the recording and reproducing unit 104 (reproducing unit in particular) are supplied. The video selector 106 selects any one of the video signals (1) through (4). The video signal selected by the video selector 106 is supplied to the video processing circuit 107. Note that the controlling unit 118 controls which of the video signals is to be selected by the video selector 106.

(Video Processing Circuit)

The video processing circuit 107 carries out an image quality controlling process on the video signal supplied from the video selector 106. The video processing circuit 107 also carries out a scaling process on the video signal supplied from the video selector 106. Note here that the image quality controlling process refers to, for example, processing a video signal to change at least any one of luminance, sharpness, and contrast of a video indicated by the video signal. Note also that the scaling process refers to processing a video signal to uniformly enlarge or shrink a size of a video indicated by the video signal. The video signal processed by the video processing circuit 107 is supplied to the LCD controller 109. Note that the controlling unit 118 controls how image quality and a size of an image are changed by the video processing circuit 107.

Furthermore, the video processing circuit 107 obtains display size information (described later) from the controlling unit 118. The video processing circuit 107 carries out, based on the display size information thus obtained, a scaling process on (i) a video signal supplied from the video selector 106 and (ii) an image signal indicative of an image supplied from the portable terminal via the external input unit 115 or the wireless communication unit 121. The display size information and the scaling process will be detailed later.

Hereinafter, the video signal supplied from the video selector 106 (i.e. a video signal indicative of an image displayed on the entire LCD 110) is also referred to simply as a "main image" (content). The image signal indicative of an image supplied from the portable terminal 30 (i.e. an image signal indicative of an image being displayed on the portable terminal 30 (which image can be a moving image or a still image)) is referred to simply as a "sub-image" (input image).

(OSD Generating Unit)

The OSD generating unit 108 generates (renders) an OSD image from OSD data supplied from the controlling unit 118. An example of the OSD image generated by the OSD generating unit 108 is an electronic program table. For example, SVG (Scalable Vector Graphics) can be used as the OSD data. The OSD image generated by the OSD generating unit 108 is superimposed on the video signal supplied from the video processing circuit 107 and is supplied to the LCD controller 109.

(LCD Controller and LCD)

In accordance with the video signal supplied from the video processing circuit 107, the LCD controller 109 drives the LCD 110 so that a video indicated by the video signal is displayed. Further, in a case where the OSD image is supplied from the OSD generating unit 108, the LCD controller 109 drives the LCD 110, in accordance with the video signal (i) which has been supplied from the video processing circuit 107 and (ii) on which the OSD image has been superimposed, so that a video indicated by the video signal is displayed.

(Audio Selector)

The four types of the audio signals are supplied to the audio selector 111. Namely, (1) an audio signal supplied from the external input terminal 101 (audio input terminal

101b in particular), (2) an audio signal decoded by the terrestrial digital broadcasting tuner 102, (3) an audio signal decoded by the satellite broadcasting tuner 103, and (4) an audio signal decoded by the recording and reproducing unit 104 (reproducing unit in particular) are inputted. The audio selector 111 selects any one of the audio signals (1) through (4) above.

The audio signal selected by the audio selector 111 is supplied to the audio processing circuit 112. The controlling unit 118 controls which audio signal is selected by the audio selector 111. Note that selection of a video by the video selector 106 is in conjunction with selection of an audio by the audio selector 111. For example, in a case where the video selector 106 is selecting a video signal supplied from the terrestrial digital broadcasting tuner 102, the audio selector 111 also selects an audio signal supplied from the terrestrial digital broadcasting tuner 102.

(Audio Processing Circuit)

The audio processing circuit 112 carries out a volume controlling process on the audio signal supplied from the audio selector 111. The audio processing circuit 112 also carries out a tone controlling process on the audio signal supplied from the audio selector 111. Note here that the volume controlling process refers to processing an audio signal to change a volume of an audio indicated by the audio signal. Note also that the tone controlling process refers to processing an audio signal to change frequency characteristics of an audio indicated by the audio signal (e.g. emphasizing low-pass frequency, emphasizing high-pass frequency, and the like). The audio signal processed by the audio processing circuit 112 is supplied to the amplifier 113. Note that the controlling unit 118 controls how the volume and the tone are changed by the audio processing circuit 112.

(Amplifier and Speaker)

The amplifier 113 drives the speaker 114, in accordance with the audio signal supplied from the audio processing circuit 112, so that the speaker 114 can output an audio indicated by the audio signal.

(Controlling Unit)

The controlling unit 118 controls each of the units above in accordance with (i) a remote control signal received from the remote controller 20 via the infrared-light receiving unit 119 and (ii) an image captured by the camera 120. Examples of controls via the infrared-light receiving unit 119 include (i) a control for switching receiving channels of the terrestrial digital broadcasting tuner 102 and the satellite broadcasting tuner 103 in accordance with the remote control signal, and (ii) a control for switching the video signals selected by the video selector 106 and the audio signals selected by the audio selector 111, in accordance with the remote control signal. Further, an example of a control by use of the camera 120 is a control for changing a way of adjusting image quality in the video processing circuit 107 according to a viewer identified on the basis of a captured image.

Further, the controlling unit 118 has a function of making a table of broadcast programs from EPG (Electronic Program Guide) data provided by broadcasting stations. Note that the EPG data provided by broadcast stations can be obtained, for example, by use of the terrestrial digital broadcasting tuner 102 or the satellite broadcasting tuner 103, or from a server connected to a network (e.g. the Internet).

(ROM and RAM)

The ROM 116 is a write-protected and read-only memory in which fixed data such as a program executed by the controlling unit 118 is stored. Meanwhile, the RAM 117 is a writable and accessible memory in which reference data to be referred to by the controlling unit 118 for arithmetical operation, and variable data such as data generated by the arithmetical operation by the controlling unit 118 are stored. For example, the table of broadcast programs is stored in the RAM 117.

(External Input Unit and Wireless Communication Unit)

The external input unit 115 and the wireless communication unit 121 are each an interface for wired or wireless connection with an external apparatus such as the portable terminal 30.

An example of the external input unit 115 is an Ethernet (Registered Trademark) interface connectable to the Internet. Note, however, that the external input unit 115 is not limited to this. The external input unit 115 can be, for example, any of wired connection interfaces such as a USB interface, ATA (Advanced Technology Attachment), ATAPI (ATA Packet Interface), IEEE1394, HDMI (Registered Trademark) (High-Definition Multimedia Interface), and LAN.

The wireless communication unit 121 can be wireless connection interfaces such as Bluetooth (Registered Trademark), Wi-Fi (Registered Trademark), and IEEE80211.

[Configuration of Controlling Unit]

Figure 1:
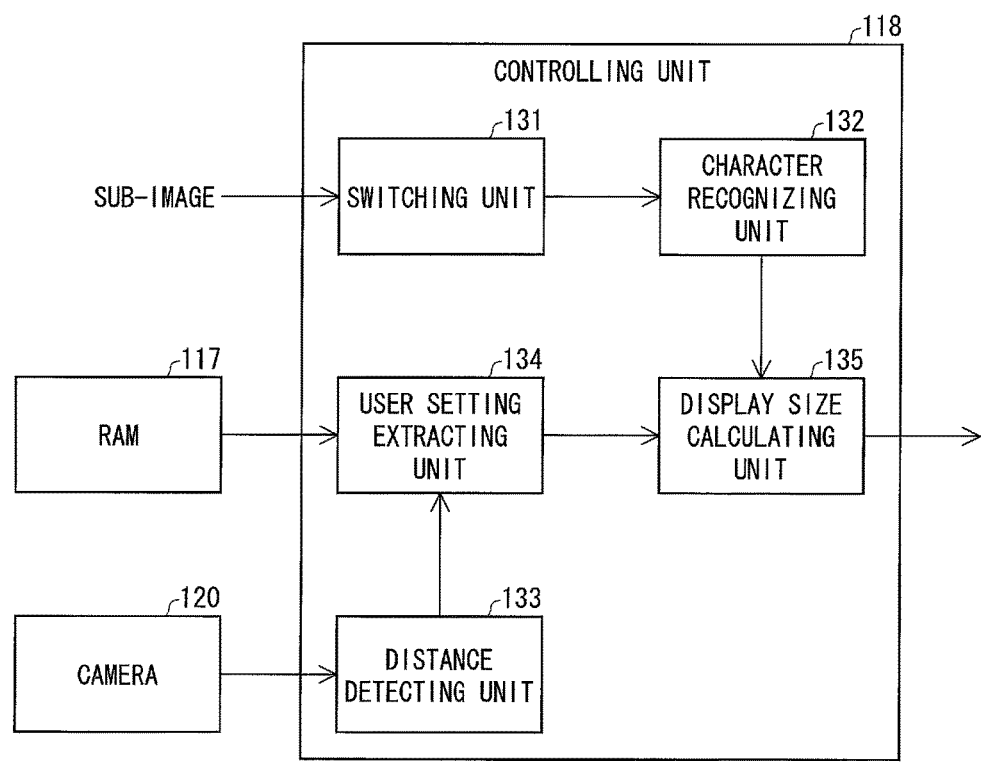
FIG. 1 is a block diagram illustrating a configuration of a controlling unit included in a television in accordance with an embodiment of the present invention.

With reference to FIG. 1, the following description will detail a configuration of the controlling unit 118 in accordance with the present embodiment. FIG. 1 is a block diagram showing the configuration of the controlling unit 118 included in the television 10 in accordance with the present embodiment.

As illustrated in FIG. 1, the controlling unit 118 in accordance with the present embodiment includes a switching unit 131, a character recognizing unit (character size detecting section) 132, a distance detecting unit (distance detecting section) 133, a user setting extracting unit (user identifying section) 134, and a display size calculating unit (adjusting section) 135.

(Switching Unit)

The switching unit 131 switches whether or not to supply, to the character recognizing unit 132 and the display size calculating unit 135, a sub-image (input image) obtained via the external input unit 115 or the wireless communication unit 121.

In a case where the switching unit 131 supplies a sub-image to the character recognizing unit 132 and the display size calculating unit 135, a character recognizing process and a display size calculating process (each will be described later) are carried out, and the video processing circuit 107 carries out a scaling process on the sub-image.

On the other hand, in a case where the switching unit 131 does not supply a sub-image to the character recognizing unit 132 and the display size calculating unit 135, the character recognizing process and the display size calculating process are not carried out. In this case, the video processing circuit 107 may carry out the scaling process on the sub-image so that the sub-image displayed on the LCD 110 (post-scaling sub-image, which will be described later) has a predetermined display size.

The predetermined display size can be determined in advance by a user or can be adjusted by the user via, for example, the remote controller 20 with reference to the sub-image displayed on the LCD 100. The video processing circuit 107 can be configured so as to carry out the scaling process on a sub-image so that the sub-image displayed on the LCD 110 has a size equal to a size in which the sub-image is displayed on the portable terminal 30.

In other words, the switching unit 131 switches weather or not to carry out the scaling process on a sub-image by the video processing circuit 107 in accordance with the result of the display size calculating process. Hereinafter, a case where the switching unit 131 allows the video processing circuit 107 to carry out the scaling process on a sub-image in accordance with the result of the display size calculating process is also referred to as "ON-state", and a case where the switching unit 131 does not allow the video processing circuit 107 to carry out the scaling process is also referred to as "OFF-state".

(Character Recognizing Unit)

The character recognizing unit 132 recognizes characters included in a sub-image supplied from the switching unit 131, and detects a size of a smallest character (hereinafter also referred to as a smallest character size) out of the recognized characters (hereinafter also referred to as a character recognizing process). The character recognizing process will be detailed later.

(Distance Detecting Unit)

The distance detecting unit 133 detects a distance from the television 10 to a user. The distance detecting unit 133 may detect the distance from the television 10 to the user on the basis of, for example, an image which (i) has been captured by the camera 120 and (ii) contains (shows) a user of the television 10. Note that the distance from the television 10 to the user can be detected with use of a well-known technique, and therefore an explanation of the technique is omitted here.

(User Setting Extracting Unit)

The user setting extracting unit 134 extracts a user's preferred character size (standard character size) which (i) has been set by the user of the television 10 in advance and (ii) is stored in, for example, a storage medium such as the RAM 117. The standard character size may be one which can be inputted in advance by operating the remote controller 20 and the like with reference to, as a standard, a size of a character displayed on the LCD 110 in a case where a distance from the television 10 to the user is 1000 mm. Note, however, that the standard character size is not particularly limited.

When extracting the standard character size, the user setting extracting unit 134 carries out a process of identifying the user who is using the television 10. The user of the television 10 can be identified with use of a well-known technique on the basis of an image captured by the camera 120, and therefore an explanation of the process is omitted here.

(Display Size Calculating Unit)

In a case where a sub-image is displayed on the LCD 110, the display size calculating unit 135 carries out the display size calculating process of calculating a display size optimal for the user who is using (viewing) the television 10, on the basis of the smallest character size detected by the character recognizing unit 132 and a size of the sub-image. The display size calculating unit 135 supplies, to the video processing circuit 107, display size information indicative of the calculated display size. In other words, in the present embodiment, the display size calculating unit 135 and the video processing circuit 107 constitute the adjusting section.

To be more specific, the display size calculating unit 135 carries out the display size calculating process on the basis of (1) the smallest character size, (2) the distance from the television 10 to the user, and (3) the standard character size which has been set by the user of the television 10 in advance. Calculation in the display size calculating process will be detailed later.

On the basis of (1) and (2) above, the television 10 can display characters, which are included in the sub-image, in a size suitable for the distance from the television 10 to the user. Consequently, the television 10 can display the sub-image in a size which allows the user to recognize characters included in the sub-image, regardless of the distance from the television 10 to the user.

Furthermore, on the basis of (3), the television 10 can display a sub-image in a display size which has been adjusted so that characters included in the sub-image are to have a size closer to a user's preferable size, regardless of the distance from the television 10 to the user.

In the present embodiment, a configuration example is described in which the display size calculating unit 135 carries out the display size calculating process on the basis of (1) through (3). Note, however, that the present invention is not limited to this configuration. For example, the display size calculating unit 135 may carry out the size calculating process on the basis of (1) and (2), or may carry out the display size calculating process on the basis of (1) and (3).

[Outline of Process by Controlling Unit]

Figure 3:
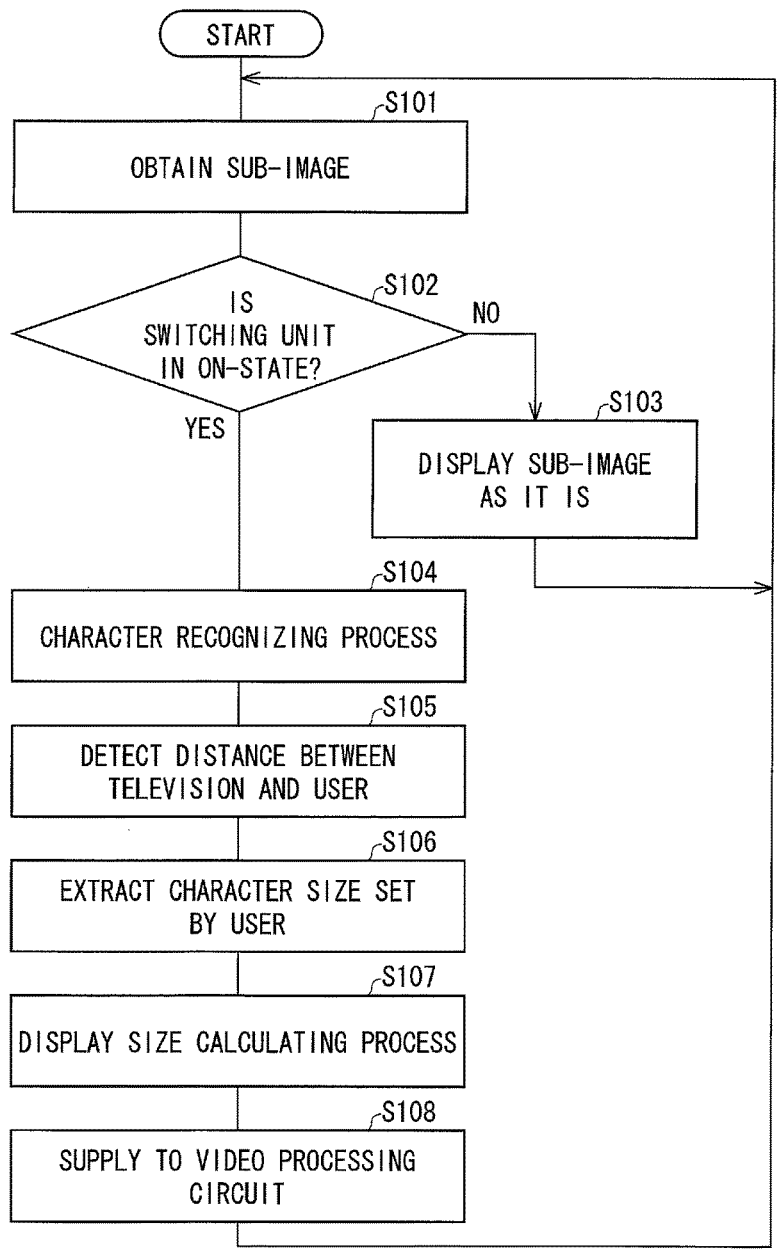
FIG. 3 is a flowchart illustrating an example of a process executed by a controlling unit included in a television in accordance with an embodiment of the present invention.

With reference to FIG. 3, the following description will discuss an outline of a process carried out by the controlling unit 118 included in the television 10 in accordance with the present embodiment. FIG. 3 is a flowchart showing an example of the process carried out by the controlling unit 118 included in the television 10 in accordance with the present embodiment.

In a case where a sub-image is obtained via the external input unit 115 or the wireless communication unit 121 (step S101), the controlling unit 118 judges whether or not the switching unit 131 is in the ON-state (step S102). In a case where the switching unit 131 is in the OFF-state (NO in step S102), the controlling unit 118 controls the video processing circuit 107 so that the LCD 110 displays the sub-image as it is (step S103).

In a case where the switching unit 131 is in the ON-state (YES in step S102), the character recognizing unit 132 carries out the character recognizing process on a sub-image supplied via the switching unit 131 (step S104).

Subsequently, the distance detecting unit 133 detects a distance from the television 10 to the user who is using the television 10, on the basis of an image captured by the camera 120 (step S105). Furthermore, the user setting extracting unit 134 identifies the user who is using the television 10 on the basis of the image captured by the camera 120, and extracts, from the RAM 117, a standard character size which has been set in advance by the user thus identified (step S106).

The display size calculating unit 135 carries out the display size calculating process on the basis of (1) the smallest character size detected by the character recognizing unit 132, (2) the distance from the television 10 to the user which distance has been detected by the distance detecting unit 133, and (3) the standard character size extracted by the user setting extracting unit 134 (step S107). The display size calculating unit 135 supplies, to the video processing circuit 107, the calculated display size as display size information (step S108).

In a case where the controlling unit 118 controls the LCD 110 to display a sub-image, the controlling unit 118 may repeatedly carry out the processes of the steps S101 through S108.

[Display Size Calculating Process]

The following description will discuss a display size calculating process on a sub-image with reference to FIGS. 4 through 21. The display size calculating process is carried out by the display size calculating unit 135 of the controlling unit 118 included in the television 10 in accordance with the present embodiment.

[Case where Sub-Image is Displayed while Overlapping with Main Image]

First, with reference to FIGS. 4 through 7, a description will be provided below as to the display size calculating process carried out in a case where a display size of only a sub-image is calculated (i.e. in a case where a sub-image is displayed while overlapping with a main image). In this case, as illustrated in FIG. 4, a sub-image 3b (hereinafter also referred to as "post-scaling sub-image") which has been subjected to the scaling process carried out by the video processing circuit 107 is displayed while overlapping with a main image 1a.

Figure 4:
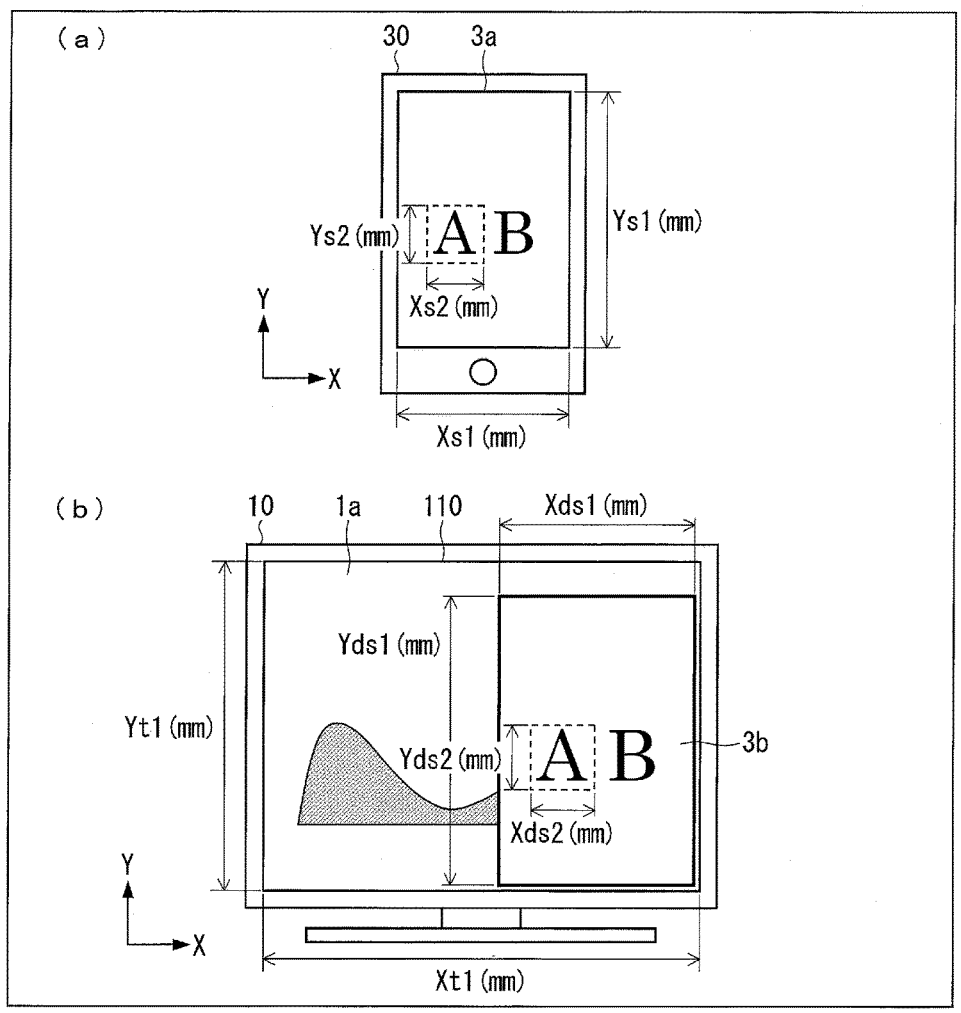
FIG. 4 is a view illustrating an example of display screens respectively displayed on a displaying unit of a portable terminal and on an LCD of a television, in accordance with an embodiment of the present invention. (a) of FIG. 4 illustrates an example of a sub-image displayed on the displaying unit of the portable terminal, and (b) of FIG. 4 illustrates an example of a main image and a post-scaling sub-image which are displayed on the LCD of the television.

FIG. 4 is a view illustrating examples of a display screen displayed on a displaying unit (not illustrated) of the portable terminal 30 in accordance with the present embodiment and a display screen displayed on the LCD 110 included in the television 10. (a) of FIG. 4 illustrates an example of the sub-image 3a displayed on the displaying unit of the portable terminal 30. (b) of FIG. 4 illustrates examples of the main-image 1a and the post-scaling sub-image 3b which are displayed on the LCD 110 of the television 10. Hereinafter, a length of each of a sub-image, a main image, a post-scaling sub-image, and a post-scaling main image (described later) in an x-axis direction of FIG. 4 is also referred to as "horizontal length", and a length of each of the sub-image, the main image, the post-scaling sub-image, and the post-scaling main image in a y-axis direction of FIG. 4 is also referred to as "vertical length".

Here, as illustrated in (a) of FIG. 4, the horizontal length and the vertical length of the sub-image 3a are considered as Xs1 (mm) and Ys1 (mm), respectively. Furthermore, a horizontal length and a vertical length of a smallest character size of a smallest character ("A" in the case of (a) of FIG. 4) included in the sub-image 3a are considered as Xs2 (mm) and Ys2 (mm), respectively. In the present embodiment, a description will be provided as to a case where Xs2=Ys2. However, the present invention is not limited to this case.

Furthermore, as illustrated in (b) of FIG. 4, a horizontal length and a vertical length of the main image 1a are considered as Xt1 (mm) and Yt1 (mm), respectively, and a horizontal length and a vertical length of the post-scaling sub-image 3b are considered as Xds1 (mm) and Yds1 (mm), respectively. A horizontal length and a vertical length of a smallest character size of a smallest character included in the post-scaling sub-image 3b are considered as Xds2 (mm) and Yds2 (mm), respectively.

Furthermore, a distance from the television 10 to a user, which distance is detected by the distance detecting unit 133, is considered as D (mm). A standard character size, which has been set with reference to a case where D=1000 (mm) (hereinafter also referred to as "sub-image standard character size"), is considered as Ss (mm).

In the present embodiment, a description will be provided as to an example case where the display size calculating unit 135 calculates a display size of the post-scaling sub-image 3b so that an aspect ratio (Ys1/Xs1) of the sub-image 3a becomes equal to an aspect ratio (Yds1/Xds1) of the post-scaling sub-image 3b.

Since the aspect ratio of the sub-image 3a is equal to the aspect ratio of the post-scaling sub-image 3b, relations Xs2:Xs1=Xds2:Xds1 and Ys2:Ys1=Yds2:Yds1 are satisfied. Under these conditions, the display size calculating unit 135 calculates the display size (horizontal length Xds1 and vertical length Yds1) of the post-scaling sub-image 3b as follows.

First, the horizontal length Xds1 and the vertical length Yds1 of the post-scaling sub-image 3b are respectively expressed as follows:

$$Xds1=(Xds2/Xs2)*Xs1 \quad (1)$$

$$Yds1=(Yds2/Ys2)*Ys1 \quad (2)$$

Furthermore, the smallest character size of the smallest character included in the post-scaling sub-image 3b (Xds2=Yds2 in the present embodiment) is in proportion to the distance D between the television 10 and a user. This allows the smallest character size of the smallest character included in the post-scaling sub-image 3b to be equal to or greater than a minimum size which enables the user to recognize a character. Specifically, since the sub-image standard character size is Ss in a case where the distance D between the television 10 and the user is 1000 (mm), the smallest character size of the smallest character included in the post-scaling sub-image 3b is expressed as follows:

$$Xds2=Yds2=(Ss*D)/1000 \quad (3)$$

From the formulae (1) through (3), the display size (horizontal length Xds1 and the vertical length Yds1) of the post-scaling sub-image 3b is expressed as follows:

$$Xds1=Ss*D*(Xs1/1000Xs2) \quad (4)$$

$$Yds1=Ss*D*(Ys1/1000Ys2) \quad (5)$$

However, in a case where the calculation of the formulae (4) and (5) shows a result Xds1>Xt1 or Yds1>Yt1, the LCD 110 cannot display the entire post-scaling sub-image 3b. In the present embodiment, in such a case, the display size calculating unit 135 scales down the post-scaling sub-image 3b so that Xds1≤Xt1 and Yds1≤Yt1 are satisfied, and this allows the LCD 110 to display the entire post-scaling sub-image 3b.

The present invention is not limited to this. For example, the present invention may be arranged such that the display size calculating unit 135 does not scale down the post-scaling sub-image 3b and the LCD 110 displays a displayable range of the post-scaling sub-image 3b (i.e., a part of the post-scaling sub-image 3b).

In view of the above, the display size of the post-scaling sub-image 3b, which size is calculated by the display size calculating unit 135, can be classified into Cases A through C below.

(Case A)

Case A is a case where the results of calculation of the formulae (4) and (5) show Xds1≤Xt1 and Yds1≤Yt1. In the Case A, the display size of the post-scaling sub-image 3b, which size is calculated by the display size calculating unit 135, is equal to the results of calculation of the formulae (4) and (5).

(Case B)

Case B is a case where the results of calculation of the formulae (4) and (5) show (i) Xds1≤Xt1 and Yds1>Yt1 or (ii) Xds1>Xt1 and Yds1>Yt1 and (Yds1/Xds1)≥(Yt1/Xt1). In other words, in the Case B, as indicated by dotted lines in FIG. 5, the vertical length Yds1 of the post-scaling sub-image 3b is greater than the vertical length Yt1 of the LCD 110.

FIG. 5 is a view illustrating an example of a post-scaling sub-image displayed on the LCD 110 in the Case B.

In the Case B, the display size calculating unit 135 calculates a display size of a post-scaling sub-image 3b' so that the value of Yds1 is Yt1 at maximum, as illustrated in FIG. 5. Consequently, the display size of the post-scaling sub-image 3b', which size is calculated by the display size calculating unit 135, is expressed as follows:

$$Xds1=(Xs1/Ys1)*Yt1 \quad (6)$$

$$Yds1=Yt1 \quad (7)$$

The value of Xs1/Ys1 in the formula (6) can be calculated by the display size calculating unit 135 from the values of (Xs1/Xs2) and (Ys1/Ys2) as follows, i.e., (Xs1/Xs2)/(Ys1/Ys2)=Xs1/Ys1.

(Case C)

Case C is a case where results of calculation of the formulae (4) and (5) show that (i) Xds1>Xt1 and Yds1≤Yt1 or (ii) Xds1>Xt1 and Yds1>Yt1 and (Yds1/Xds1)<(Yt1/Xt1). In other words, in the Case C, as indicated by dotted lines in FIG. 6, the horizontal length Xds1 of the post-scaling sub-image 3b is greater than the horizontal length Xt1 of the LCD 110.

FIG. 6 is a view illustrating an example of a post-scaling sub-image displayed on the LCD 110 in the Case C.

In the Case C, the display size calculating unit 135 calculates a display size of a post-scaling sub-image 3b" so that the value of Xds1 is Xt1 at maximum, as illustrated in FIG. 6. Consequently, the display size of the post-scaling sub-image 3b", which size is calculated by the display size calculating unit 135, is expressed as follows:

$$Xds1=Xt1 \quad (8)$$

$$Yds1=(Ys1/Xs1)*Xt1 \quad (9)$$

In the Cases B and C, the size of the smallest character included in the post-scaling sub-image 3b" displayed on the LCD 110 is smaller than the size optimal for the user (i.e., the results of calculation of the formulae (4) and (5)). Therefore, in the Cases B and C, the television 10 may display a caution indicating that the size of the smallest character included in the post-scaling sub-image 3b" is smaller than the size optimal for the user. This caution may be generated by, for example, the OSD generating unit 108. Furthermore, the television 10 may display a character in the size optimal for the user so that the user can compare the optimal size with the size of the smallest character included in the post-scaling sub-image 3b".

The above description has addressed the example configuration in which the scaling process is carried out on a sub-image on the basis of the calculated smallest character size. However, the present invention is not limited to this. For example, the present invention can employ a configuration in which a ratio of a smallest character size to a size of a sub-image (smallest character size ratio) is calculated and the scaling process is carried out on the sub-image on the basis of the smallest character size ratio thus calculated.

(Case where Smallest Character Size Ratio Changes)

Figure 7:
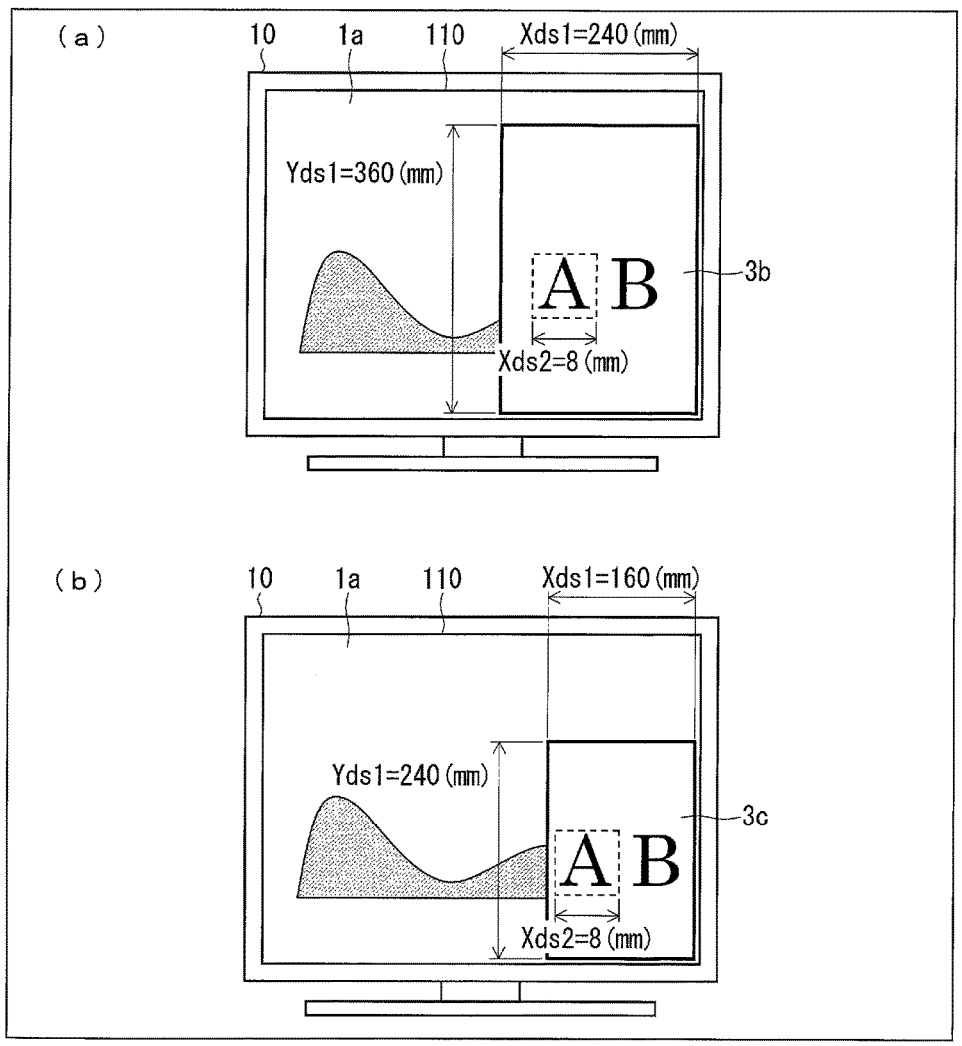
FIG. 7 is a screen transition diagram of a display screen on an LCD in a case where a smallest character size ratio in a sub-image has been changed. (a) of FIG. 7 illustrates an example of a display screen before the smallest character size ratio changes, and (b) of FIG. 7 illustrates an example of a display screen after the smallest character size ratio has been changed.

With reference to FIG. 7, the following description will discuss a change in display size of the post-scaling sub-image 3b in a case where a ratio of a size of a smallest character included in the sub-image 3a to a size of the sub-image 3a (smallest character size ratio) changes.

The smallest character size ratio can be calculated from, for example, Xs2/Xs1 and Ys2/Ys1. Here, a description will be provided as to an example in which D=2000 mm, S=4 mm, Xt1=240 mm, and Yt1=360 mm.

FIG. 7 is a screen transition diagram illustrating how a display screen of the LCD 110 shifts in a case where the smallest character size ratio in the sub-image 3a changes. (a) of FIG. 7 illustrates an example of the display screen before the smallest character size ratio changes. (b) of FIG. 7 illustrates an example of the display screen after the smallest character size ratio has changed.

First, in a case where the smallest character size ratio before being changed is Xs2/Xs1=1/30 and Ys2/Ys1=1/45, the display size calculating unit 135 carries out the display size calculating process in which the display size of the post-scaling sub-image 3b is calculated from the formulae (4) and (5) as follows:

$$Xds1=(4*2000*30)/1000=240 \text{ mm}$$

$$Yds1=(4*2000*45)/1000=360 \text{ mm}$$

The video processing circuit 107 carries out a scaling process on the sub-image 3a on the basis of the display size thus calculated, and the LCD 110 displays the post-scaling sub-image 3b as illustrated in (a) of FIG. 7.

After that, in a case where the smallest character size ratio has changed to Xs2/Xs1=1/20 and Ys2/Ys1=1/30, the display size calculating unit 135 carries out the display size calculating process in which the display size of a post-scaling sub-image 3c is calculated from the formulae (4) and (5) as follows:

$$Xds1=(4*2000*20)/1000=160 \text{ mm}$$

$$Yds1=(4*2000*30)/1000=240 \text{ mm}$$

The video processing circuit 107 carries out a scaling process on the sub-image 3a on the basis of the display size thus calculated, and the LCD 110 displays the post-scaling sub-image 3c in the changed display size, as illustrated in (b) of FIG. 7.

Thus, even in a case where a smallest character size ratio in a sub-image has changed, the television 10 can display the sub-image, which has been subjected to a scaling process optimal for the user, on the LCD 110 while the sub-image overlaps with a main image.

[Case where Sub-Image and Main Image are Two-Screen-Displayed]

In the present embodiment, the example case has been described in which the sub-image is scaled and the post-scaling sub-image is displayed while overlapping with the main image. However, the present invention is not limited to this. For example, the present invention may employ a configuration in which a main image is scaled so that a post-scaling main image does not overlap with a post-scaling sub-image, and the post-scaling sub-image and the post-scaling main image are displayed in respective different regions of the LCD 110.

This configuration can prevent the television 10 from having a problem that a sub-image is displayed while overlapping with a main image and consequently the user cannot view a part of the main image.

Hereinafter, displaying a post-scaling sub-image and a post-scaling main image in respective different regions of the LCD 110 is also referred to as "two-screen-display".

In a case where a main image includes a character, the display size calculating unit 135 may calculate a display size of a post-scaling main image in a manner similar to the aforementioned calculation of a display size of a post-scaling sub-image. With reference to FIGS. 8 through 21, the following description will discuss a case where both of a main image and a sub-image are scaled and two-screen-displayed.

Figure 8:
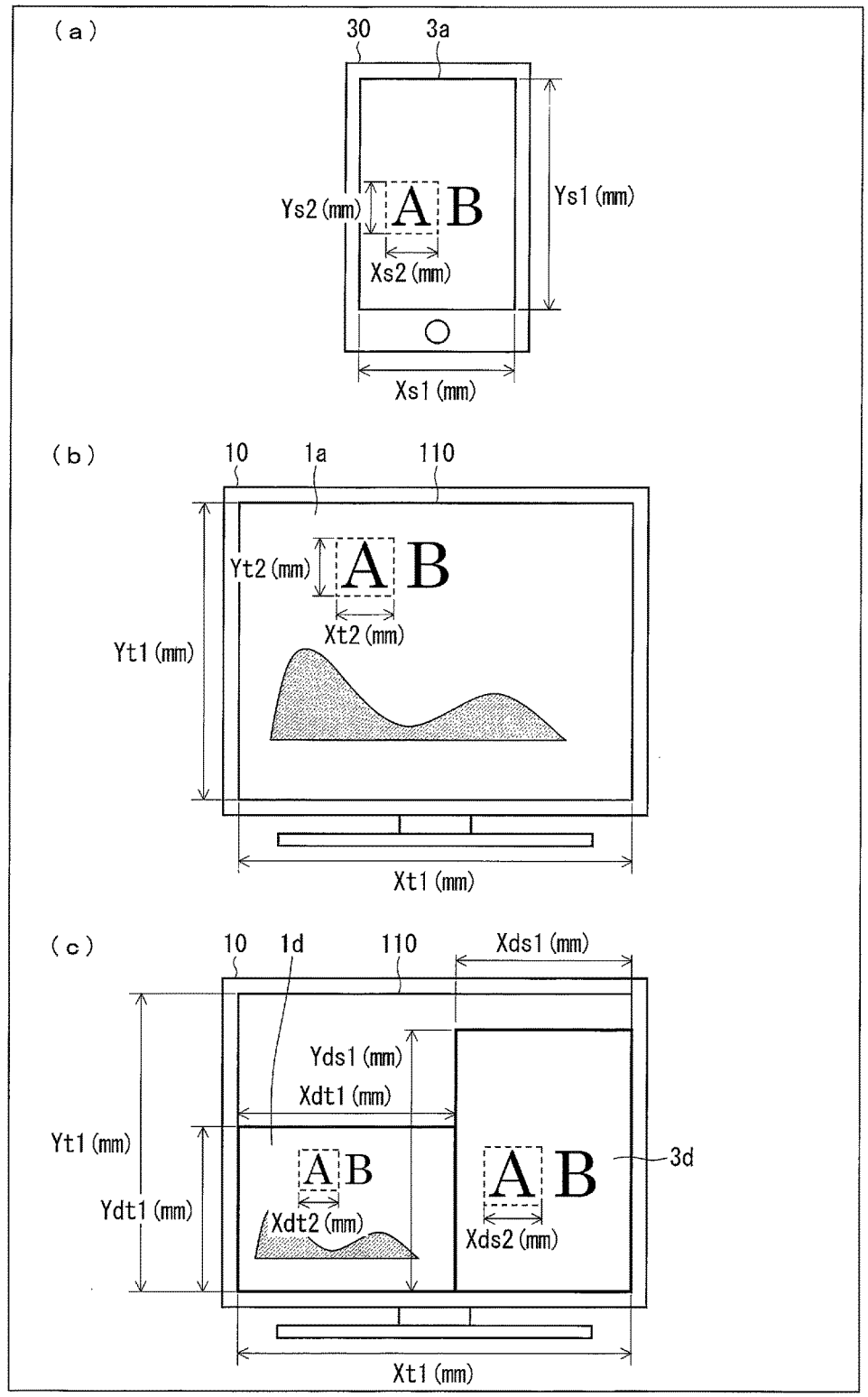
FIG. 8 is a view illustrating an example of display screens displayed on a portable terminal and on a television in accordance with an embodiment of the present invention. (a) of FIG. 8 illustrates an example of a sub-image displayed on a displaying unit of the portable terminal, (b) of FIG. 8 illustrates an example of a main image displayed on an LCD, and (c) of FIG. 8 illustrates an example of the main image and the sub-image which have been subjected to scaling and are displayed on the LCD.

FIG. 8 is a view illustrating examples of display screens displayed on the portable terminal 30 and the television 10 in accordance with the present embodiment. (a) of FIG. 8 illustrates an example of a sub-image 3*a* displayed on a displaying unit of the portable terminal 30. (b) of FIG. 8 illustrates an example of a main image 1*a* displayed on the LCD 110. (c) of FIG. 8 illustrates examples of a post-scaling main image 1*d* and a post-scaling sub-image 3*d* which are displayed on the LCD 110.

In the case of the two-screen-display, the display size calculating unit 135 may calculate respective display sizes of the post-scaling main image 1*d* and the post-scaling sub-image 3*d* with parameters set as follows for example, in a manner similar to the calculation of the display size of the post-scaling sub-image 3*b*.

A horizontal length and a vertical length of a size of a smallest character included in the main image 1*a* are considered as Xt2 (mm) and Yt2 (mm), respectively (in the present embodiment, Xt2=Yt2). A horizontal length and a vertical length of the post-scaling main image 1*d* are considered as Xdt1 (mm) and Ydt1 (mm), respectively. A horizontal length and a vertical length of the size of the smallest character included in the post-scaling main image 1*d* are considered as Xdt2 (mm) and Ydt2 (mm), respectively. A standard character size, which has been set in advance with reference to a case where D=1000 (mm) (main image standard character size), is considered as St (mm).

In this case, as with the calculation of the display size of the post-scaling sub-image 3*b*, the display size calculating unit 135 can calculate a display size (horizontal length Xdt1 and vertical length Ydt1) of the post-scaling main image 1*d* in accordance with formulae below:

$$Xdt1 = St*D*(Xt1/1000Xt2) \quad (10)$$

$$Ydt1 = St*D*(Yt1/1000Yt2) \quad (11)$$

In this case, the display size calculating unit 135 may supply, to the video processing circuit 107, display size information indicating the display size of the post-scaling main image 1*d* as well as the display size of the post-scaling sub-image 3*d*. Furthermore, the video processing circuit 107 may carry out a scaling process on both of the sub-image 3*a* and the main image 1*a* on the basis of the display size information received from the display size calculating unit 135.

Consequently, the post-scaling main image 1*d* and the post-scaling sub-image 3*d* are two-screen-displayed on the LCD 110 as illustrated in FIG. 8 for example.

On the other hand, in a case where both of the sub-image 3*a* and the main image 1*a* are subjected to the scaling process and two-screen-displayed, there is a possibility that (i) a gap is generated between display areas of the scaled images, (ii) the scaled images overlap with each other, or (iii) one or both of display sizes of the scaled images become larger than the size of the LCD 110.

In a case where respective display areas of the post-scaling sub-image 3*d* and the post-scaling main image 1*d* are apart from each other, characters in the images have sizes suitable for the user but viewability of each of the images as a whole is deteriorated. In a case where respective display areas of the post-scaling sub-image 3*d* and the post-scaling main image 1*d* overlap with each other or at least one of respective display sizes of the post-scaling sub-image 3*d* and the post-scaling main image 1*d* becomes larger than the size of the LCD 110, at least one of the post-scaling sub-image 3*d* and the post-scaling main image 1*d* is partially not displayed, so that viewability of the image as a whole is deteriorated.

In such a case, it is preferable that the display size calculating unit 135 calculates optimal sizes of respective screens in each of Cases D through F described below. Furthermore, it is preferable that the television 10 is configured to enable the user, in each of the Cases D through F, to set a case such as (1) a case where display of the post-scaling main image 1*d* is given higher priority, (2) a case where display of the post-scaling sub-image 3*d* is given higher priority, or (3) a case neither of display of the post-scaling main image 1*d* and display of the post-scaling sub-image 3*d* is given priority.

(Case D)

Case D is a case where results of calculation of the formulae (4) and (10) by the display size calculating unit 135 show that a gap is generated between the post-scaling main image 1*d* and the post-scaling sub-image 3*d*, i.e. a case where Xds1+Xdt1<Xt1. In the Case D, for example, as illustrated in FIG. 9, the post-scaling main image 1*d* and the post-scaling sub-image 3*d* are displayed on the LCD 110 while the post-scaling main image 1*d* and the post-scaling sub-image 3*d* are apart from each other.

FIG. 9 is a view illustrating an example of a display screen displayed on the LCD 110 in the Case D.

In such a case, the display size calculating unit 135 calculates an adjustment value (also referred to as "display size adjustment value") for adjusting respective display sizes of the post-scaling main image 1*d* and the post-scaling sub-image 3*d* as appropriate.

Case D1

Case D1 is one of the Case D in which, in the television 10, the post-scaling main image 1*d* is set in advance to have higher priority than the post-scaling sub-image 3*d* (i.e. display of the post-scaling main image 1*d* is given higher priority). In the Case D1, the display size calculating unit 135 calculates a display size adjustment value so that only the post-scaling main image 1*d* is adjusted in size (i.e., scaled up) to be displayed as a post-scaling main image 1*d'* on the LCD 110 as illustrated in FIG. 10.

FIG. 10 is a view illustrating an example of a display screen displayed on the LCD 110 in the Case D1.

Specifically, the display size calculating unit 135 calculates a display size adjustment value so that a display size of the post-scaling main image 1*d'* is adjusted to achieve the followings: that is, in a case where one end of the post-scaling sub-image 3*d* contacts with one end of the LCD 110 in the longer side direction, (i) one end of the post-scaling main image 1*d'* contacts with the other end of the LCD 110 in the longer side direction and (ii) the other end of the post-scaling main image 1*d'* contacts with the other end of the post-scaling sub-image 3*d*.

Case D2

Case D2 is one of the Case D in which, in the television 10, the post-scaling sub-image 3*d* is set in advance to have higher priority than the post-scaling main image 1*d*. In the Case D2, the display size calculating unit 135 calculates a display size adjustment value so that only the post-scaling sub-image 3*d* is adjusted to be displayed as a post-scaling sub-image 3*d'* on the LCD 110 as illustrated in FIG. 11.

FIG. 11 is a view illustrating an example of a display screen displayed on the LCD 110 in the Case D2.

Case D3

Case D3 is one of the Case D in which, in the television 10, the post-scaling main image 1*d* and the post-scaling sub-image 3*d* are set in advance to have equal priority. In the Case D3, the display size calculating unit 135 calculates a display size adjustment value so that both of the post-scaling main image 1*d* and the post-scaling sub-image 3*d* are adjusted in size to be displayed as a post-scaling main image $1d'$ and a post-scaling sub-image $3d'$, respectively, on the LCD 110 as illustrated in FIG. 12.

FIG. 12 is a view illustrating an example of a display screen displayed on the LCD 110 in the Case D3.

Moreover, in a case where a post-scaling main image and a post-scaling sub-image are not set to have priority, the display size calculating unit 135 may calculate a display size adjustment value so that the post-scaling main image and the post-scaling sub-image are displayed in adjusted display sizes, as with the case D3.

(Case E)

Case E is a case where results of calculation of the formulae (4) and (10) by the display size calculating unit 135 show that the post-scaling main image $1d$ and the post-scaling sub-image $3d$ overlap with each other, i.e. Xds1+Xdt1>Xt1. In the Case E, the post-scaling main image $1d$ and the post-scaling sub-image $3d$ are displayed on the LCD 110 in such a manner that one of the post-scaling main image $1d$ and the post-scaling sub-image $3d$ partially overlaps with the other as illustrated in FIG. 13.

Figure 13:
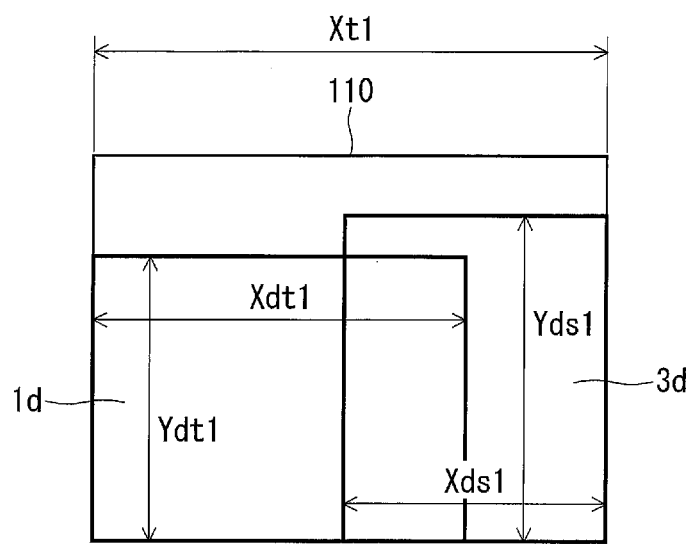
FIG. 13 is a view illustrating an example of a display screen displayed on an LCD in a case E.

FIG. 13 is a view illustrating an example of a display screen displayed on the LCD 110 in the Case E.

Case E1

Case E1 is one of the Case E in which, in the television 10, display of the post-scaling main image $1d$ is set in advance to have higher priority. In the Case E1, the display size calculating unit 135 calculates a display size adjustment value so that only the post-scaling sub-image $3d$ is adjusted (i.e., scaled down) to be displayed as a post-scaling sub-image $3d'$ on the LCD 110 as illustrated in FIG. 14.

FIG. 14 is a view illustrating an example of a display screen displayed on the LCD 110 in the Case E1.

Specifically, the display size calculating unit 135 calculates a display size adjustment value so that a display size of the post-scaling sub-image $3d'$ is adjusted to achieve the followings: that is, in a case where one end of the post-scaling main image $1d$ contacts with one end of the LCD 110 in the longer side direction, (i) one end of the post-scaling sub-image $3d'$ contacts with the other end of the LCD 110 in the longer side direction and (ii) the other end of the post-scaling sub-image $3d'$ contacts with the other end of the post-scaling main image $1d$.

Case E2

Case E2 is one of the Case E in which, in the television 10, display of the post-scaling sub-image $3d$ is set in advance to have higher priority. In the Case E2, the display size calculating unit 135 calculates a display size adjustment value so that only the post-scaling main image $1d$ is adjusted to be displayed as a post-scaling main image $1d'$ on the LCD 110 as illustrated in FIG. 15.

FIG. 15 is a view illustrating an example of a display screen displayed on the LCD 110 in the Case E2.

Case E3

Case E3 is one of the Case E in which, in the television 10, both of the post-scaling main image $1d$ and the post-scaling sub-image $3d$ are set in advance to have equal priority. In the Case E3, the display size calculating unit 135 calculates a display size adjustment value so that both of the post-scaling main image $1d$ and the post-scaling sub-image $3d$ are adjusted to be displayed as a post-scaling main image $1d'$ and a post-scaling sub-image $3d'$, respectively, on the LCD 110 as illustrated in FIG. 16.

FIG. 16 is a view illustrating an example of a display screen displayed on the LCD 110 in the Case E3.

(Case F)

Case F is a case where results of calculation of the formulae (5) and (11) by the display size calculating unit 135 show that a vertical length of a post-scaling main image or a post-scaling sub-image is greater than the vertical length of the LCD 110, i.e. Yds1>Yt1 or Ydt1>Yt1. In the Case F, at least one of the post-scaling main image $1d$ and the post-scaling sub-image $3d$ cannot be fully displayed on the LCD 110 as illustrated in, for example, (a) and (b) of FIG. 17.

Figure 17:
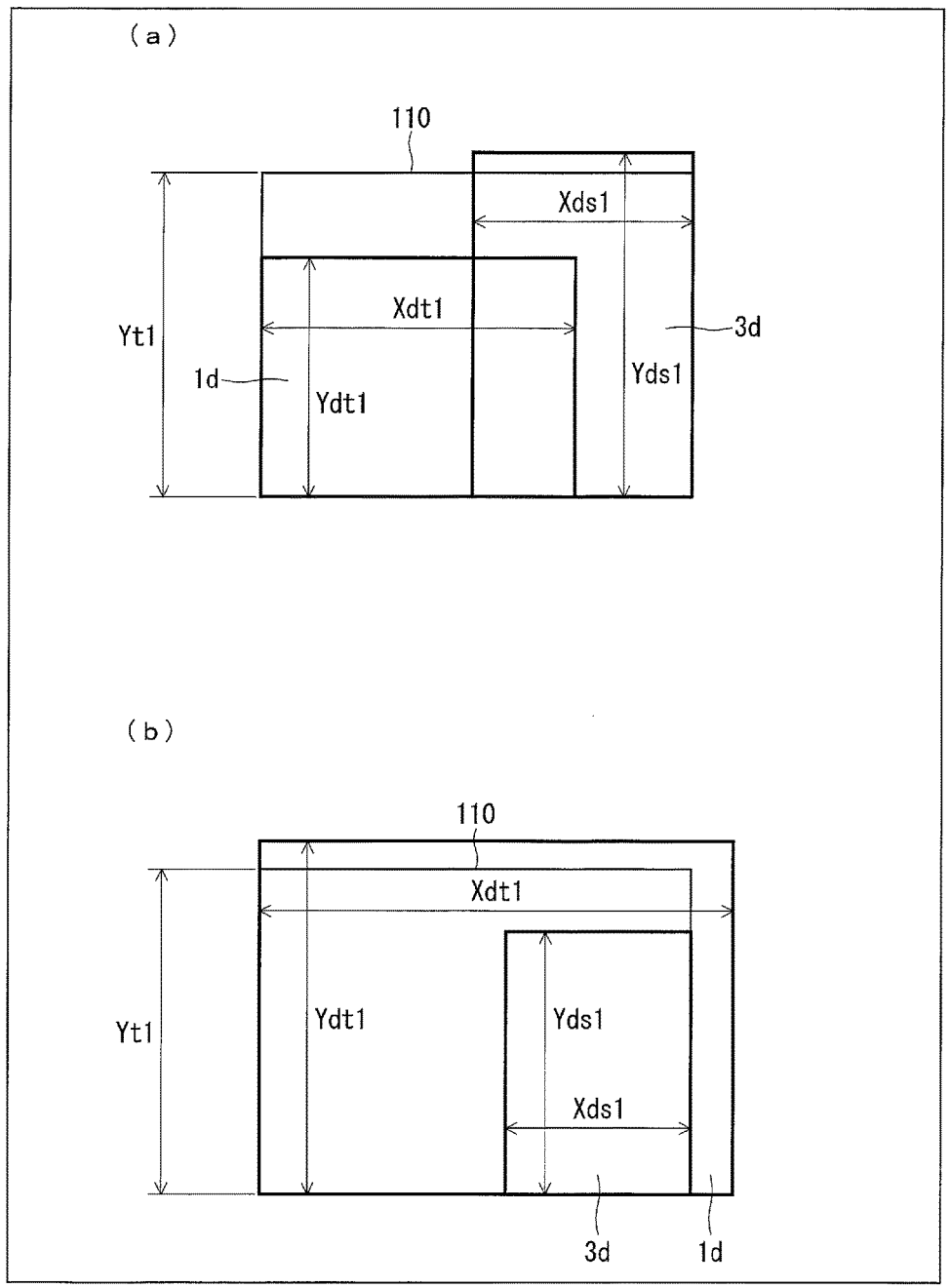
FIG. 17 is a view illustrating an example of a display screen displayed on an LCD in a case F. (a) of FIG. 17 illustrates an example of a display screen displayed in a case where a vertical length of a post-scaling sub-image is greater than that of an LCD, and (b) of FIG. 17 illustrates an example of a display screen displayed in a case where a vertical length of a post-scaling main image is greater than that of the LCD.

FIG. 17 is a view illustrating examples of a display screen displayed on the LCD 110 in the Case F. (a) of FIG. 17 illustrates an example of the display screen in a case where a vertical length of the post-scaling sub-image $3d$ is greater than the vertical length of the LCD 110. (b) of FIG. 17 illustrates an example of the display screen in a case where a vertical length of the post-scaling main image $1d$ is greater than the vertical length of the LCD 110.

Case F1

Case F1 is one of the Case F in which, in the television 10, the post-scaling main image $1d$ is set in advance to have higher priority. In the Case F1, the display size calculating unit 135 calculates a display size adjustment value so that the post-scaling main image $1d$ is displayed on the LCD 110 with higher priority as illustrated in FIG. 18.

Figure 18:
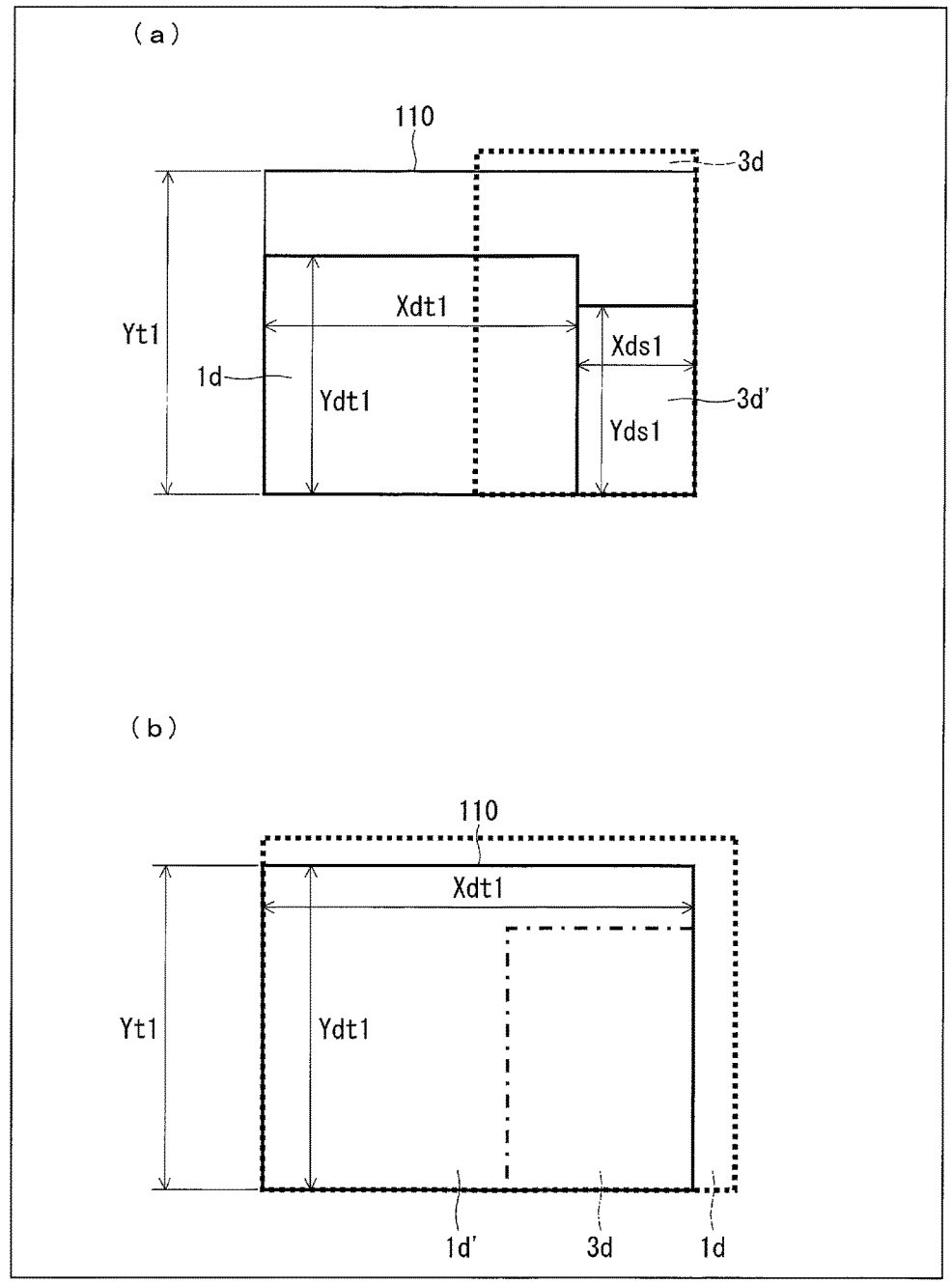
FIG. 18 is a view illustrating an example of a display screen displayed on an LCD in a case F1. (a) of FIG. 18 illustrates an example of a display screen displayed in a case where a post-scaling sub-image has been adjusted while a display size of a post-scaling main image is maintained, and (b) of FIG. 18 illustrates an example of a display screen displayed in a case where a vertical length of a post-scaling main image has been adjusted in accordance with a vertical length of an LCD 110.

FIG. 18 is a view illustrating examples of a display screen displayed on the LCD 110 in the Case F1. (a) of FIG. 18 illustrates an example of the display screen in a case where the post-scaling sub-image $3d$ is adjusted while a display size of the main image $1d$ is maintained. (b) of FIG. 18 illustrates an example of the display screen in a case where a vertical length of the post-scaling main image $1d$ is adjusted in accordance with the vertical length of the LCD 110.

The following description first discusses a display size calculated by the display size calculating unit 135 in a case where respective display sizes of the post-scaling main image $1d$ and the post-scaling sub-image $3d$ are those illustrated in (a) of FIG. 18. The display size calculating unit 135 calculates a display size adjustment value so that a display size of the post-scaling sub-image $3d'$ is adjusted to achieve the followings: that is, in a case where one end of the post-scaling main image $1d$ contacts with one end of the LCD 110 in the longer side direction, (i) one end of the post-scaling sub-image $3d'$ contacts with the other end of the LCD 110 in the longer side direction and (ii) the other end of the post-scaling sub-image ' contacts with the other end of the post-scaling main image $1d$.

On the other hand, in a case where respective display sizes of the post-scaling main image $1d$ and the post-scaling sub-image $3d$ are those illustrated in (b) of FIG. 18, the display size calculating unit 135 calculates a display size adjustment value of a post-scaling main image $2d'$ so that a vertical length of the post-scaling main image $1d'$ becomes equal to the vertical length of the LCD 110.

In the present embodiment, since an aspect ratio of the main image $1a$ is kept equal to that of the post-scaling main image $1d'$, the display size of the post-scaling main image $1d'$, which display size has been adjusted in accordance with the display size adjustment value, is equal to the size of the LCD 110. Consequently, as illustrated in (b) of FIG. 18, only the post-scaling main image $1d'$ is displayed on the LCD 110.

Case F2

Case F2 is one of the Case F in which, in the television 10, the post-scaling sub-image $3d$ is set in advance to have higher priority. In the Case F2, the display size calculating unit 135 calculates a display size adjustment value so that the post-scaling sub-image 3*d* is displayed on the LCD 110 with higher priority, as illustrated in FIG. 19.

Figure 19:
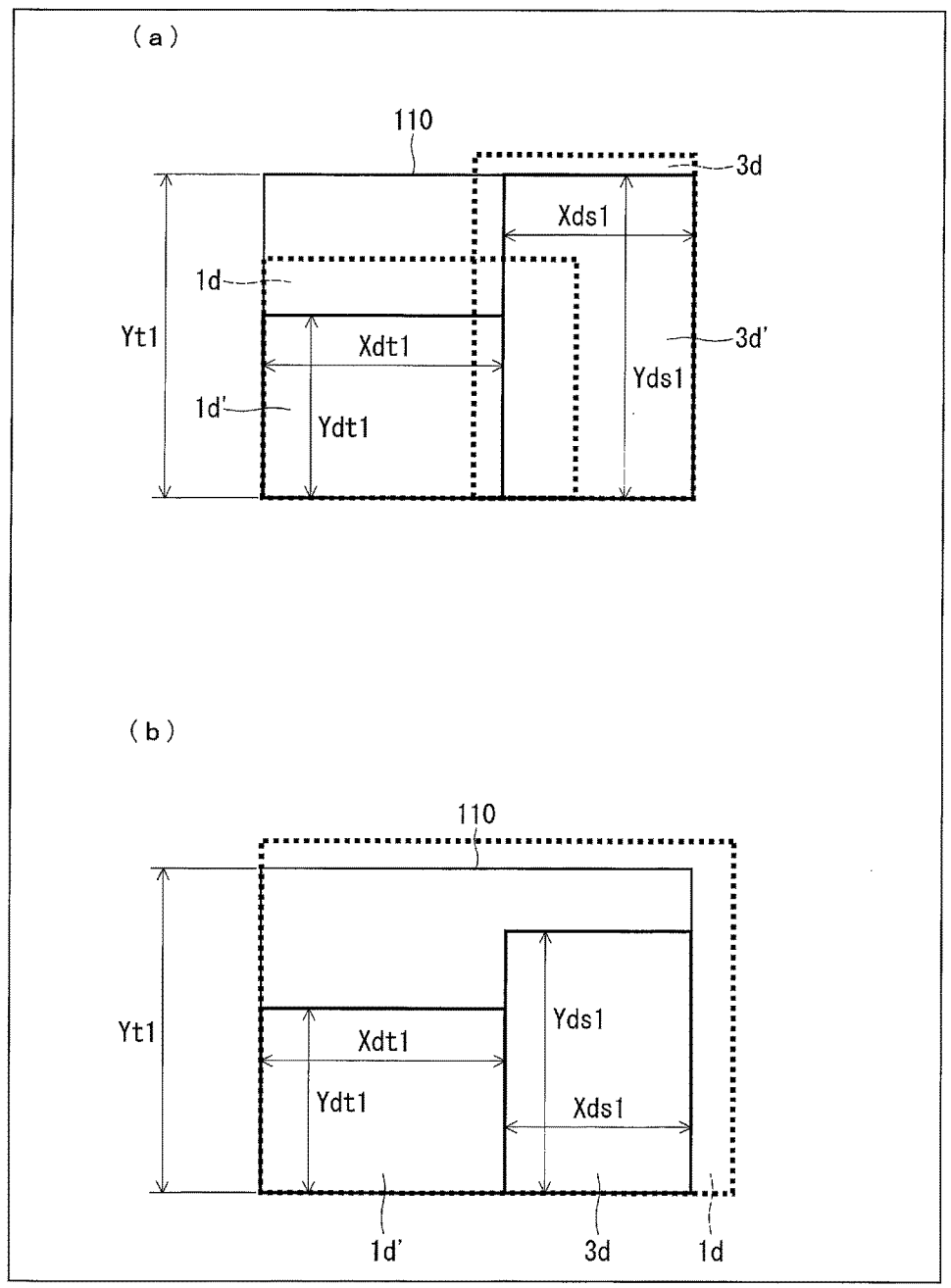
FIG. 19 is a view illustrating an example of a display screen displayed on an LCD in a case F2. (a) of FIG. 19 illustrates an example of a display screen displayed in a case where a vertical length of a post-scaling sub-image is displayed in accordance with a vertical length of an LCD, and (b) of FIG. 19 illustrates an example of a display screen displayed in a case where a post-scaling main image 1$d'$ has been adjusted while a display size of the post-scaling sub-image is maintained.

FIG. 19 is a view illustrating examples of a display screen displayed on the LCD 110 in the Case F2. (a) of FIG. 19 illustrates an example of the display screen in a case where a vertical length of the post-scaling sub-image 3*d'* is displayed in accordance with a vertical length of the LCD 110. (b) of FIG. 19 illustrates an example of the display screen in a case where the post-scaling main image 1*d'* is adjusted while a display size of the post-scaling sub-image 3*d* is maintained.

Case F3

Case F3 is one of the Case F in which, in the television 10, the post-scaling main image 1*d* and the post-scaling sub-image 3*d* are set in advance to have equal priority. In the case F3, the display size calculating unit 135 calculates a display size adjustment value so that the post-scaling main image 1*d* and the post-scaling sub-image 3*d* are adjusted in display size to be displayed on the LCD 110 as the post-scaling main image 1*d'* and the post-scaling sub-image 3*d'*, respectively, as illustrated in FIG. 20.

Figure 20:
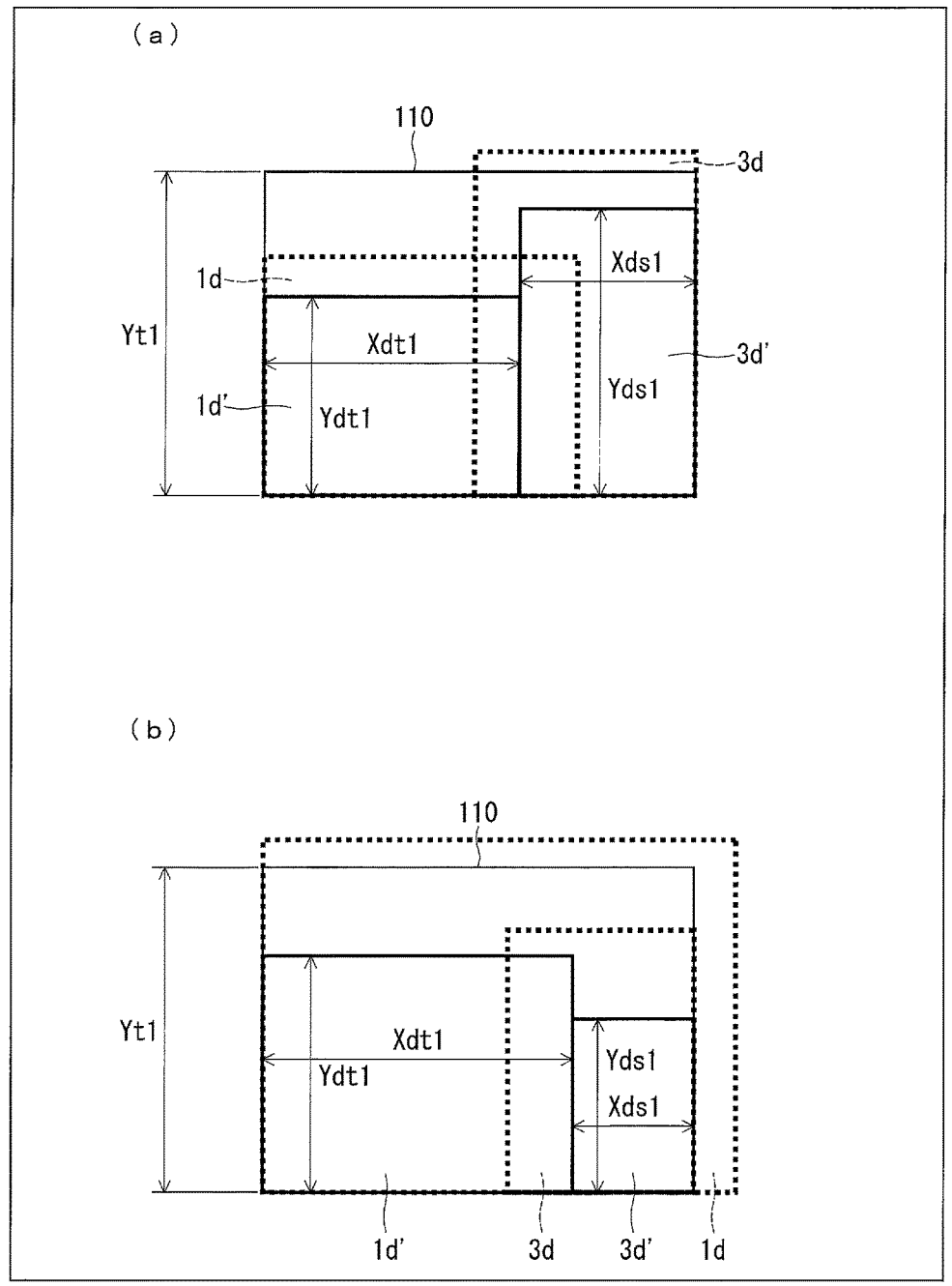
FIG. 20 is a view illustrating an example of a display screen displayed on an LCD in a case F3. (a) of FIG. 20 illustrates an example of a display screen displayed in a case where a post-scaling main image and a post-scaling sub-image have been adjusted by being scaled down at an equal scaling down ratio, and (b) of FIG. 20 illustrates another example of a display screen displayed in a case where a post-scaling main image and a post-scaling sub-image have been adjusted by being scaled down at an equal scaling down ratio.

FIG. 20 is a view illustrating examples of a display screen displayed on the LCD 110 in the Case F3. (a) of FIG. 20 is an example of the display screen in a case where the post-scaling main image 1*d* and the post-scaling sub-image 3*d* are adjusted by being scaled down with the same scale-down ratio. (b) of FIG. 20 is another example of the display screen in a case where the post-scaling main image 1*d* and the post-scaling sub-image 3*d* are adjusted by being scaled down with the same scale-down ratio.

As described above, in the Cases D through F, the display size calculating unit 135 calculates respective display size adjustment values for the post-scaling main image and the post-scaling sub-image in accordance with priority set in advance. The display size calculating unit 135 supplies, to the video processing circuit 107, display size information including the calculated display size adjustment values and respective display sizes of the post-scaling main image and the post-scaling sub-image. The video processing circuit 107 carries out a scaling process on the main image and the sub-image in accordance with the display size information (i.e., the display sizes and the display size adjustment values) supplied from the display size calculating unit 135.

Consequently, even in the Cases D through F, the television 10 can cause the post-scaling main image and the post-scaling sub-image to be displayed on the LCD 110 in such a manner that the post-scaling main image and the post-scaling sub-image are adjacent to each other, as above described.

From this, in the Case D, the television 10 can display the post-scaling main image and the post-scaling sub-image without a gap between the post-scaling main image and the post-scaling sub-image. In the Case E, the television 10 can display the post-scaling main image and the post-scaling sub-image which do not even partially overlap with each other. In the Case F, the television 10 can cause the entire post-scaling main image and the entire post-scaling sub-image to be displayed on the LCD 110.

In the present embodiment, the description has been provided as to the configuration in which the post-scaling main image 1*d* and the post-scaling sub-image 3*d* are displayed on the LCD 110 in such a manner that both of the post-scaling main image 1*d* and the post-scaling sub-image 3*d* contact with one longer side of the LCD 110. However, the present invention is not limited to this configuration. For example, it is possible to employ a configuration in which the post-scaling main image 1*d* and the post-scaling sub-image 3*d* are displayed on the LCD 110 in such a manner that centers of the respective vertical lengths of the post-scaling main image 1*d* and the post-scaling sub-image 3*d* are located on the same level as a center of shorter sides of the LCD 110, as illustrated in FIG. 21.

Figure 21:
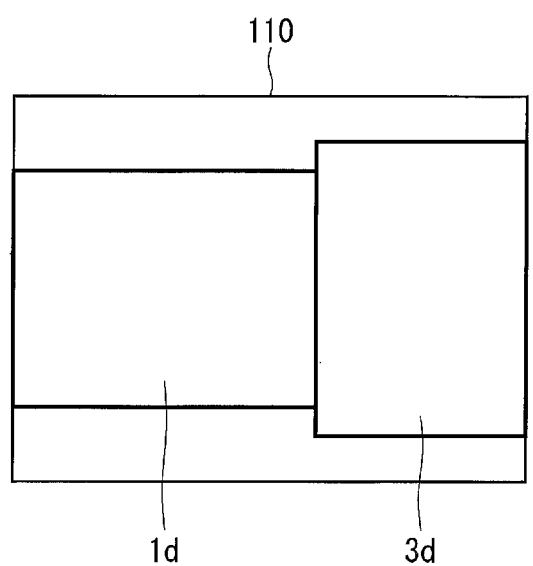
FIG. 21 is a view illustrating another example of a display screen displayed on an LCD of a television in accordance with an embodiment of the present invention.

FIG. 21 is a view illustrating another example of a display screen displayed on the LCD 110 of the television 10 in accordance with the present embodiment.

As described above, the television 10 can display, as with the case of a sub-image, characters in a main image in such a manner that the characters each have a size suitable for a distance from the television 10 to the user on the basis of (1) a size of the smallest character in the main image and (2) the distance from the television 10 to the user. Furthermore, the television 10 can display a main image in a display size which has been adjusted in such a manner that characters in the main image each have a size that further conforms to a user's preferable size on the basis of (3) a standard character size, regardless of the distance from the television 10 to the user.

Furthermore, the display size calculating unit 135 calculates, in accordance with respective priorities of the post-scaling sub-image and the post-scaling main image, a display size adjustment value for further adjusting the display size of at least one of the post-scaling sub-image and the post-scaling main image (i.e., sub-image and main image whose display sizes have been adjusted). Furthermore, the video processing circuit 107 further adjusts the display size of at least one of the post-scaling sub-image and the post-scaling main image on the basis of the display size adjustment value.

This allows the television 10 to display the sub-image and the main image in respective further appropriate display sizes in accordance with priorities of the input image and the content.

Furthermore, in the Cases E and F as with the Cases B and C, the television 10 may display a caution indicating that a size of the smallest character in at least one of the post-scaling main image and the post-scaling sub-image is smaller than a size optimal for the user. Furthermore, the television 10 may display a character in a size optimal for the user so that the user can compare the smallest character in the post-scaling sub-image with the character in the size optimal for the user.

[Configuration of Character Recognizing Unit]

With reference to FIGS. 22 through 25, the following description will discuss (i) a character recognizing process carried out by the character recognizing unit 132 of the controlling unit 118 included in the television 10 in accordance with the present embodiment and (ii) a configuration of the character recognizing unit 132 for carrying out the character recognizing process. FIG. 22 is a block diagram illustrating the configuration of the character recognizing unit 132 of the control unit 118 included in the television 10 in accordance with the present embodiment.

As illustrated in FIG. 22, the character recognizing unit 132 in accordance with the present embodiment includes a character region detecting unit (character region detecting section) 141, a smallest character region detecting unit (character size detecting section) 142, and a smallest character size detecting unit (character size detecting section) 143.

(Character Region Detecting Unit)

The character region detecting unit 141 detects a region including a character (character region) from a sub-image supplied from the portable terminal 30. Furthermore, the character region detecting unit 141 detects, as one character region, each of a plurality of rows or a plurality of columns included in a character region. A process for detecting a character region from a sub-image can be carried out with a well-known technique and therefore an explanation thereof is omitted here.

(Smallest Character Region Detecting Unit)

The smallest character region detecting unit 142 detects a character region including the smallest character (smallest character region) from the character region detected by the character region detecting unit 141.

The smallest character region detecting unit 142 calculates sizes of the respective character regions detected by the character region detecting unit 141. The size of each character region (horizontal length (in row direction) Xi, vertical length (in column direction) Yi, i indicates a character region and 1≤i) can be calculated by coordinate calculations below:

$Xi$=($X$-coordinate at upper right corner of character region $i$)−($X$-coordinate at upper left corner of character region $i$)

$Yi$=($Y$-coordinate at upper left corner of character region $i$)−($Y$-coordinate at lower left corner of character region $i$)

The smallest character detecting unit 142 detects, as the smallest character region, a region with the smallest horizontal length Xi or the smallest vertical length Yi, in accordance with the calculated sizes of the respective character regions.

For example, the smallest character region detecting unit 142 first detects a character region with the smallest horizontal length Xi and a character region with the smallest vertical length Yi out of the character regions detected by the character region detecting unit 141. Then, the smallest character region detecting unit 142 compares (i) a value of the horizontal length Xi of the character region with the smallest horizontal length Xi with (ii) a value of the vertical length Yi of the character region with the smallest vertical length Yi, and extracts, as the smallest character region, one of the character regions which one has a smaller value. Thus, the smallest character region detecting section 142 detects the smallest character region. Of course, the present invention is not limited to this.

(Smallest Character Size Detecting Unit)

The smallest character size detecting unit 143 detects a size of the smallest character (smallest character size) in the smallest character region extracted by the smallest character region detecting unit 142.

Specifically, in a case where the horizontal length Xi of the smallest character region extracted by the smallest character region detecting unit 142 is smaller than the vertical length Yi thereof, the smallest character size detecting unit 143 detects the value of the horizontal length Xi as the smallest character size. In a case where the vertical length Yi of the smallest character region is smaller than the horizontal length Xi thereof, the smallest character size detecting unit 143 detects the value of the vertical length Yi as the smallest character size.

That is, the smallest character size detecting unit 143 detects, as the smallest character size, the value of a smaller one of the horizontal length Xi and the vertical length Yi of the smallest character region detected by the smallest character region detecting unit 142.

[Character Recognizing Process]

Figure 23:
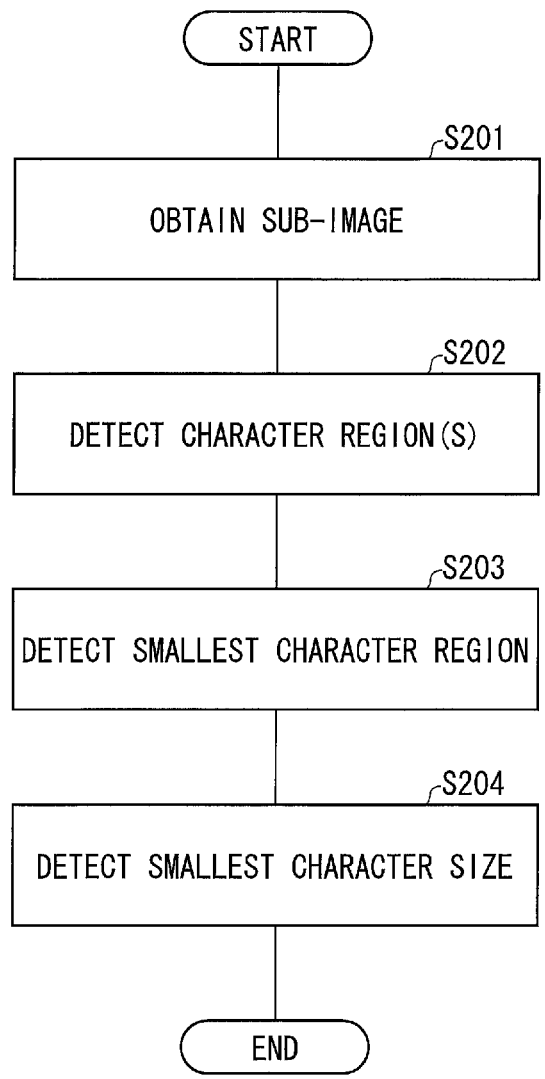
FIG. 23 is a flowchart illustrating a flow of processes to recognize characters in accordance with an embodiment of the present invention.
Figure 24:
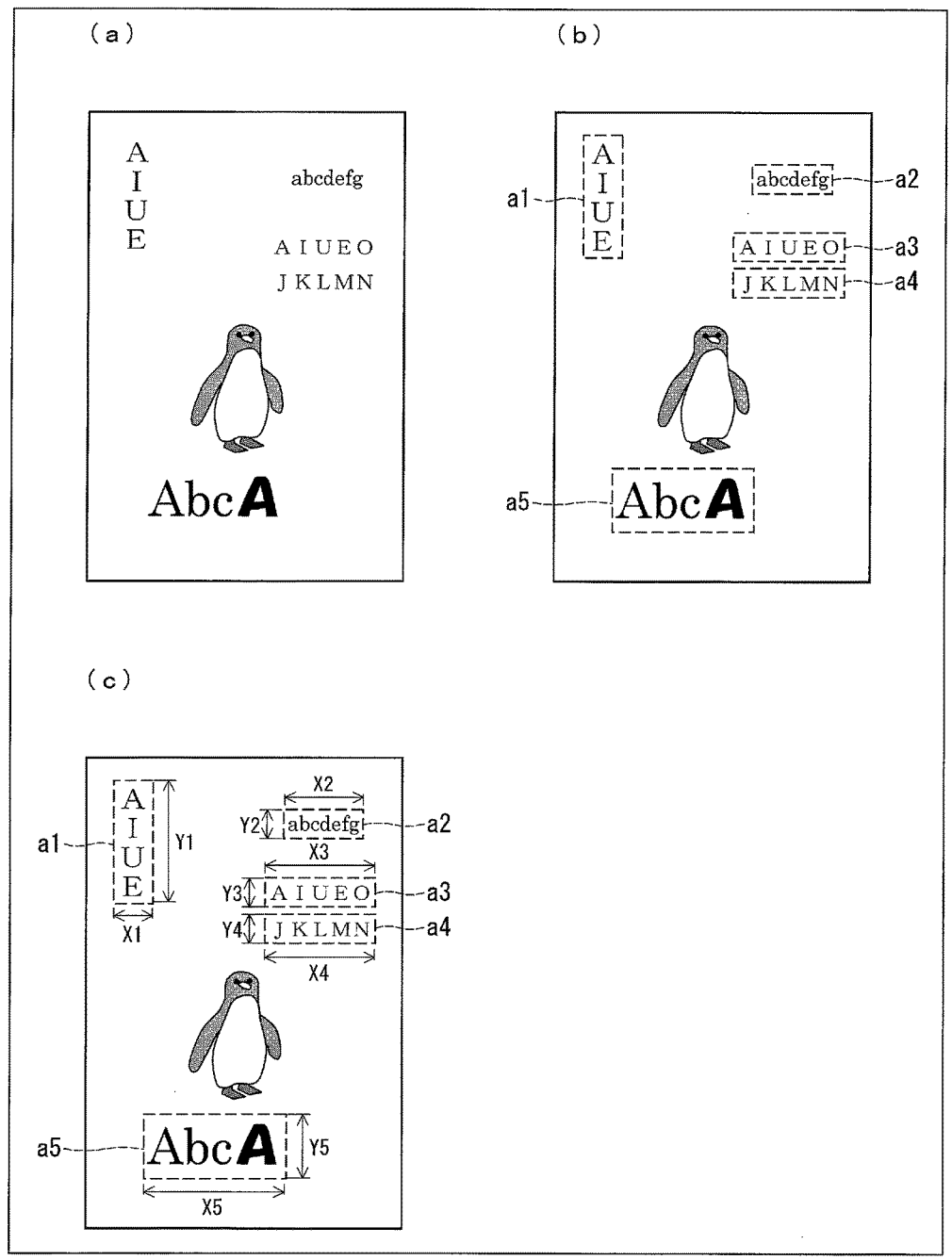
FIG. 24 is a view schematically illustrating processes to recognize characters in accordance with an embodiment of the present invention. (a) of FIG. 24 illustrates an example of a sub-image supplied from a portable terminal, (b) of FIG. 24 illustrates an example of a character region which is detected by a character region detecting unit, and (c) of FIG. 24 illustrates an example of a size of a character region calculated by a smallest character size detecting unit.
Figure 25:
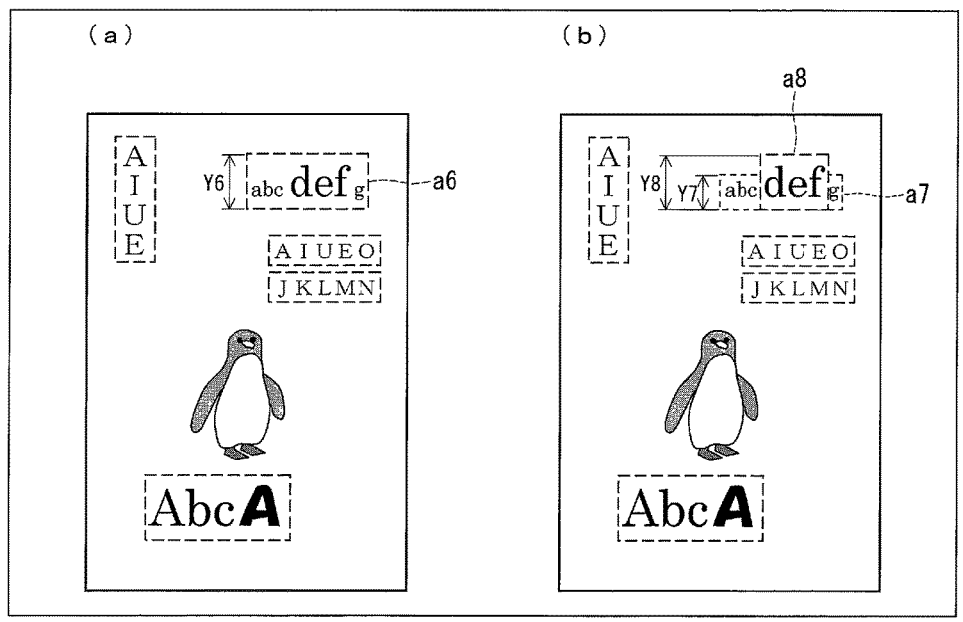
FIG. 25 is a view illustrating another example of processes to recognize characters in accordance with an embodiment of the present invention. (a) of FIG. 25 illustrates an example of a size of a character region calculated by a smallest character size detecting unit, and (b) of FIG. 25 illustrates another example of a size of a character region calculated by the smallest character size detecting unit.

With reference to FIGS. 23 through 25, the following description will discuss a character recognizing process carried out by the character recognizing unit 132 in accordance with the present embodiment. FIG. 23 is a flowchart showing a flow of the character recognizing process in accordance with the present embodiment.

FIG. 24 is a view schematically illustrating the character recognizing process. (a) of FIG. 24 illustrates an example of a sub-image. (b) of FIG. 24 illustrates examples of character regions detected by the character region detecting unit 141. (c) of FIG. 24 illustrates examples of respective sizes of character regions which sizes are calculated by the smallest character size detecting unit 143.

As illustrated in FIG. 23, in a case where the character region detecting unit 141 has obtained a sub-image illustrated in, for example, (a) of FIG. 24 (step S201), the character region detecting unit 141 detects character regions from the sub-image (step S202). In this case, the character region detecting unit 141 detects character regions a1 through a5 from the sub-image, as illustrated in (b) of FIG. 24.

In a case where the character region detecting unit 141 has detected the character regions, the smallest character region detecting unit 142 detects the smallest character region out of the character regions a1 through a5 (step S203). In this step, the smallest character region detecting unit 142 calculates sizes (horizontal lengths X1 through X5 and vertical lengths Y1 through Y5) of the respective character regions a1 through a5 as illustrated in (c) of FIG. 24. Then, the smallest character region detecting unit 142 detects, as the smallest character region, a character region with the smallest one of the calculated horizontal lengths X1 through X5 and the calculated vertical lengths Y1 through Y5.

In a case where the smallest character region detecting unit 142 has detected the smallest character region, the smallest character size detecting unit 143 detects the smallest character size from the smallest character region (step S204).

With the above configuration, the smallest character size detecting unit 143 can detect, as a size of the smallest character included in a sub-image, a shortest one of a horizontal length (in row direction) and a vertical length (in column direction) of the smallest character region detected by the smallest character region detecting unit 142 without detecting all the characters included in the sub-image.

Accordingly, it is unnecessary for the television 10 to carry out a process with a large throughput, i.e. a process of detecting all the characters included in a sub-image and further detecting sizes of the respective detected characters, in order to detect the smallest character size. Consequently, the television 10 can reduce a processing time in relation to detection of the smallest character size.

As illustrated in FIG. 25, there is a case where, in a sub-image, one row (or one column) of a character region includes characters with different sizes. FIG. 25 is a view illustrating another example of the character recognizing process in accordance with the present embodiment. (a) of FIG. 25 illustrates an example of a size of a character region which size is calculated by the smallest character size detecting unit 143. (b) of FIG. 25 illustrates another examples of sizes of respective character regions which sizes are calculated by the smallest character size detecting unit 143.

In such a case, as illustrated in (a) of FIG. 25, the character region detecting unit 141 may detect one character region a6, and the smallest character region detecting unit 142 may calculate a size (vertical length Y6) of the one character region a6. Alternatively, as illustrated in (b) of FIG. 25, the character region detecting unit 141 may detect, with respect to characters with different sizes, respective different character regions a7 and a8, and the smallest character region detecting unit 142 may detect sizes (vertical lengths Y7 and Y8) of the respective character regions a7 and a8.

Figure 26:
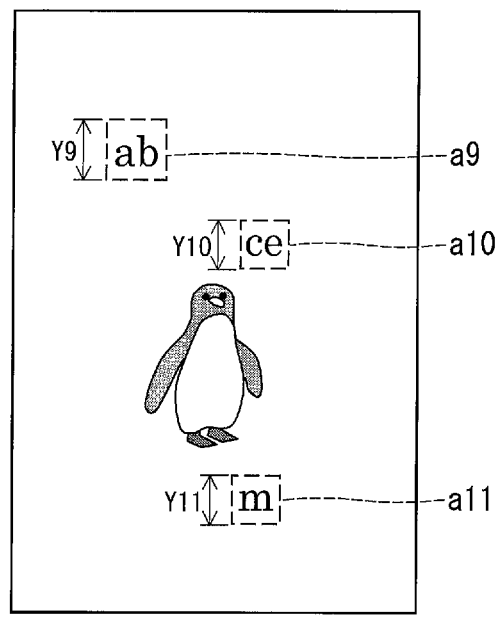
FIG. 26 is a view illustrating still another example of processes to recognize characters in accordance with an embodiment of the present invention.

Furthermore, as illustrated in FIG. 26, there is a case where, in a sub-image, character regions in which characters are in the same font and in the same font size include (i) a character region a9 including a vertically long character and (ii) character regions a10 and a11 which do not include a vertically long character. FIG. 26 is a view illustrating still another example of the character recognizing process in accordance with the present embodiment.

In such a case also, as illustrated in FIG. 26, the character region detecting unit 141 may detect the character regions a9 through a11 as different character regions, and the smallest character region detecting unit 142 may detect sizes (vertical lengths Y9 through Y11) of the respective character regions a9 through a11. In this case, Y9>Y10=Y11, and therefore the smallest character region detecting unit 142 may detect, as the smallest character region, one of the character regions a10 and a11 which do not include a vertically long character, or may detect, as the smallest character region, both of the character regions a10 and a11.

(Other Configuration)

The controlling unit (judging section) 118 in accordance with the present embodiment may determine whether a sub-image is a moving image or a still image. In this configuration, (i) the character recognizing unit 132 (to be more specific, the character region detecting unit 141) may carry out the character recognizing process plural times continuously or discretely in a case where the controlling unit 118 determines that the sub-image is a moving image, and (ii) the character recognizing unit 132 may carry out the character recognizing process only once at a time point when the sub-image is obtained in a case where the controlling unit 118 determines that the sub-image is a still image.

From this, in a case where the sub-image is a still image, the character recognizing unit 132 can stop carrying out the character recognizing process after carrying out the character recognizing process once. This allows reduction in power consumption required for the character recognizing process.

Furthermore, the television 10 in accordance with the present embodiment may employ a configuration in which the process of detecting a character region by the character region detecting unit 141 and the process of detecting a smallest character size by the smallest character size detecting unit 143 are carried out alternately at, for example, predetermined time intervals. For example, in the television 10, during a period between 0 second and 2 seconds after a sub-image started to be supplied, only the process of detecting a character region may be carried out by the character region detecting unit 141, and during a period between 2 seconds and 4 seconds, only the process of detecting a smallest character size may be carried out by the smallest character size detecting unit 143, and subsequently these processes may be alternately carried out at time intervals of two seconds (smallest character size detecting method 1 in carrying out alternate processes).

Alternatively, the television 10 may employ a configuration in which the process of detecting a character region and the process of detecting a smallest character size are carried out alternately at predetermined time intervals in such a manner that the process of detecting a character region and the process of detecting a smallest character size are carried out for different frames constituting a sub-image (smallest character size detecting method 2 in carrying out alternate processes).

For example, during a period between 0 second and 2 seconds after a sub-image started to be supplied, the character region detecting unit 141 carries out only the process of detecting a character region in a frame (character region detection target frame) supplied at the time point when the sub-image started to be supplied (i.e. the time point of 0 second). Subsequently, during a period between 2 seconds and 4 seconds after the sub-image started to be supplied, the smallest character size detecting unit 143 carries out only the process of detecting a smallest character size in a frame (character size detection target frame) supplied at a time point that is 2 seconds after the sub-image started to be supplied.

In this case, the smallest character size detecting unit 143 carries out the process of detecting a smallest character size only on a region in the character size detection target frame which region corresponds to a character region detected in the character region detection target frame by the character region detecting unit 141. Subsequently, the television 10 may carry out these two processes alternately at intervals of two seconds.

As described above, the process of detecting a character region and the process of detecting a smallest character size are carried out alternately at predetermined time intervals in such a manner that the process of detecting a character region and the process of detecting a smallest character size are carried out for different frames constituting a sub-image. This allows the television 10 to (i) detect, even when a smallest character size ratio in the sub-image has changed, a changed smallest character size, and (ii) shorten a time to cause the LCD 110 to display a post-scaling sub-image reflecting a change in the smallest character size.

In a case where a character region detected in the character region detection target frame by the character region detecting unit 141 or a size of a character in the character region changes in the character size detection target frame, it is preferable for the television 10 to switch between the smallest character size detection method 1 in carrying out the alternate processes and the smallest character size detection method 2 in carrying out the alternate processes in accordance with Cases G and H below.

(Case G)

Case G is a case where a region in the character size detection target frame which region corresponds to a character region detected in the character region detection target frame includes a smallest character. In the Case G, the television 10 may carry out the smallest character size detection method 2 in carrying out the alternate processes.

This allows the television 10 to cause a display size of the post-scaling sub-image to more swiftly reflect a change in smallest character size in the character region detected in the character region detection target frame by the character region detecting unit 141.

(Case H)

Case H is a case where a region in the character size detection target frame which region corresponds to a character region detected in the character region detection target frame does not include a smallest character. In the Case H, the television 10 may carry out the smallest character size detection method 1 in carrying out the alternate processes.

This allows the television 10 to avoid a case in which a wrong smallest character size is detected by a character size detecting process carried out on a character region detected in the character region detection target frame, although the character region detected in the character region detection target frame does not include a smallest character.

Examples of the Case H include Cases H1 and H2 below. The Case H1 is a case where the smallest character is no longer included in (disappears from) a region in the character size detection target frame which region corresponds to the character region detected in the character region detection target frame, and the smallest character is included in other region. The Case H2 is a case where a character included in a region in the character size detection target frame which region corresponds to the character region detected in the character region detection target frame is no longer the smallest character, and the smallest character is included in other region.

A method for determining whether the television 10 is in the Case G or the Case H can be, for example, a method in which the controlling unit 118 determines that the television 10 is in the Case H when frames supplied immediately before the character region detection target frame include a predetermined number or more frames in each of which a character region has changed as compared with a frame immediately before that frame. Examples of the predetermined number include, but not limited to, (i) half the number of the frames supplied immediately before the character region detection target frame and (ii) a total of the number of the frames supplied immediately before the character region detection target frame.

Furthermore, as described above, the smallest character size detecting unit 143 can detect a smallest character size from a sub-image. Accordingly, the television 10 can detect a smallest character size from a sub-image regardless of whether information indicative of a size of a character in the sub-image is supplied together with the sub-image from the portable terminal 30. Consequently, even when the information indicative of a size of a character in the sub-image is not supplied together with the sub-image from the portable terminal 30, the television 10 can carry out the scaling process on the sub-image so that the sub-image is displayed in a display size calculated in accordance with the detected smallest character size.

With the above configuration, the television 10 can detect the size of a smallest character regardless of the type of the portable terminal 30. Examples of the type of the portable terminal 30 include various terminals such as mobile phones, smart phones, and tablet terminals. However, the type of the portable terminal 30 is not limited to them, and may be different types of the same one of the various terminals.

The character recognizing unit 132 in accordance with the present modification example may carry out the character recognizing process not on the entire sub-image but on a particular region of the sub-image, for example, on a central part of the sub-image. This allows a range of the character recognizing process carried out by the character recognizing unit 132 to be narrowed, and it is therefore possible to increase a processing speed of the character recognizing process.

The character recognizing unit 132 in accordance with the present modification example does not necessarily need to detect all sizes of characters included in each character region. For example, the character recognizing unit 132 may detect only a character size of a headmost character out of characters included in each of character regions, and detect the smallest character size out of the detected character sizes of the headmost characters in the respective character regions.

The character recognizing unit 132 in accordance with the present modification example may be arranged such that, in a case where a sub-image is a moving image, the character recognizing unit 132 does not carry out the character recognizing process for each of frames supplied as the sub-image. For example, the character recognizing unit 132 may carry out the character recognizing process at predetermined time intervals (e.g. 1 sec.) or every predetermined number of frames (e.g. 50 frames).

The character recognizing unit 132 in accordance with the present modification example may be arranged such that the character recognizing unit 132 determines an amount of a change in sub-image on the basis of a difference between continuous two frames and, only in a case where the amount of the change is equal to or greater than a predetermined value, the character recognizing unit 132 carries out the character recognizing process.

The character recognizing unit 132 in accordance with the present embodiment may be arranged such that a frequency of the character recognizing process carried out by the character recognizing unit 132 is arbitrarily set by the user via the remote controller 20, etc.

In the present embodiment, in a case where a sub-image does not include a character, the display size calculating unit 135 cannot calculate a display size corresponding to a smallest character size. In such a case, the video processing circuit 107 may carry out the scaling process on the sub-image so that the sub-image is displayed in a predetermined display size, as with the case where the switching unit 131 is in the OFF-state. Alternatively, the video processing circuit 107 may carry out the scaling process on the sub-image so that a post-scaling sub-image is displayed in a size in which the sub-image is displayed on the portable terminal 30.

The character recognizing unit 132 in accordance with the present embodiment may be arranged such that the character recognizing unit 132 carries out the character recognizing process only on a character region including a predetermined character. An example of the predetermined character is a character whose ratio of a character size relative to a sub-image (or whose character size itself) is determined in advance. For example, the predetermined character may be a character which is predetermined to be used in a screen in a case where a sub-image is an execution screen of an application, a menu screen, a screen for displaying an EPG, or the like.

As described above, in the case where the character recognizing process is carried out only on the character region including the predetermined character, it is unnecessary to carry out the character recognizing process on the entire sub-image. This allows the character recognizing unit 132 to carry out the character recognizing process at a higher speed.

Alternatively, it is possible to employ a configuration in which the character recognizing process is carried out only on a character region including a predetermined character only in a case where a character region recognizing process and a display size calculating process require a long time, e.g., only in a case where the sub-image includes a large number of character regions.

Modification Example

In the present embodiment, the description has been provided as to the configuration in which the smallest character region detecting unit 142 detects a smallest character region and the smallest character size detecting unit 143 detects a smallest character size. However, the present invention is not limited to this.

For example, it is possible to employ a configuration in which the smallest character size detecting unit 143 (i) detects sizes of characters included in each of character regions detected by the character region detecting unit 141, and (ii) detects, as a smallest character size, a size of the smallest character out of the detected sizes of characters.

In this configuration, the character recognizing unit 132 may include only the character region detecting unit 141 and the smallest character size detecting unit 143. In other words, the character region detecting unit 141 in accordance with the present modification example may detect character regions from a sub-image, and the smallest character size detecting unit 143 in accordance with the present modification example may detect a smallest character size out of only characters included in the character regions.

Figure 27:
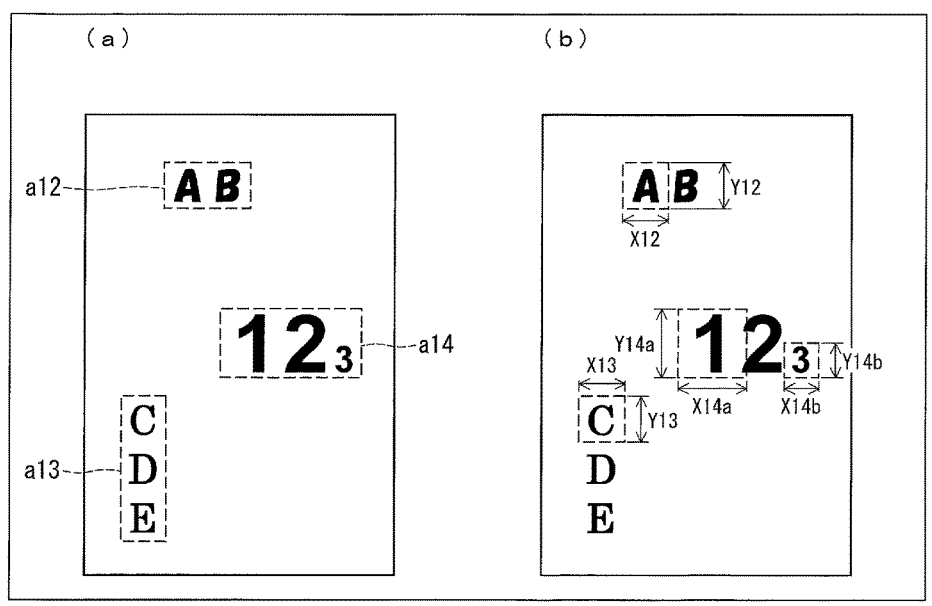
FIG. 27 is a view illustrating an example of a sub-image in accordance with a modification example of an embodiment of the present invention. (a) of FIG. 27 illustrates an example of a character region detected by a character region detecting unit, and (b) of FIG. 27 illustrates an example of a character size detected by a smallest character size detecting unit.

With reference to FIG. 27, the following description will discuss processes carried out by the character region detecting unit 141 and the smallest character size detecting unit 143 in accordance with the present modification example. FIG. 27 is a view illustrating an example of a sub-image in accordance with the present modification example. (a) of FIG. 27 illustrates examples of character regions detected by the character region detecting unit 141. (b) of FIG. 27 illustrates examples of character sizes detected by the smallest character size detecting unit 143.

As illustrated in (a) of FIG. 27, the character region detecting unit 141 detects character regions a12 through a14 from a sub-image. The smallest character size detecting unit 143 detects a size of each of characters included in the character regions a12 through a14.

In this configuration, the smallest character size detecting unit 143 detects a character size X12/Y12 from the character region a14, and a character size X13/Y13 from the character region a13. Furthermore, the smallest character size detecting unit 143 detects two different sizes X14a/Y14a and X14b/Y14b from the character region a14.

The smallest character size detecting unit 143 detects a smallest character size (character size X14a/Y14b in the example illustrated in (b) of FIG. 27) out of the detected character sizes.

With the above configuration, the television 10 in accordance with the present modification example can detect, by the character recognizing unit 132 included in the controlling unit 118, a size of a character included in a sub-image. From this, the television 10 can detect a size of a character included in a sub-image regardless of the portable terminal 30 which supplies the sub-image to the television 10.

Embodiment 2

In the Embodiment 1, the description has been provided as to the configuration in which a smallest character size of characters included in a sub-image supplied from the portable terminal 30 is detected by the character recognizing unit 132 included in the television 10. However, the present invention is not limited to this configuration.

Figure 28:
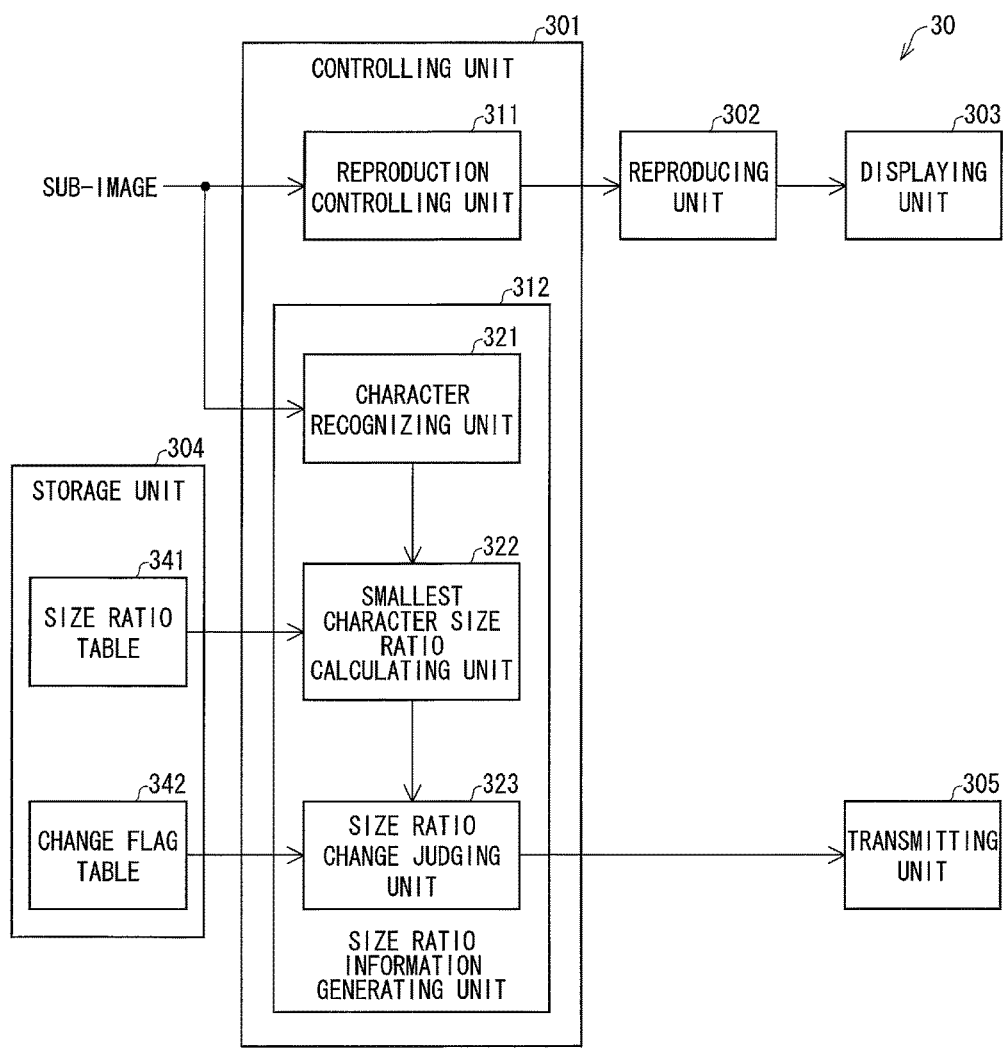
FIG. 28 is a block diagram illustrating a configuration of main units of a portable terminal in accordance with another embodiment of the present invention.

In the present embodiment, with reference to FIG. 28, a description will be provided as to a configuration in which the portable terminal 30 supplies, to the television (display apparatus) 10, size ratio data indicative of a ratio of a smallest character size to a size of a sub-image (smallest character size ratio), together with the sub-image (display image). FIG. 28 is a block diagram illustrating main units of the portable terminal 30 in accordance with the present embodiment.

For convenience, members having the same functions as those in the television 10 in accordance with the Embodiment 1 are given the same reference signs and explanations thereof are omitted. In the present embodiment, differences from the Embodiment 1 are mainly described.

In the present embodiment, a description will be provided as to an example case where a sub-image is a moving image including a plurality of frames.

[Configuration of Portable Terminal]

As illustrated in FIG. 28, the portable terminal 30 includes a controlling unit 301, a reproducing unit 302, a displaying unit 303, a storage unit 304, and a transmitting unit (outputting section) 305.

The controlling unit 301 has overall control of individual units of the portable terminal 30. As illustrated in FIG. 28, the controlling unit 301 includes a reproduction controlling unit 311 and a size ratio information generating unit 312. The reproduction controlling unit 311 controls driving of the reproducing unit 302 so that the displaying unit 303 displays a sub-image.

The size ratio information generating unit 312 generates, with reference to a table stored in the storage unit 304, size ratio data indicative of a smallest character size ratio from a sub-image and a character in the sub-image, associates the size ratio data with the sub-image, and supplies the size ratio data associated with the sub-image to the transmitting unit 305. The size ratio information generating unit 312 and the table stored in the storage unit 304 will be detailed later.

Under control of the reproduction controlling unit 311 of the controlling unit 301, the reproducing unit 302 causes the displaying unit 303 to display a sub-image. An example of the displaying unit 303 is an LCD. However, the displaying unit 303 is not limited in particular.

The transmitting unit 305 transmits, to the display apparatus represented by the television 10, (i) the sub-image and (ii) the size ratio data associated with the sub-image, which have been supplied from the size ratio information generating unit 312. Transmission of the sub-image and the size ratio data by the transmitting unit 305 may be made via wired communications using an HDMI cable (not illustrated) etc. or via wireless communications using Bluetooth (Registered Trademark), etc.

[Configuration of Size Ratio Information Generating Unit]

With reference to FIG. 28, the following description will discuss details of (i) the size ratio information generating unit 312 included in the controlling unit 301 and (ii) the storage unit 304. As illustrated in FIG. 28, the size ratio information generating unit 312 includes a character recognizing unit (detecting section) 321, a smallest character size ratio calculating unit (size ratio calculating section) 322, and a size ratio change judging unit (judging section) 323. Furthermore, in the storage unit 304, a size ratio table 341 and a change flag table 342 are stored.

(Character Recognizing Unit)

The character recognizing unit 321 recognizes characters included in a sub-image displayed by the displaying unit 303, and detects a smallest character size out of the recognized characters. The character recognizing unit 321 of the portable terminal 30 in accordance with the present embodiment detects a smallest character size in a manner similar to that of the character recognizing process carried out by the character recognizing unit 132 included in the television 10 in accordance with the Embodiment 1. Therefore, a detailed explanation thereof is omitted here.

The character recognizing unit 321 supplies the detected smallest character size, together with the sub-image, to the smallest character size ratio calculating unit 322.

(Smallest Character Size Ratio Calculating Unit and Size Ratio Table)

The smallest character size ratio calculating unit 322 calculates a ratio of the smallest character size to a size of the sub-image (smallest character size ratio) on the basis of the smallest character size supplied from the character recognizing unit 321. The smallest character size ratio calculating unit 322 included in the portable terminal 30 in accordance with the present embodiment calculates the smallest character size ratio (character size ratio) in a manner similar to that of calculation of the smallest character size ratio by the display size calculating unit 135 included in the television 10 in accordance with the Embodiment 1, and therefore a detailed explanation thereof is omitted.

The smallest character size ratio calculating unit 322 reads out size ratio data indicative of the calculated smallest character size ratio from the size ratio table 341 (illustrated in FIG. 29) stored in the storage unit 304.

FIG. 29 is a view illustrating an example of the size ratio table 341 in accordance with the present embodiment. As illustrated in FIG. 29, the size ratio table 341 is a table in which a smallest character size ratio (Xs2/Xs1) in a horizontal length and a smallest character size ratio (Ys2/Ys1) in a vertical length are associated with size ratio data (8-bit signal) indicative of these smallest character size ratios.

The smallest character size ratio calculating unit 322 supplies, to the size ratio change judging unit 323, (i) the calculated smallest character size ratio and (ii) the size ratio data indicative of the smallest character size ratio, together with the sub-image.

(Size Ratio Change Judging Unit and Change Flag Table)

The size ratio change judging unit 323 judges whether the smallest character size ratio supplied from the smallest character size ratio calculating unit 322 is changed from the smallest character size ratio in a sub-image which has been supplied in a one-previous frame. In a case where at least one of the smallest character size ratio in the horizontal length and the smallest character size ratio in the vertical length, each in the sub-image which has been supplied in the one-previous frame, is changed, the size ratio change judging unit 323 may judge that the smallest character size ratio has changed.

The size ratio change judging unit 323 reads out, from the change flag table (flag table) 342 (illustrated in FIG. 30) stored in the storage unit 304, a flag indicative of a result of judging whether the smallest character size ratio has changed or not.

FIG. 30 is a view illustrating an example of the change flag table 342 in accordance with the present embodiment. As shown in FIG. 30, the change flag table 342 is a table in which whether the smallest character size ratio has changed or not is associated with a change flag (1-bit signal) indicative of whether the smallest character size ratio has changed or not. As illustrated in FIG. 30, the change flag being 1-bit signal "1" indicates that the smallest character size ratio has changed, and the change flag being 1-bit signal "0" indicates that the smallest character size ratio has not changed.

As described above, the portable terminal 30 obtains size ratio data and a change flag for each of frames constituting a sub-image. The portable terminal 30 transmits size ratio data and change flags together with a sub-image by transmitting, together with the frames constituting the sub-image, size ratio data and change flags for the respective frames.

It is preferable that the television 10 and the portable terminal 30 each have a size ratio table and a change flag table which are shared therebetween in common.

[Sub-Image Transmitting Process in Portable Terminal]

Figure 31:
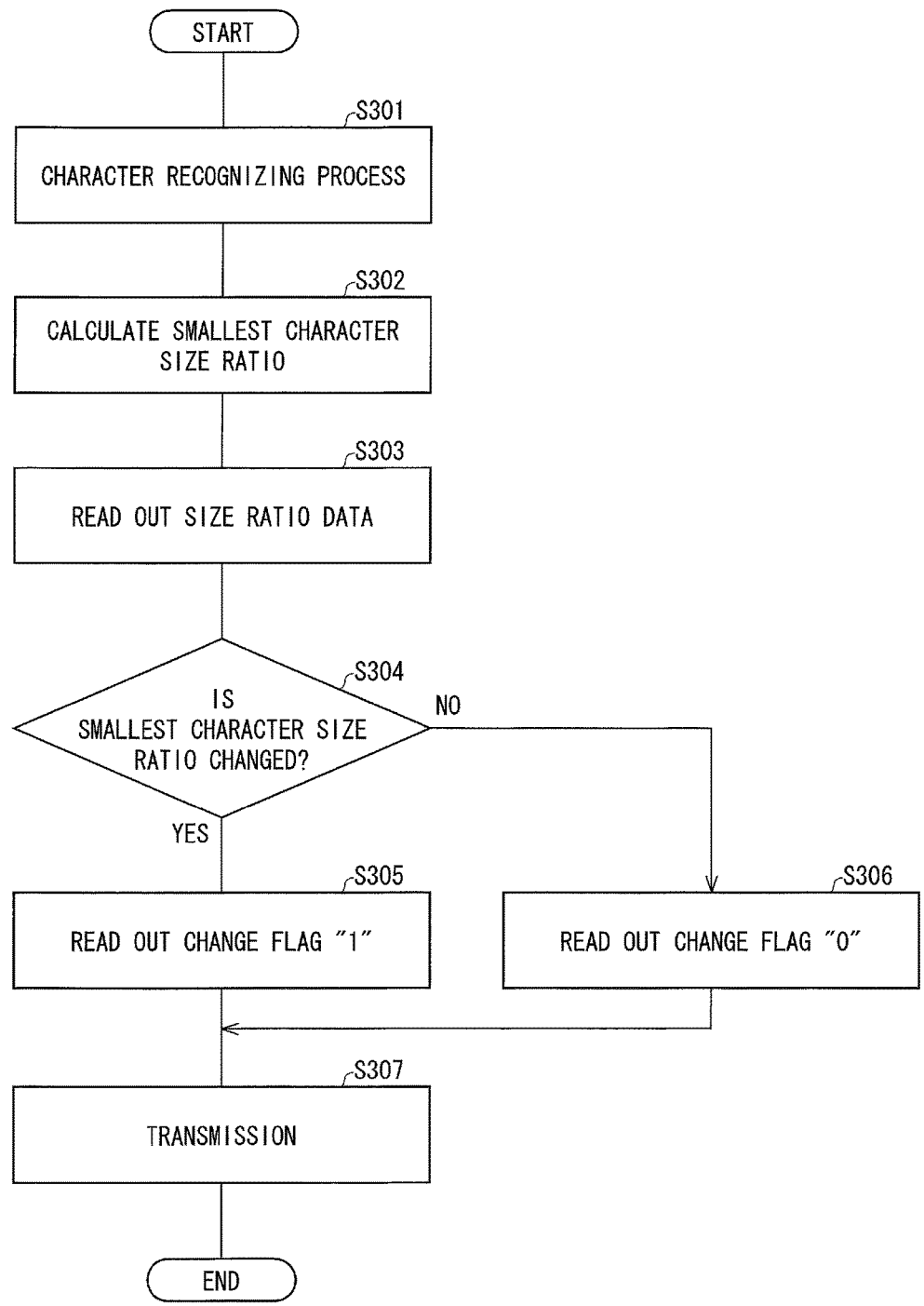
FIG. 31 is a flowchart illustrating a flow of a sub-image transmitting process carried out by a size ratio information generating unit of a portable terminal in accordance with another embodiment of the present invention.

With reference to FIG. 31, the following description will discuss a process of the portable terminal 30 in accordance with the present embodiment. In this process, size ratio data and change flags, together with a sub-image, are transmitted to the television 10 (this process is also referred to as sub-image transmitting process). FIG. 31 is a flowchart showing a flow of the sub-image transmitting process carried out by the size ratio information generating unit 312 of the portable terminal 30 in accordance with the present embodiment.

As illustrated in FIG. 31, the character recognizing unit 321 of the size ratio information generating unit 312 carries out the character recognizing process on a sub-image (step S301), and supplies, to the smallest character size ratio calculating unit 322, a smallest character size detected in the character recognizing process.

The smallest character size ratio calculating unit 322 calculates a smallest character size ratio on the basis of the smallest character size thus supplied and a size of the sub-image (step S302), and reads out, from the size ratio table 341, size ratio data associated with the smallest character size ratio thus calculated (step S303).

The size ratio change judging unit 323 judges whether a size ratio in the sub-image of a current frame is changed from a size ratio in the sub-image of an immediately previous frame (step S304). In a case where the size ratio change judging unit 323 judges that the size ratio has not changed (NO in step S304), the size ratio change judging unit 323 reads out a change flag "0" from the change flag table. In a case where the size ratio change judging unit 323 judges that the size ratio has changed (YES in step S304), the size ratio change judging unit 323 reads out a change flag "1" from the change flag table.

The controlling unit 301 transmits, together with the sub-image, to the television 10 via the transmitting unit 305, the change flag and the size ratio data which have been obtained in the steps S301 through S306 (step S307).

[Process in Television]

Figure 32:
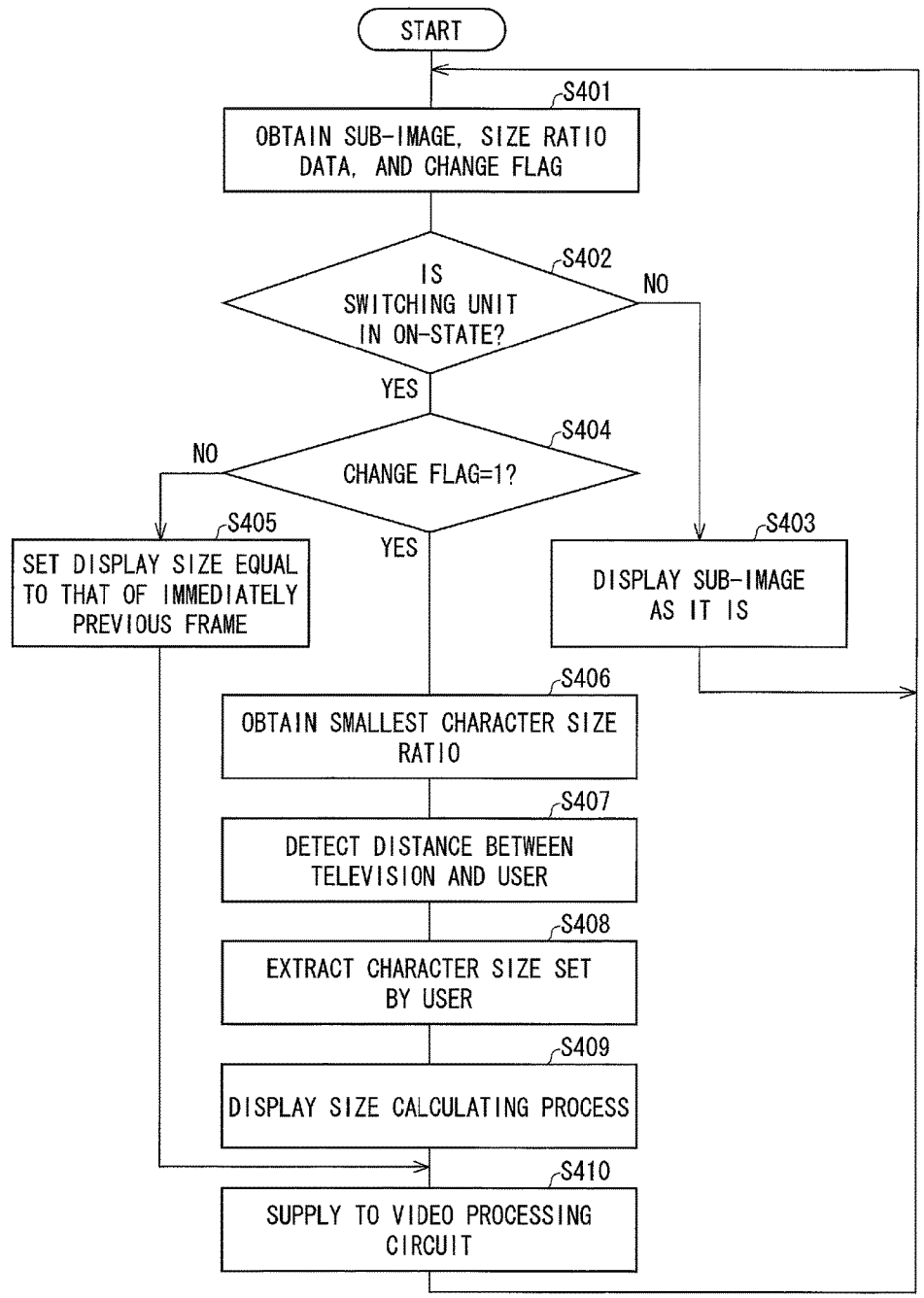
FIG. 32 is a flowchart illustrating processes carried out in a television in accordance with another embodiment of the present invention.

With reference to FIG. 32, the following description will discuss a process carried out in the television 10 in accordance with the present embodiment. FIG. 32 is a flowchart showing a flow of the process carried out in the television 10 in accordance with the present embodiment.

As illustrated in FIG. 32, upon obtainment of the sub-image, the change flag, and the size ratio data from the portable terminal 30 via an external input unit 115 or a wireless communication unit 121 (step S401), the controlling unit 118 judges whether the switching unit 131 is in an ON-state or not (step S402). In a case where the switching unit 131 is in an OFF-state (NO in step S402), the controlling unit 118 controls the video processing circuit 107 so that the LCD 110 displays the sub-image as it is (step S403).

In a case where the switching unit 131 is in an ON-state (YES in step S402), the character recognizing unit (character size detecting section) 132 judges whether the change flag is "1" or not (step S404).

In a case where the change flag is "0" (NO in step S404), the display size calculating unit 135 sets, as a result of calculating a display size of a current frame constituting the sub-image, a display size equal to a display size of a frame immediately previous to the current frame (step S405).

The display size calculating unit 135 supplies, to the video processing circuit 107, display size information indicative of the display size of the frame previous to the current frame, which size has been set as the result of the calculation (step S410). Consequently, the sub-image in the current frame is subjected to the same scaling process as that carried out on the sub-image in the frame immediately previous to the current frame.

In a case where the change flag is "1" (YES in step S404), the character recognizing unit 132 obtains, from size ratio data, a smallest character size ratio in the current frame constituting the sub-image (step S406).

Next, the distance detecting unit 133 detects a distance from the television 10 to the user who is using the television 10, on the basis of an image captured by the camera 120 (step S407). Furthermore, the user setting extracting unit 134 identifies the user who is using the television 10, on the basis of the image captured by the camera 120, and extracts, from the RAM 117, a standard character size which has been set in advance by the identified user (step S408).

The display size calculating unit 135 carries out a display size calculating process on the basis of (1) the smallest character size ratio indicated by the size ratio data, (2) the distance from the television 10 to the user, and (3) the standard character size set by the user (step S409). The display size calculating unit 135 supplies the calculated display size as display size information to the video processing circuit 107 (step S410).

(Size Ratio Data and Change Flag)

Figure 33:
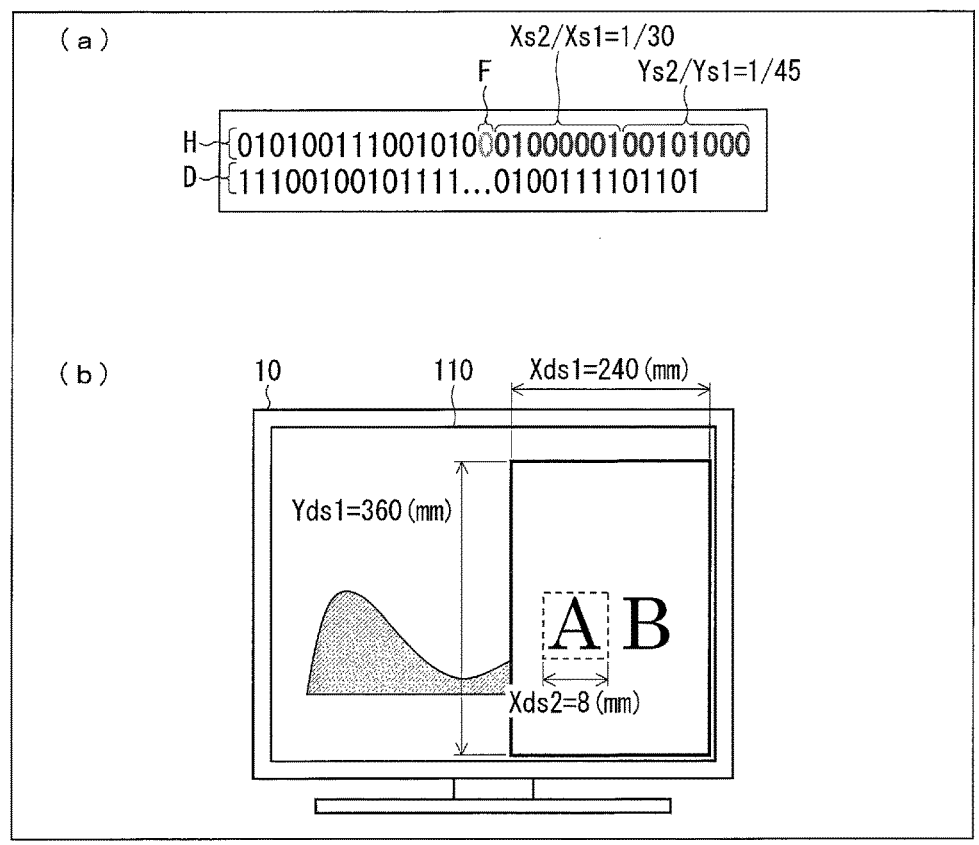
FIG. 33 is a view illustrating an example of a relation between (i) size ratio data and a change flag which are transmitted from a portable terminal and (ii) a post-scaling sub-image displayed on a television, in accordance with another embodiment of the present invention. (a) of FIG. 33 illustrates an example of (i) size ratio data and (ii) data indicating a change flag and a sub-image, which are transmitted from the portable terminal, and (b) of FIG. 33 illustrates an example of a display screen displayed on an LCD of the television.
Figure 34:
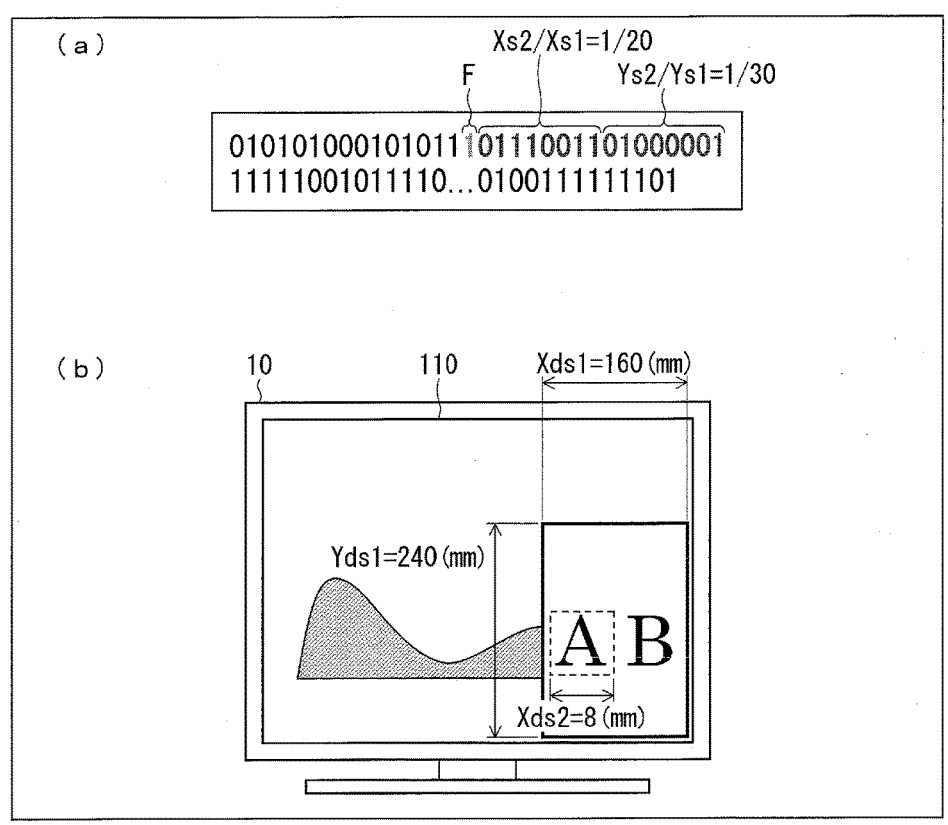
FIG. 34 is a view illustrating another example of a relation between (i) size ratio data and a change flag which are transmitted from a portable terminal and (ii) a post-scaling sub-image displayed on a television 10, in accordance with another embodiment of the present invention. (a) of FIG. 34 illustrates another example of (i) size ratio data and (ii) data indicating a change flag and a sub-image, which are transmitted from the portable terminal, and (b) of FIG. 34 illustrates another example of a display screen displayed on an LCD of the television.

With reference to FIGS. 33 and 34, the following description will discuss a relation between (i) size ratio data and a change flag which are transmitted from the portable terminal 30 in accordance with the present embodiment and (ii) a post-scaling sub-image displayed on the television 10.

FIG. 33 is a view illustrating an example of the relation between (i) size ratio data and a change flag which are transmitted from the portable terminal 30 in accordance with the present embodiment and (ii) a post-scaling sub-image displayed on the television 10. (a) of FIG. 33 illustrates an example of size ratio data, a change flag, and data indicative of a sub-image which are transmitted from the portable terminal 30, and (b) of FIG. 33 illustrates an example of a display screen displayed on the LCD 110 of the television 10.

FIG. 34 is a view illustrating another example of the relation between (i) size ratio data and a change flag which are transmitted from the portable terminal 30 in accordance with the present embodiment and (ii) a post-scaling sub-image displayed on the television 10. (a) of FIG. 34 illustrates another example of size ratio data, a change flag, and data indicative of a sub-image which are transmitted from the portable terminal 30, and (b) of FIG. 34 illustrates another example of a display screen displayed on the LCD 110 of the television 10.

As illustrated in (a) of FIG. 33, the portable terminal 30 transmits data including (i) a header part H including size ratio data and a change flag F and (ii) a data part D indicative of one frame (current frame) constituting a sub-image.

In this case, the character recognizing unit 132 extracts the change flag F from the header part H, and judges whether the smallest character size ratio in the current frame is changed from the smallest character size ratio in the frame immediately previous to the current frame. In the example illustrated in (a) of FIG. 33, a value of the change flag F is "0", and therefore the character recognizing unit 132 judges that the smallest character size ratio has not changed.

The display size calculating unit 135 supplies, to the video processing circuit 107, the display size as it is which has been calculated on the basis of the smallest character size ratio indicated by the size ratio data in the immediately previous frame. Since the change flag F is "0", the smallest character size ratio in the immediately previous frame is the same as the smallest character size ratio ($Xs2/Xs1=1/30$, $Ys2/Ys1=1/45$) indicated by the size ratio data in the current frame.

Consequently, the LCD 110 displays a sub-image in a scaled display size calculated on the basis of the size ratio data in the immediately previous frame, as illustrated in (b) of FIG. 33.

Next, the character recognizing unit 132 extracts the change flag F from the header part H of the data transmitted from the portable terminal 30 illustrated in (a) of FIG. 34, and judges whether the smallest character size ratio in the current frame has changed from the smallest character size ratio in the frame immediately previous to the current frame. In the example illustrated in (a) of FIG. 34, the value of the change flag F is "1", and therefore the character recognizing unit 132 judges that the smallest character size ratio has changed.

The display size calculating unit 135 extracts size ratio data ("01000001" and "00101000" in (a) of FIG. 34) from the header part H. The display size calculating unit 135 refers to the size ratio table stored in, for example, the RAM 117, so as to obtain a smallest character size ratio ($Xs2/Xs1=1/20$, $Ys2/Ys1=1/30$) indicated by the extracted size ratio data. The display size calculating unit 135 calculates a display size of the post-scaling sub-image on the basis of the smallest character ratio thus obtained, and supplies the display size to the video processing circuit 107.

Consequently, as illustrated in (b) of FIG. 34, the LCD 110 displays a post-scaling sub-image in the display size changed from that of the post-scaling sub-image illustrated in (b) of FIG. 33.

With the arrangement, the portable terminal 30 outputs, together with the sub-image, the data indicative of the size of the smallest character, so that the portable terminal 30 can uniformly present, to the television 10, the display image and the size of the smallest character size, regardless of the size of the sub-image.

Therefore, even in a case of carrying out the display size calculating process based on a character size ratio, the television 10 does not need to carry out any of (i) detection of a smallest character from a sub-image, (ii) detection of a size of the smallest character, and (iii) calculation of a character size ratio from the size of the smallest character and the display image. Consequently, the portable terminal 30 can reduce a throughput of the television 10.

Since the size ratio table 341 and the change flag table 342 are stored in the storage unit 304, the portable terminal 30 can use, as the size ratio data and the change flag, associated data in the tables. Accordingly, the portable terminal 30 does not need to carry out (i) a process of generating size ratio data from a character size ratio and (ii) a process of generating data indicative of a change flag on the basis of a result of the judgment.

Accordingly, the portable terminal 30 can reduce a process which is required until the output section outputs the size ratio data and the flag data. That is, the portable terminal 30 can reduce a throughput therein relating to outputs of the size ratio data and the change flag.

In the present embodiment, the description has been made as to the configuration in which the portable terminal 30 transmits size ratio data together with a sub-image. However, the present invention is not limited to this configuration. For example, it is possible to employ a configuration in which data indicative of a smallest character size, instead of size ratio data, is transmitted together with a sub-image or a configuration in which other data is also transmitted.

Consequently, the television 10 which receives an input of a sub-image from the portable terminal 30 neither needs to detect a smallest character from the display image nor needs to detect a size of a smallest character. This makes it possible to reduce a throughput in the television 10.

Embodiment 3

In the Embodiment 1, the description has been made as to the configuration in which the post-scaling main image and the post-scaling sub-image are two-screen-displayed on the LCD 110 in such a manner that the post-scaling main image and the post-scaling sub-image are arranged in the longer side direction (i.e., the x-axis direction in FIG. 4) of the LCD 110. However, the present invention is not limited to this configuration.

For example, it is possible to employ a configuration in which the post-scaling main image and the post-scaling sub-image are two-screen-displayed on the LCD 110 in such a manner that the post-scaling main image and the post-scaling sub-image are arranged in the shorter side direction of the LCD 110. Alternatively, it is possible to employ a configuration in which two-screen-display of the post-scaling main image and the post-scaling sub-image which are arranged in the longer side direction of the LCD 110 and two-screen-display of the post-scaling main image and the post-scaling sub-image which are arranged in the shorter side direction of the LCD 110 are switched appropriately.

In the present embodiment, a description will be provided as to a configuration in which two-screen-display of the post-scaling main image and the post-scaling sub-image which are arranged in the longer side direction of the LCD 110 (also referred to as two-screen horizontal display) and two-screen-display of the post-scaling main image and the post-scaling sub-image which are arranged in the shorter side direction of the LCD 110 (also referred to as two-screen vertical display) are switched appropriately.

[Optimal Arrangement of Main Image and Sub-Image]

Figure 35:
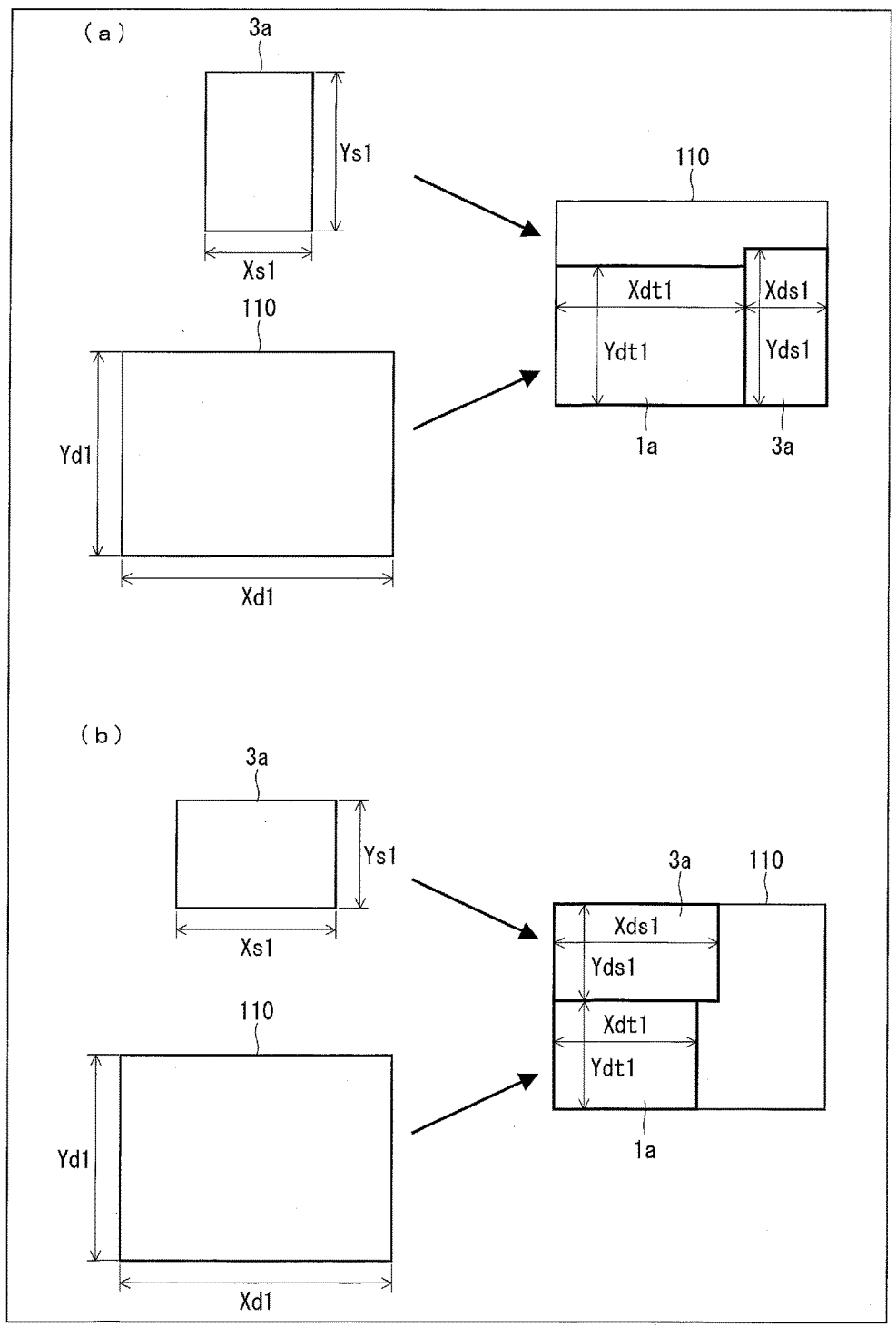
FIG. 35 is a view illustrating an example of a display screen displayed on an LCD included in a television in accordance with still another embodiment of the present invention. (a) of FIG. 35 illustrates an example of a display screen displayed in a case where a post-scaling main image and a post-scaling sub-image are displayed in 2-screen row display, and (b) of FIG. 35 illustrates an example of a display screen displayed in a case where a post-scaling main image and a post-scaling sub-image are displayed in 2-screen column display.

With reference to FIGS. 35 and 36, the following description will discuss a process carried out by the display size calculating unit (adjusting section) 135 of the controlling unit 118 included in the television (display apparatus) 10 in accordance with the present embodiment.

FIG. 35 is a view illustrating an example of a display screen displayed on the LCD 110 included in the television 10 in accordance with the present embodiment. (a) of FIG. 35 illustrates an example of a display screen in a case of two-screen horizontal display of a post-scaling main image and a post-scaling sub-image. (b) of FIG. 35 illustrates an example of a display screen in a case of two-screen vertical display of a post-scaling main image and a post-scaling sub-image.

The display size calculating unit 135 in accordance with the present embodiment further carries out a display location determining process for determining whether a post-scaling main image and a post-scaling sub-image are to be two-screen-horizontal-displayed or two-screen-vertical-displayed, on the basis of results of calculation of the formulae (4), (5), (10), and (11). The display location determining process will be detailed later.

When the display size calculating unit 135 carries out the display location determining process, the controlling unit 118 supplies, to the video processing circuit (adjusting section) 107, a result of determination in the display location determining process together with display size information.

The video processing circuit 107 carries out a scaling process on a main image and a sub-image on the basis of the display size information obtained from the controlling unit 118, so as to generate a post-scaling main image and a post-scaling sub-image. Furthermore, in a case where the result of determination which the video processing circuit 107 has received from the controlling unit 118 indicates a two-screen-horizontal display, the video processing circuit 107 generates a post-scaling main image and a post-scaling sub-image for two-screen-horizontal display. The LCD controller (display section) 109 drives the LCD (displaying unit) 110 so that the post-scaling main image and the post-scaling sub-image are two-screen-horizontal-displayed.

In a case where the result of determination which the video processing circuit 107 has received from the controlling unit 118 indicates a two-screen-vertical display, the video processing circuit 107 generates a post-scaling main image and a post-scaling sub-image for two-screen-vertical display. The LCD controller 109 drives the LCD 110 so that the post-scaling main image and the post-scaling sub-image are two-screen-vertical-displayed.

(Display Location Determining Process)

The following description will discuss the display location determining process carried out by the display size calculating unit 135. Here, a length of the LCD 110 in the x-axis direction is referred to as a horizontal length Xd1 of the LCD 110 and a length of the LCD 110 in the y-axis direction is referred to as a vertical length Yd1 of the LCD 110.

The display size calculating unit 135 first compares an aspect ratio (Yd1/Xd1) of a display area of the LCD 110 (i.e. aspect ratio (Yt1/Xt1) of a main image) with an aspect ratio (Ys1/Xs1) of a sub-image. Then, the display size calculating unit 135 determines which of (i) a relation Ys1/Xs1≥Yd1/Xd1 (aspect ratio of sub-image≥aspect ratio of main image) and (ii) a relation Ys1/Xs1<Yd1/Xd1 (aspect ratio of sub-image<aspect ratio of main image) is satisfied.

In a case where the display size calculating unit 135 determines that Ys1/Xs1≥Yd1/Xd1, the display size calculating unit 135 supplies, to the video processing circuit 107, an instruction for two-screen-horizontal-displaying a post-scaling main image and a post-scaling sub-image (horizontal display instruction) together with display size information.

On the other hand, in a case where the display size calculating unit 135 determines that Ys1/Xs1<Yd1/Xd1, the display size calculating unit 135 supplies, to the video processing circuit 107, an instruction for two-screen-vertical-displaying a post-scaling main image and a post-scaling sub-image (vertical display instruction) together with display size information.

(Determination Formulae for Display Location Determining Process)

With reference to FIG. 36, a description will be provided as to determination formulae (Ys1/Xs1≥Yd1/Xd1 and Ys1/Xs1<Yd1/Xd1) in the display location determining process carried out by the display size calculating unit 135. FIG. 36 is a view illustrating an example of a display screen displayed on the television 10 in accordance with the present embodiment.

As illustrated in FIG. 36, a horizontal length of a post-scaling sub-image 3e in two-screen-vertical display is referred to as Xds1A, and a vertical length thereof is referred to as Yds1A. A horizontal length of a post-scaling sub-image 3e' in two-screen-horizontal display is referred to as Xds1B, and a vertical length thereof is referred to as Yds1B.

The LCD 110 and a post-scaling main image 1e have similar figures, and therefore a formula (12) below is obtained:

$$k = Xdt1/Xd1 = Ydt1/Yd1 \quad (12)$$

where k (0<k<1) indicates a degree of scaling (reduction rate) of a post-scaling main image to a main image.

The post-scaling sub-image 3e and the post-scaling sub-image 3e' have similar figures, and therefore a formula (13) below is obtained:

$$m = Yds1A/Xds1A = Yds1B/Xds1B \quad (13)$$

where m (0<m) indicates an aspect ratio of the post-scaling sub-images 3e and 3e'.

Furthermore, as illustrated in FIG. 36, from a relation between the post-scaling main image 1e and the post-scaling sub-image 3e, a formula (14) below is obtained:

$$Yd1 = Ydt1 + Yds1A \quad (14)$$

From a relation between the post-scaling main image 1e and the post-scaling sub-image 3e', a formula (15) below is obtained:

$$Xd1 = Xdt1 + Xds1B \quad (15)$$

Here, a display area Sa of the post-scaling sub-image 3e in the two-screen-vertical display is expressed as follows:

$$Sa = Xds1A * Yds1A \quad (16)$$

A display area Sb of the post-scaling sub-image 3e' in the two-screen-horizontal display is expressed as follows:

$$Sb = Xds1B * Yds1B \quad (17)$$

From the formulae (12) through (14) and (16), the display area Sa of the post-scaling sub-image 3e is expressed as follows:

$$Sa = Xds1A * (1-k)Yd1 \quad (18)$$
$$= \{(1-k)\wedge 2\} * (Yd1 \wedge 2)/m$$

From the formulae (12), (13), (15), and (17), the display area Sb of the post-scaling sub-image 3e' is expressed as follows:

$$Sb = (1-k)Xd1 * Yds1B \quad (19)$$
$$= \{(1-k)\wedge 2\} * (Xd1 \wedge 2) * m$$

In a case where Sa>Sb, i.e. the display area Sa of the post-scaling sub-image 3e is larger than the display area Sb of the post-scaling sub-image 3e', a formula (20) below is obtained from the formulae (18) and (19):

$$Sa/Sb = (Yd1^\wedge 2)/\{(m^\wedge 2)*(Xd1^\wedge 2)\} > 1 \quad (20)$$

Furthermore, from the formula (20), a formula (21) below is obtained:

$$m^\wedge 2 < (Yd1/Xd1)^\wedge 2 \quad (21)$$

From the formula (21), a formula (22) below is obtained:

$$Yds1A/Xds1A < Yd1/Xd1 \quad (22)$$

The sub-image and the post-scaling sub-image 3e have similar figures, and therefore a formula (23) below is obtained:

$$Yds1A/Xds1A = Ys1/Xs1 \quad (23)$$

Accordingly, from the formulae (22) and (23), a formula (24) below is satisfied:

$$Ys1/Xs1 < Yd1/Xd1 \quad (24)$$

In view of the above, in a case where the formula (24) is satisfied, the display area Sa of the post-scaling sub-image 3e is larger than the display area Sb of the scaled sub image 3e'.

Similarly, in a case where Sa<Sb, i.e. the display area Sb of the post-scaling sub-image 3e' is larger than the display area Sa of the post-scaling sub-image 3e, a formula below is satisfied:

$$Ys1/Xs1 \geq Yd1/Xd1$$

Accordingly, in the case where the display size calculating unit 135 determines that Ys1/Xs1≥Yd1/Xd1, the display size calculating unit 135 supplies the horizontal display instruction together with display size information to the video processing circuit 107, thereby causing the LCD 110 to two-screen-horizontal display the post-scaling main image and the post-scaling sub-image. In the case where the display size calculating unit 135 determines that Ys1/Xs1<Yd1/Xd1, the display size calculating unit 135 supplies the vertical display instruction together with display size information to the video processing circuit 107, thereby causing the LCD 110 to two-screen-vertical display the post-scaling main image and the post-scaling sub-image.

Consequently, the television 10 can have a larger display area of the post-scaling sub-image. Hereinafter, the case where Ys1/Xs1≥Yd1/Xd1 is also referred to as a case where "a sub-image is vertically long", and the case where Ys1/Xs1<Yd1/Xd1 is also referred to as a case where "a sub-image is horizontally long".

(Transition of Display Screen)

Figure 37:
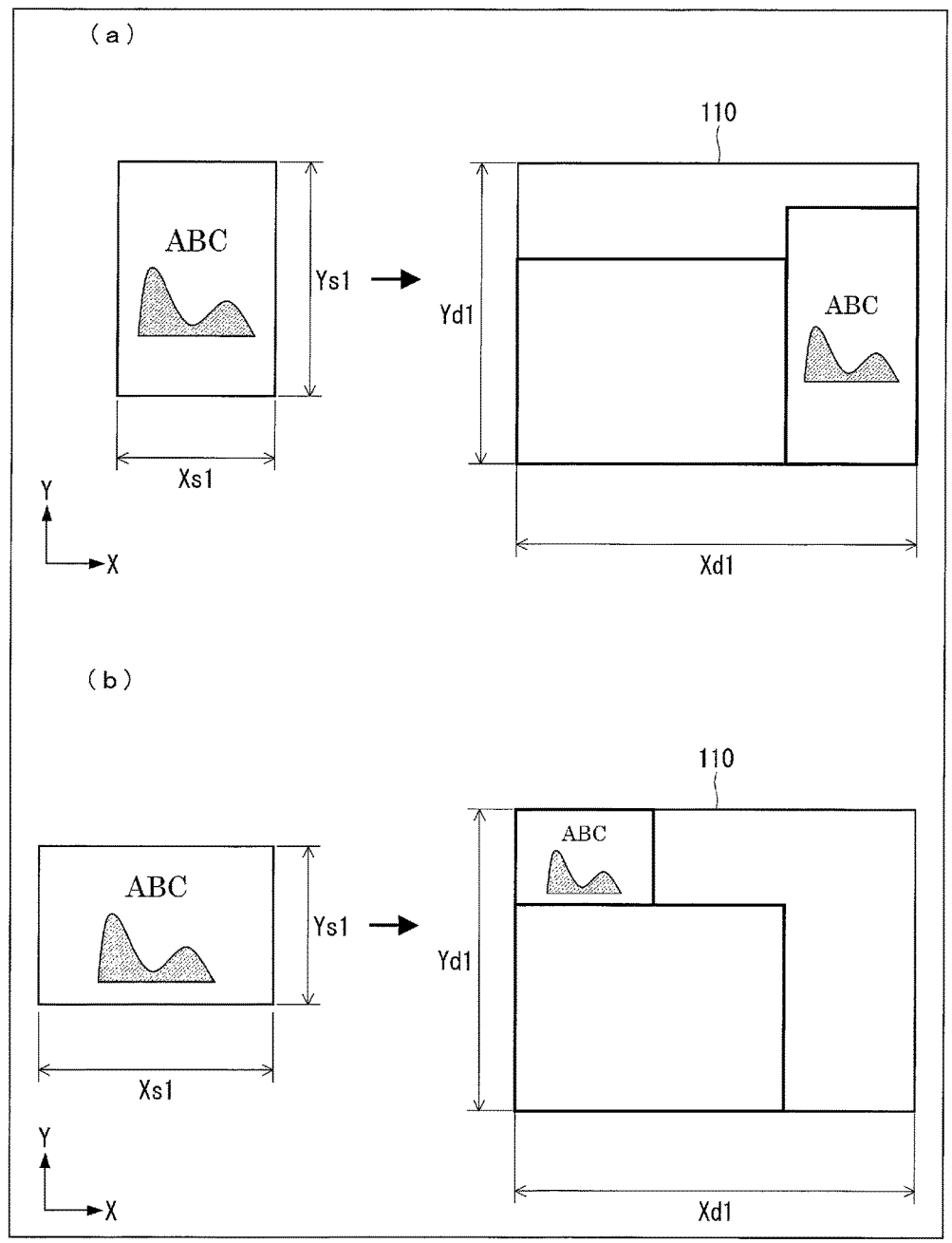
FIG. 37 is a transition diagram illustrating an example of transition of a display screen displayed on an LCD of a television in accordance with still another embodiment of the present invention. (a) of FIG. 37 illustrates an example of a display screen displayed on the LCD in a case where a sub-image is displayed in vertically-long display, and (b) of FIG. 37 illustrates an example of a display screen displayed on the LCD in a case where display of the sub-image has been changed to horizontally-long display.

With reference to FIG. 37, the following description will discuss an example of transition of a display screen displayed on the LCD 110 in which transition display of a sub-image in the portable terminal (external apparatus) 30 transits from vertical display (display in which the longer side direction of the sub-image is equal to the y-axis direction in FIG. 37) to horizontal display (display in which the longer side direction of the sub-image is equal to the x-axis direction).

FIG. 37 is a transition diagram illustrating an example of transition of a display screen displayed on the LCD 110 of the television 10 in accordance with the present embodiment. (a) of FIG. 37 illustrates an example of a display screen on the LCD 110 in a case where display of a sub-image is vertical display. (b) of FIG. 37 illustrates an example of a display screen on the LCD 110 in a case where display of a sub-image transits to horizontal display.

In a case where a sub-image displayed by the portable terminal 30 is in a vertical display and the display size calculating unit 135 determines that the sub-image is vertically long, the LCD 110 carries out two-screen-horizontal display of a post-scaling main image and a post-scaling sub-image, as illustrated in (a) of FIG. 37.

Subsequently, when the sub-image displayed by the portable terminal 30 changes from the vertical display illustrated in (a) of FIG. 37 to the horizontal display illustrated in (b) of FIG. 37, the display size calculating unit 135 carries out the display location determining process. In a case where the display size calculating unit 135 determines that the sub-image is horizontally long, the LCD 110 carries out two-screen-vertical display of the post-scaling main image and the post-scaling sub-image as illustrated in (b) of FIG. 37.

As described above, when display of the sub-image on the portable terminal 30 changes from vertical display to horizontal display (e.g. display screen of the portable terminal 30 rotates by 90 degrees), a display screen displayed on the LCD 110 changes from the two-screen-horizontal display illustrated in (a) of FIG. 37 to the two-screen-vertical display illustrated in (b) of FIG. 37. In the present embodiment, the description has been provided as to a case where display of the sub-image on the portable terminal 30 changes from vertical display to horizontal display. Transition of display of a sub-image from horizontal display to vertical display is made similarly.

With the configuration, the display size calculating unit 135 adjusts display locations of the post-scaling main image and the post-scaling sub-image on the LCD 110 in accordance with respective aspect ratios of the main image and the sub-image. Accordingly, the television 10 can display the post-scaling main image and the post-scaling sub-image on appropriate display locations of the LCD 110.

To be more specific, in a case where the aspect ratio of the sub-image is equal to or greater than the aspect ratio of the main image (i.e. the shape of the sub-image is vertically longer than the shape of the main image), the post-scaling main image and the post-scaling sub-image are displayed in such a manner as to be arranged in the longer side direction of the LCD 110. In a case where the aspect ratio of the sub-image is less than the aspect ratio of the main image (i.e. the shape of the sub-image is horizontally longer than the shape of the main image), the post-scaling main image and the post-scaling sub-image are displayed in such a manner as to be arranged along a shorter side direction of the LCD 110.

Consequently, the television 10 can display the post-scaling main image and the post-scaling sub-image with respective optimal display sizes, i.e. so that the post-scaling main image and the post-scaling sub-image have larger display areas, respectively.

Modification Example

In the present embodiment, the description has been provided as to the configuration in which in a case where a result of determination in the display location determining process carried out by the display size calculating unit 135 changes, a display location of the post-scaling sub-image on the LCD 110 is changed. However, the present invention is not limited to this configuration. For example, it is possible to employ a configuration in which even in a case where the result of determination in the display location determining process carried out by the display size calculating unit 135 changes, when a predetermined condition is satisfied, the display location of the post-scaling sub-image on the LCD 110 is not changed.

In the present modification example, a description will be provided as to a configuration in which when a condition is satisfied in which an increase rate of a display area of the post-scaling sub-image whose display location is changed to a display area of the post-scaling sub-image whose display location is not changed is not greater than a predetermined threshold, the display location of the post-scaling sub-image is not changed.

Figure 38:
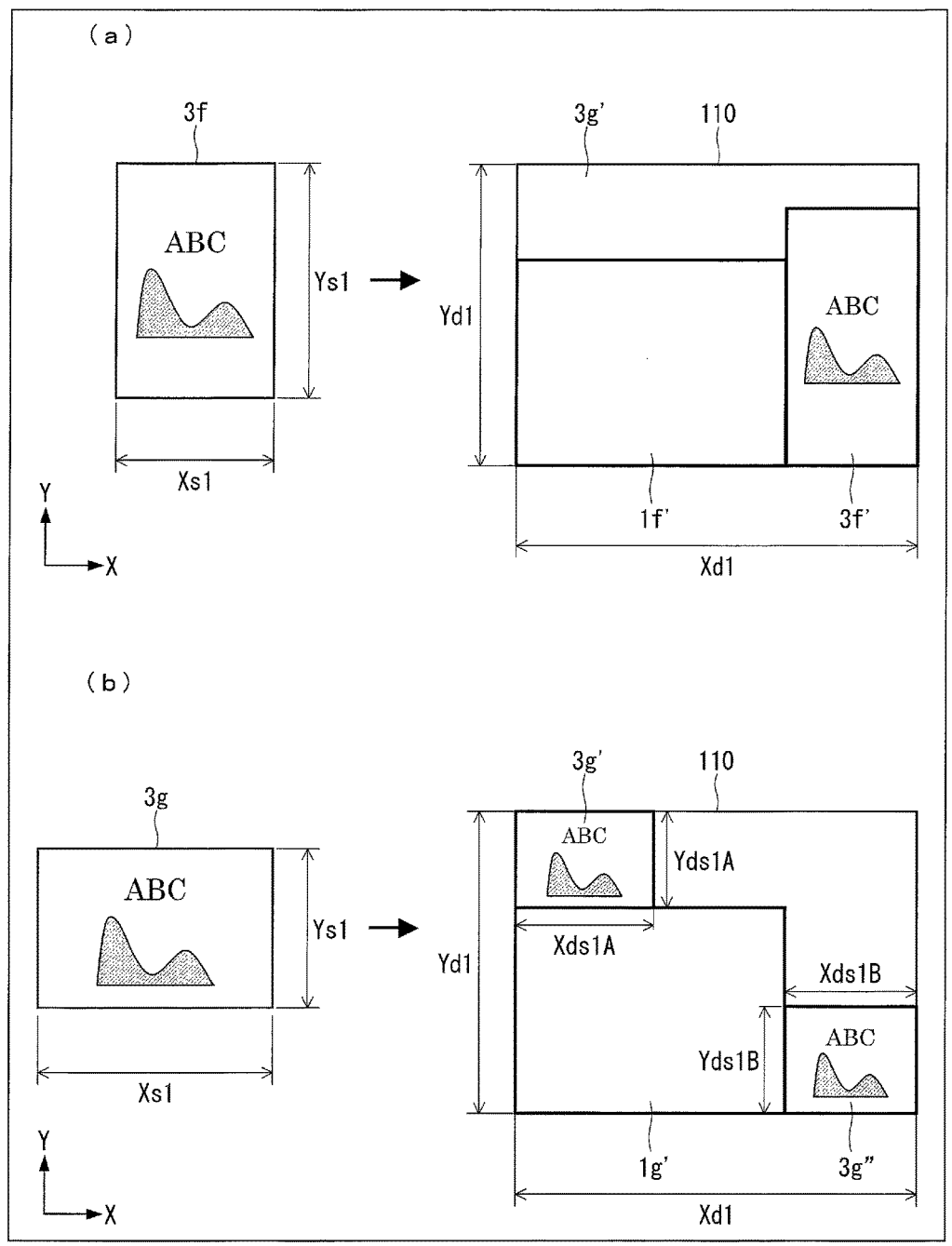
FIG. 38 is a view illustrating an example of a display screen displayed on an LCD of a television in accordance with a modification example of still another embodiment of the present invention. (a) of FIG. 38 illustrates another example of a display screen displayed on the LCD in a case where a sub-image is displayed in vertically-long display, and (b) of FIG. 38 illustrates another example of a display screen displayed on the LCD in a case where display of the sub-image has been changed to horizontally-long display.

With reference to FIG. 38, the following description will discuss an example of the display screen on the LCD 110 of the television 10 in accordance with the present modification example. FIG. 38 is a view illustrating an example of the display screen displayed on the LCD 110 of the television 10 in accordance with the present modification example. (a) of FIG. 38 illustrates another example of the display screen on the LCD 110 in a case where the display of the sub-image is vertical display. (b) of FIG. 38 illustrates another example of the display screen on the LCD 110 in a case where the display of the sub-image changes to horizontal display.

In a case where a sub-image 3f is vertically displayed on the portable terminal 30 as illustrated in (a) of FIG. 38 and the display size calculating unit 135 determines that the sub-image is vertically long, a post-scaling main image 1f' and a post-scaling sub-image 3f' are two-screen-horizontal-displayed on the LCD 110. Next, in a case where display changes from a state illustrated in (a) of FIG. 38 to a state illustrated in (b) of FIG. 38 where a sub-image 3g is horizontally displayed, the display size calculating unit 135 determines that the sub-image is horizontally long.

In this case, the display size calculating unit 135 calculates an increase rate (Sa/Sb) of a display area on the basis of (i) a display area Sa of a post-scaling sub-image 3g' which is a post-scaling sub-image whose display location is changed to that for two-screen-vertical display and (ii) a display area Sb of a post-scaling sub-image 3g" which is a sub-image whose display location is not changed from the current location (location illustrated in (a) of FIG. 38).

The display size calculating unit 135 compares the calculated increase rate Sa/Sb with a predetermined threshold. In a case where the calculated increase rate is more than the predetermined threshold, the display size calculating unit 135 supplies, to the video processing circuit 107, a display location changing instruction indicative of an instruction to switch to the two-screen-vertical display (i.e. change a display location of the post-scaling sub-image), together with display size information.

On the other hand, in a case where the calculated increase rate is not more than the predetermined threshold, the display size calculating unit 135 supplies, to the video processing circuit 107, a display location maintaining instruction indicative of an instruction to maintain the two-screen-horizontal display (i.e. maintain the display location of the post-scaling sub-image), together with display size information.

(Calculation of Increase Rate Sa/Sb)

The following description will discuss (i) calculation of the increase rate Sa/Sb of a display area of a post-scaling sub-image by the display size calculating unit 135 and (ii) comparison of the calculated increase rate Sa/Sb and a predetermined threshold. In the present modification example, a description will be provided as to a case where the predetermined threshold is set to an increase rate of 1.1 (i.e. increase rate of 10%). However, the predetermined threshold may be set arbitrarily, and is not particularly limited.

The increase rate Sa/Sb of a display area is calculated as follows. First, from the formula (13), $$m = Yds1A / Xds1A = Yds1B / Xds1B \quad (25)$$
$$= Ys1 / Xs1$$

Then, from the formulae (18), (19), and (25), the increase rate Sa/Sb is:

$$Sa/Sb = (Yd1)^2 / \{(m^2) * Xd1^2\} \quad (26)$$
$$= \{(Yd1/Xd1)^2\} / \{(Ys1/Xs1)^2\}$$

In view of the above, the display size calculating unit 135 may calculate the increase rate Sa/Sb of a display area by calculating the formula (26).

In the present modification example, since the predetermined threshold is set to the increase rate 1.1, the display size calculating unit 135 compares the increase rate Sa/Sb, which is calculated in accordance with the formula (26), with the predetermined threshold 1.1, and when a formula $$\{(Yd1/Xd1)^2\}/\{(Ys1/Xs1)^2\} \leq 1.1 \quad (27)$$

is satisfied, the display size calculating unit 135 may notify the video processing circuit 107 of the display location maintaining instruction indicative of an instruction to maintain a current display location of a post-scaling sub-image. In a case where the formula (27) is not satisfied, the display size calculating unit 135 may notify the video processing circuit 107 of the display location changing instruction indicative of an instruction to change a display location of a post-scaling sub-image.

In the present modification example, the description has been provided as to the case where a sub-image displayed on the portable terminal 30 changes from vertical display to horizontal display. Similarly, in a case where a sub-image changes from horizontal display to vertical display, when a relation $$\{(Ys1/Xs1)^2\}/\{(Yd1/Xd1)^2\} \leq 1.1 \quad (28)$$

is satisfied, a display location of a post-scaling sub-image may be maintained, and when the formula (28) is not satisfied, the display location of the post-scaling sub-image may be changed.

With the above configuration, even in a case where a result of determination in the display location determining process changes, the display size calculating unit 135 can determine whether to change a display location of a post-scaling sub-image, further on the basis of the increase rate of a display area. Consequently, in a case where display of a sub-image on the portable terminal 30 changes, the television 10 can prevent user's visibility from dropping due to a change in a display location regardless of a low increase rate of a display area.

As another example of the present modification example, it is possible to employ a configuration in which even in a case where a result of determination in the display location determining process changes, when the result returns to the former result within a predetermined period, a display location of a post-scaling sub-image is not changed.

A smallest character size, a distance from the television 10 to a user etc. can vary frequently. In a case where a display size of a post-scaling sub-image is changed every time when the smallest character size and/or the distance change, the user may feel troublesome.

In such a case, it is possible to employ a configuration in which even in a case where a size of the smallest character included in a sub-image changes, when a change ratio of the smallest character size is less than a predetermined value, a display size of a post-scaling sub-image is not changed. Furthermore, it is possible to employ a configuration in which even in a case where a distance from the television 10 to a user changes, when a change in the distance is less than a predetermined value or when the change in the distance is within a predetermined time period, a display size of a post-scaling sub-image is not changed.

With the above configuration, it is possible to prevent a display size of a post-scaling sub-image from being changed every time when the smallest character size, the distance from the television 10 to a user, and the like is changed, thereby avoiding drop in user's visibility.

Embodiment 4

In the Embodiment 1, the description has been provided as to the case where two-screen-display is made while an aspect ratio of a sub-image is equal to that of a post-scaling sub-image and an aspect ratio of a main image is equal to that of a post-scaling main image. However, the present invention is not limited to this case. For example, two-screen display may be made while the aspect ratio of a sub-image is not equal to that of a post-scaling sub-image and/or the aspect ratio of a main image is not equal to that of a post-scaling main image.

With reference to FIG. 39, the following description will discuss, as an example of the present embodiment, a configuration in which the aspect ratio of a sub-image is not equal to that of a post-scaling sub-image. FIG. 39 is a view illustrating another example of a display screen displayed on the LCD 110 included in the television 10 in accordance with the present embodiment. (a) of FIG. 39 illustrates an example of the display screen in a case where the aspect ratio of a sub-image is equal to that of a post-scaling sub-image. (b) of FIG. 39 illustrates an example of the display screen in a case where the aspect ratio of a sub-image is not equal to that of a post-scaling sub-image.

For example, in the present embodiment, it is possible to employ a configuration in which, in a case where two-screen display is made while the aspect ratio of a sub-image is equal to that of a post-scaling sub-image as illustrated in (a) of FIG. 39, the shape of the post-scaling sub-image can be changed by a user's operation via, for example, the remote controller 20.

In a case where the user inputs an instruction to increase a vertical length Yds1 of a post-scaling sub-image, the display size calculating unit 135 calculates a vertical length Yds1' in accordance with the user's instruction, and supplies the calculated vertical length Yds1' as display size information to the video processing circuit 107. The post-scaling sub-image having been subjected to the scaling process by the video processing circuit 107 is displayed with a changed aspect ratio on the LCD 110.

Consequently, the television 10 can change a size, a shape etc. of at least one of a post-scaling main image and a post-scaling sub-image not in accordance with an aspect ratio but in accordance with a user's instruction.

[Example of Configuration Achieved by Software]

A control block (in particular, the controlling unit 118) of the television 10 and a control block (in particular, the controlling unit 301) of the portable terminal 30 can be realized by a logic circuit (hardware) provided in an integrated circuit (IC chip) or the like or can be alternatively realized by software as executed by a CPU (Central Processing Unit).

In the latter case, each of the television 10 and the portable terminal 30 includes a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. An embodiment derived from a proper combination of technical means disclosed in respective different embodiments is also encompassed in the technical scope of the present invention. Further, it is possible to form a new technical feature by combining the technical means disclosed in the separate embodiments.

[Main Points]

The display apparatus (television 10) in accordance with an aspect 1 of the present invention includes: a display section (LCD controller 109) for causing a content (main image) and an input image (sub-image) to be displayed in respective different regions of a displaying unit (LCD 110), the input image being inputted from an external apparatus (portable terminal 30); and an adjusting section (display size calculating unit 135, video processing circuit 107) for adjusting a display size of the content and a display size of the input image so that the content and the input image are displayed in the respective different regions of the displaying unit, the adjusting section adjusting, based on an aspect ratio of the content and an aspect ratio of the input image, (i) a location at which the content is displayed on the displaying unit and (ii) a location at which the input image is displayed on the displaying unit.

According to the configuration, the adjusting section adjusts, based on the respective aspect ratios (i.e., a ratio of a vertical length to a horizontal length), the locations at which the content and the input image are respectively displayed.

From this, the display apparatus can display the content and the input image, each of which has an adjusted display size, at respective appropriate display locations on the displaying unit based on the respective aspect ratios of the content and the input image. Therefore, the display apparatus can display both the content and the input image in respective optimal display sizes.

In the display apparatus in accordance with an aspect 2 of the present invention, in a case where the aspect ratio of the input image is equal to or greater than the aspect ratio of the content, the adjusting section of the aspect 1 may adjust a display location so that the input image and the content are displayed while being arranged in a longer side direction of the displaying unit; and in a case where the aspect ratio of the input image is smaller than the aspect ratio of the content, the adjusting section of the aspect 1 may adjust the display location so that the input image and the content are displayed while being arranged in a shorter side direction of the displaying unit.

According to the configuration, in a case where the aspect ratio of the input image is equal to or greater than the aspect ratio of the content, i.e., in a case where a shape of the input image is vertically-longer than a shape of the content, the display section causes the input image and the content to be displayed while arranging the input image and the content in the longer side direction of the displaying unit. Alternatively, in a case where the aspect ratio of the input image is smaller than the aspect ratio of the content, i.e., in a case where the shape of the input image is horizontally-longer than the shape of the content, the display section causes the input image and the content to be displayed while arranging the input image and the content in the shorter side direction of the displaying unit.

This allows the display apparatus to adjust, based on the aspect ratio of the input image and the aspect ratio of the content, the display location so that display areas of the display apparatus and the content become larger.

In the display apparatus in accordance with an aspect 3 of the present invention, in a case where the aspect ratio of the input image changes, the adjusting section of the aspect 1 or 2 compares (i) a first display size of the input image whose display location was adjusted before the aspect ratio changes with (ii) a second display size of the input image whose display location is to be adjusted after the aspect ratio changes; and the adjusting section adjusts the display location of the input image after the aspect ratio changes, only in a case where an increase rate of the second display size relative to the first display size is equal to or greater than a predetermined threshold.

According to the configuration, the adjusting section adjusts the display location of the input image after the aspect ratio changes, only in a case where an increase rate of the second display size after the aspect ratio change relative to the first display size before the aspect ratio change is greater than a predetermined threshold.

This allows the display apparatus to reduce a burdensome case for the user where the display location is adjusted every time the aspect ratio of the input image changes, even though change in the display size of the input image, whose display location is adjusted after the aspect ratio changes, relative to the display size of the input image before the aspect ratio changes is small.

The display apparatus in accordance with an aspect 4 of the present invention can further include, in the aspects 1 through 3, a distance detecting section (distance detecting unit 133) for detecting a distance from the display apparatus to a user; and a character size detecting section (character recognizing unit 132) for detecting a size of a smallest character (smallest character size) which is smallest among characters included in the input image inputted from the external apparatus, the adjusting section adjusting the display size of the input image based on (i) a size of the smallest character included in the input image and (ii) the distance, and the adjusting section adjusting the display size of the content based on the display size of the input image thus adjusted.

According to the configuration, the adjusting section adjusts the display size of the input image based on both (1) the size of the character which is smallest among characters included in the input image and (2) the distance from the display apparatus to the user. Moreover, the adjusting section adjusts the display size of the content based on the display size of the display image which has been adjusted as above described.

This allows the display apparatus to display the input image (i) in a size suitable for the distance from the display apparatus to the user and (ii) at a suitable display location in the displaying unit based on the respective aspect ratios of the content and the input image.

The display apparatus in accordance with an aspect 5 of the present invention can further include, in the aspects 1 through 3, a distance detecting section for detecting a distance from the display apparatus to a user; and a character size detecting section for detecting a size of a smallest character which is smallest among characters included in the input image, the character size detecting section detecting a size of a smallest character among characters included in the content, the adjusting section adjusting the display size of the input image based on (i) a size of the smallest character included in the input image and (ii) the distance, and the adjusting section adjusting the display size of the content based on (i) a size of the smallest character included in the content and (ii) the distance.

According to the configuration, the adjusting section adjusts the display sizes of the input image and the content based on both (1) the size of the character which is smallest among characters included in the input image or the content and (2) the distance from the display apparatus to the user. This allows the display apparatus to display each of the input image and the content (i) in a size suitable for the distance from the display apparatus to the user and (ii) at a suitable display location in the displaying part based on the respective aspect ratios of the content and the input image.

The display apparatus in accordance with an aspect 6 of the present invention can further include, in the aspect 4 or 5, a user identifying section for identifying the user who uses the display apparatus, the adjusting section further adjusting the display size of the input image based on a standard character size which has been set in advance by the user identified by the user identifying section.

According to the configuration, the adjusting section further adjusts the display size of the input image based on (3) the standard character size. This allows the display apparatus to display the input image in the display size which has been adjusted so that a size of characters included in the input image further conforms to a user's preferable size, regardless of the distance from the display apparatus to the user.

The television receiver in accordance with an aspect 7 of the present invention includes the display apparatus of the aspects 1 through 6.

The display method in accordance with an aspect 8 of the present invention is a display method of a display apparatus, the display method includes the steps of: (a) displaying a content and an input image in respective different regions of a displaying unit, the input image being externally inputted; and (b) adjusting a display size of the content and a display size of the input image so that the content and the input image are displayed in the respective different regions of the displaying unit, in the step (b), (i) a location at which the content is displayed on the displaying unit and (ii) a location at which the input image is displayed on the displaying unit being adjusted based on an aspect ratio of the content and an aspect ratio of the input image.

According to the configuration, it is possible to bring about an effect similar to that of the display apparatus of the aspect 1.

The display apparatus in accordance with each of the aspects of the present invention can be realized by a computer. In such a case, the present invention encompasses (i) a program of the display apparatus which program causes the computer to serve as the sections for realizing the display apparatus and (ii) a computer-readable recording medium on which the program is recorded.

Note that the foregoing embodiments are disclosed as merely examples in terms of all points, and therefore should not be considered to limit the present invention. The scope of the present invention is intended to encompass not only the features described above but also all variations within the scope of the claims and equivalents of the claims.

<Invention Described in this Specification>

This specification includes the following inventions, in addition to the above described invention.

[Invention A]

According to the technique disclosed in Patent Literature 1, a size of an original image to be displayed on the displaying unit is constantly determined, regardless of a distance between the image processing device and the user. From this, there is a problem that, when the user gets away from the image processing device, the user cannot read characters included in the original image displayed on the displaying unit. Moreover, there is another problem that, when the user comes closer to the image processing device, characters included in the original image displayed on the displaying unit seem to be excessively large and thus become hard to read.

On the other hand, this specification includes the following inventions that can solve the above problems. A main object of those inventions is to provide a display apparatus that can display an image, which has been externally inputted, in a size in which the user can recognize characters included in the image, regardless of a distance from the user.

(Invention A1)

A display apparatus (television 10) including:

a display section (LCD controller 109) for causing a content (main image) to be displayed on a displaying unit;

a distance detecting section (distance detecting unit 133) for detecting a distance from the display apparatus to a user;

a character size detecting section (character recognizing unit 132) for detecting a size (smallest character size) of a smallest character which is smallest among characters included in an input image (sub-image) inputted from an external apparatus; and an adjusting section (display size calculating unit 135, video processing unit 107) for adjusting the display size of the input image based on (i) a size of the smallest character included in the input image and (ii) the distance, the display section causing the input image to be displayed, together with the content, on the displaying unit in a display size which has been adjusted by the adjusting section.

According to the configuration, the adjusting section adjusts the display size of the input image, which is to be displayed on the displaying unit, based on both (1) the size of the character which is smallest among characters included in the input image and (2) the distance from the display apparatus to the user. Moreover, the display section causes the input image, whose display size has been adjusted, to be displayed together with the content.

This allows the display apparatus to display characters included in the input image in a size suitable for the distance from the display apparatus to the user. Therefore, the display apparatus can display the input image in a size in which the user can recognize characters included in the input image, regardless of the distance from the display apparatus to the user.

(Invention A2)

The display apparatus described in the invention A1, further includes:

a user identifying section (user setting extracting unit 134) for identifying the user who uses the display apparatus, the adjusting section further adjusting the display size of the input image based on a standard character size which has been set in advance by the user identified by the user identifying section.

According to the configuration, the adjusting section further adjusts the display size of the input image based on (3) the standard character size which has been set in advance by the user.

This allows the display apparatus to display the input image in the display size which has been adjusted so that a size of characters included in the input image further conforms to a user's preferable size, regardless of the distance from the display apparatus to the user.

(Invention A3)

The display apparatus described in the invention A1 or A2, in which:

the adjusting section scales down the display size of the content based on the display size, which has been adjusted, of the input image; and the display section causes the content, which has been scaled down, to be displayed on the displaying unit and in a region different from a region in which the input image whose display size has been adjusted is displayed.

According to the configuration, the adjusting section scales down (adjusts) the display size of the content based on the display size of the input image. Moreover, the display section causes the input image and the content, whose display sizes have been adjusted by the adjusting section, to be displayed in respective different regions of the displaying unit.

This allows the display apparatus to prevent a case where the user cannot view a part of the content because the input image, which is displayed, overlaps with the content.

(Invention A4)

The display apparatus described in the invention A2, in which:

the character size detecting section detects a size of a smallest character which is smallest among characters included in the content;

the adjusting section adjusts the display size of the content based on (i) a size of the smallest character included in the content and (ii) the distance; and the display section causes the content and the input image to be displayed, in the respective display sizes which have been adjusted by the adjusting section, in respective different regions on the displaying unit.

According to the configuration, the adjusting section adjusts the display size of the content, as well as the display size of the input image. Moreover, the display section causes the input image and the content, whose display sizes have been adjusted by the adjusting section, to be displayed in respective different regions of the displaying unit.

This allows the display apparatus to display characters included in the content with a size suitable for the distance from the display apparatus to the user. Moreover, the display apparatus can prevent a case where the user cannot view a part of the content because the input image, which is displayed, overlaps with the content.

(Invention A5)

The display apparatus described in the invention A4, in which the adjusting section further adjusts the display size of the content based on the standard character size.

According to the configuration, the adjusting section adjusts the display size of the content further based on the standard character size which has been set in advance by the user.

This allows the display apparatus to display the content in the display size which has been adjusted so that a size of characters included in the content further conforms to a user's preferable size, regardless of the distance from the display apparatus to the user.

(Invention A6)

The display apparatus described in the invention A4 or A5, in which the adjusting section further adjusts at least any of the display sizes of the input image and the content, whose display sizes have been adjusted, based on respective priorities of the input image and the content.

According to the configuration, the adjusting section further adjusts at least any of the display sizes of the input image and the content, whose display sizes have been adjusted, based on respective priorities of the input image and the content.

From this, in a case where, for example, a gap is generated between the input image and the content whose display sizes have been adjusted and which are displayed on the displaying unit, the adjusting section can scale up the display size of one of the input image and the content which one has higher priority.

Moreover, in a case where the input image and the content, whose display sizes have been adjusted, are displayed on the displaying unit while partially overlapping with each other, the adjusting section can scale down the display size of one of the input image and the content which one has lower priority.

This allows the display apparatus to display the input image and the content in more appropriate display sizes, in accordance with respective priorities of the input image and the content.

(Invention A7)

A television receiver (television 10) which includes the display apparatus described in any one of the inventions A1 through A6.

(Invention A8)

A display method of a display apparatus which displays a content on a displaying unit, the method including the steps of:

detecting a distance from the display apparatus to a user;

detecting a size of a smallest character among characters included in an input image inputted from an external apparatus;

adjusting a display size of the input image based on the size of the smallest character included in the input image and on the distance; and displaying the input image on the displaying unit together with the content in a display size which has been adjusted in the adjusting step.

According to the configuration, it is possible to bring about an effect similar to that of the display apparatus in accordance with the invention A1.

(Invention A9)

A program for causing a computer to serve as the sections of the display apparatus described in any one of the inventions A1 through A6.

(Invention A10)

A computer-readable recording medium in which the program described in the invention A9 is recorded.

[Invention B]

In a television, in order to detect a size of characters included in an image with a conventional character detecting method, it is necessary to first detect a character region included in the image and detect all characters included in the character region, and then detect sizes of all the characters thus detected. As such, the conventional technique has a problem that a throughput of the television becomes large in a case where the sizes of characters included in the image are detected.

On the other hand, this specification includes the following inventions that can solve the problem. A main object of those inventions is to provide a display apparatus that can reduce a throughput relating to detection of character sizes.

(Invention B1)

A display apparatus (television 10) including:

a character region detecting section (character region detecting unit 141) for detecting, from an input image (sub-image) inputted from an external apparatus (portable terminal 30), a character region that includes a character; and a character size detecting section (smallest character region detecting unit 142, smallest character size detecting unit 143) for detecting a size of a smallest character among characters included in the input image, the character size detecting section (i) calculating lengths of widths (horizontal length and vertical length) of the character region in a row direction and in a column direction and (ii) detecting, as the size of the smallest character, a length of a shortest one of the widths thus calculated.

According to the configuration, the character size detecting section can detect a length of the shortest width among lengths of widths of each of character regions in the row direction and the column direction as the smallest character size in the input image, without detecting sizes of all characters included in the input image.

From this, the display apparatus does not need to carry out processes of large throughput, i.e., to detect all characters included in the input image and further detect sizes of the respective characters thus detected, in order to detect the smallest character size. Therefore, the display apparatus can reduce a throughput relating to detection of a character size (more specifically, smallest character size).

Moreover, the character size detecting section detects the smallest character size from the input image. Therefore, the display apparatus can detect the smallest character size from the input image, regardless of whether or not information indicating sizes of characters included in the input image is supplied from the external apparatus along with the input image.

(Invention B2)

The display apparatus described in the invention B1 further includes:

a judging section (controlling unit 118) for judging whether the input image is a moving image or a still image, in a case where the input image has been determined to be a still image by the judging section, the character region detecting section detecting the character region only once when the input image has been inputted.

From this, in a case where the sub-image is a still image, the character region detecting section can quit detecting a character region after carrying out detection of the character region once, and it is therefore possible to reduce power consumption relating to the detection of the character region.

(Invention B3)

The display apparatus described in the invention B1, in which the character region detecting section detects the character region and the character size detecting section detects the size of the smallest character alternately.

According to the configuration, the character region detecting section detects the character region and the character size detecting section detects the size of the smallest character alternately. This makes it possible to improve a speed of processes, as compared with a case where the processes are carried out simultaneously. Therefore, even in a case where the smallest character size in the input image has changed, the display apparatus can reduce a time required for detecting the smallest character size after the change.

(Invention B4)

The display apparatus described in any one of the inventions B1 through B3, in which the character region detecting section detects, out of character regions included in the input image, only a character region that is included in a specific range.

According to the configuration, it is possible to make a range in the input image smaller in which detection of the character region by the character region detecting section and detection of the smallest character size by the character size detecting section are carried out. This allows the display apparatus to further reduce a throughput relating to detection of characters.

(Invention B5)

A television receiver (television 10) which includes the display apparatus described in any one of the inventions B1 through B4.

(Invention B6)

A detecting method of the display apparatus, including the steps of:

detecting, from an input image inputted from an external apparatus, a character region that includes a character; and detecting, as a size of a smallest character among characters included in the input image, a length of a shortest width by calculating lengths of widths of the character region in a row direction and in a column direction.

According to the configuration, it is possible to bring about an effect similar to that of the display apparatus in accordance with the invention B1.

(Invention B7)

A program for causing a computer to serve as the sections of the display apparatus described in any one of the inventions B1 through B4.

(Invention B8)

A computer-readable recording medium in which the program described in the invention B7 is recorded.

[Invention C]

In a case where the technique disclosed in Patent Literature 1 is used in a configuration including a television and a portable terminal, there is a problem that a throughput of the television becomes larger because, in the television, it is necessary to carry out both (i) a process to detect characters from an inputted portable image and (ii) a process to calculate a display size of the portable image based on the detected characters. From this, there occurs a time lag from a time point at which the portable image is inputted from the portable terminal to the television to when the portable image is displayed on a display of the television.

On the other hand, this specification includes the following inventions that can solve the problem. A main object of those inventions is to provide a portable terminal that can reduce a throughput of an apparatus to which an image is to be outputted.

(Invention C1)

A portable terminal (portable terminal 30) including:

an outputting section (transmitting unit 305) for externally outputting a display image (sub-image) which is to be displayed on a displaying unit (displaying unit 303); and a detecting section (character recognizing unit 321) for detecting a size (smallest character size) of a smallest character included in the display image, the outputting section outputting, along with the display image, data that indicates the size of the smallest character.

According to the configuration, the portable terminal can output, along with the display image, data that indicates the size of the smallest character from the outputting section.

From this, even in a case where a destination apparatus (e.g., television 10) which accepts input of the display image from the portable terminal carries out a process with the use of the smallest character size, it is unnecessary to detect the smallest character from the display image and to detect a size of the smallest character.

Therefore, the portable terminal can reduce a throughput of an apparatus to which a display image is to be outputted.

Note that the display image which is displayed on the displaying unit of the portable terminal is an input image which is inputted to the display apparatus from outside (portable terminal).

(Invention C2)

The portable terminal described in the invention C1, further including:

a size ratio calculating section (character size ratio calculating unit 322) for calculating a character size ratio which is a ratio between a size of the smallest character and a size of the display image, the outputting section outputting size ratio data as the data that indicates the size of the smallest character, the size ratio data indicating the character size ratio.

According to the configuration, the portable terminal outputs the size ratio data from the outputting section along with the display image. This makes it possible to uniformly present the display image and the size of the smallest character to the destination apparatus, regardless of the size of the display image.

From this, even in a case where the destination apparatus carries out the process with the use of the character size ratio, the destination apparatus does not need to (i) detect a smallest character from the display image, (ii) detect a size of the smallest character, and (iii) calculate a character size ratio from the smallest character size and the display image.

Therefore, the portable terminal can further reduce a throughput of the apparatus to which the display image is outputted.

(Invention C3)

The portable terminal described in the invention C2, further including:

a judging section (size ratio change judging unit 323) for judging whether or not the character size ratio has changed, the outputting section further outputting, along with the display image, flag data (change flag) that indicates a judgment result of the judging section.

According to the configuration, the portable terminal can output the flag data from the outputting section, in addition to the display image and the size ratio data.

From this, the destination apparatus can easily judge, with reference to the flag data, whether or not the character size ratio in the display image has changed. Moreover, the destination apparatus can carry out, only in a case where the referred flag data indicates that the character size ratio has changed, a process that needs detection of a smallest character size with reference to the size ratio data indicating the character size ratio which has changed.

Therefore, the portable terminal can further reduce a throughput of the apparatus to which the display image is outputted.

(Invention C4)

The portable terminal described in the invention C3, in which:

a size ratio table (size ratio table 341) in which the character size ratio and the size ratio data are associated with each other is stored in a storage unit (storage unit 304); and the outputting section outputs, as the size ratio data, the size ratio data associated with the character size ratio calculated by the size ratio calculating section in the size ratio table.

(Invention C5)

The portable terminal described in the invention C4, in which:

in the storage unit, a flag table (change flag table 342) is stored in which the judgment result of the judging section and the flag data are associated with each other; and the outputting section outputs, as the flag data, the flag data associated with the judgment result of the judging section in the flag table.

According to the configuration, the portable terminal can use, as the size ratio data or the flag data, data which is associated in each of the tables. From this, the portable terminal does not need to carry out (i) a process to generate size ratio data from the character size ratio and (ii) a process to generate flag data based on the judgment result.

Therefore, the portable terminal can reduce processes necessary before outputting the size ratio data and the flag data from the outputting section. That is, the portable terminal can reduce a throughput relating to outputting of the display image, the size ratio data, and the flag data.

(Invention C6)

A display apparatus (television 10) which accepts input of the display image and data indicating a size of the smallest character from the portable terminal described in any one of the inventions C1 through C5, the display apparatus including a character size detecting section for detecting a size of the smallest character from the data.

According to the configuration, even in a case where the display apparatus carries out a process with the use of a size of a smallest character included in the display image inputted from the portable terminal, the display apparatus does not need to (i) detect a smallest character from the display image and (ii) detect a size of the smallest character.

As such, the display apparatus accepts, from the portable terminal, the display image and input of data indicating the size of the smallest character, and can thus improve a processing speed (i.e., reduce a processing time) relating to the process carried out with the use of the size of the smallest character.

(Invention C7)

An outputting method of a portable terminal including the steps of:

externally outputting a display image which is to be displayed on a displaying unit; and detecting a size of a smallest character included in the display image, in the outputting step, data that indicates the size of the smallest character being outputted along with the display image.

According to the configuration, it is possible to bring about an effect similar to that of the portable terminal described in the invention C1.

(Invention C8)

A program for causing a computer to serve as the sections of the portable terminal described in any one of the inventions C1 through C5 or as the sections of the display apparatus described in the invention C6.

(Invention C9)

A computer-readable recording medium in which the program described in the invention C8 is recorded.

INDUSTRIAL APPLICABILITY

The display apparatus of the present invention can be suitably applied to a television receiver, an electronic blackboard, a digital signage, a personal computer, and the like. Moreover, the external device of the present invention can be suitably applied to portable terminals such as a mobile phone, a smart phone, a tablet terminal, an electric book, a digital camera, and a digital video camera.

REFERENCE SIGNS LIST

10: Television (display apparatus, television receiver)
20: Remote controller
30: Portable terminal (external apparatus)
107: Video processing circuit (adjusting section)
109: LCD controller (display section)
110: LCD (displaying unit)
115: External input unit
117: RAM
118: Controlling unit
120: Camera
121: Wireless communication unit
131: Switching unit
132: Character recognizing unit (character size detecting section)
133: Distance detecting unit (distance detecting section)
134: User setting extracting unit (user identifying section)
135: Display size calculating unit (adjusting section)
141: Character region detecting unit
142: Smallest character region detecting unit
143: Smallest character size detecting unit
301: Controlling unit
303: Displaying unit
304: Storage unit
305: Transmitting unit
311: Reproduction controlling unit
312: Size ratio information generating unit
321: Character recognizing unit
322: Smallest character size ratio calculating unit
323: Size ratio change judging unit
341: Size ratio table
342: Change flag table

The invention claimed is:

1. A display apparatus comprising:
one or more processors that perform the steps of:
causing a content and an input image to be displayed in respective different regions of a displaying unit, independently without overlapping one another, the input image being inputted from an external apparatus; and
adjusting a display size of the content and a display size of the input image so that the content and the input image are displayed in the respective different regions of the displaying unit,
wherein in the adjusting step, the one or more processors further perform the step of;
further adjusting, based on an aspect ratio of the content and an aspect ratio of the input image, (i) a location at which the content is displayed on the displaying unit and (ii) a location at which the input image is displayed on the displaying unit.

2. The display apparatus as set forth in claim 1, wherein:
in a case where the aspect ratio of the input image is greater than the aspect ratio of the content, in the adjusting step, the one or more processors further perform the step of:
adjusting a display location so that the input image and the content are displayed while being arranged in a longer side direction of the displaying unit.

3. The display apparatus as set forth in claim 1, wherein:
in a case where the aspect ratio of the input image is smaller than the aspect ratio of the content, in the adjusting step, the one or more processors further perform the step of:
adjusting the display location so that the input image and the content are displayed while being arranged in a shorter side direction of the displaying unit.

4. The display apparatus as set forth in claim 1, wherein:
in a case where the aspect ratio of the input image changes, in the adjusting step, the one or more processors further perform the steps of:
comparing (i) a first display size of the input image whose display location was adjusted before the aspect ratio changes with (ii) a second display size of the input image whose display location is to be adjusted after the aspect ratio changes; and
adjusting the display location of the input image after the aspect ratio changes, only in a case where an increase rate of the second display size relative to the first display size is greater than a predetermined threshold.

5. The display apparatus as set forth in claim 1, wherein:
in a case where the aspect ratio of the input image changes, the one or more processors further perform the steps of:
comparing (i) a first display size of the input image whose display location was adjusted before the aspect ratio changes with (ii) a second display size of the input image whose display location is to be adjusted after the aspect ratio changes; and
adjusting the display location of the input image after the aspect ratio changes, in a case where an increase rate of the second display size relative to the first display size is greater than a predetermined threshold.

6. The display apparatus as set forth in claim 1, wherein the one or more processors further perform the steps of:
detecting a distance from said display apparatus to a user; and
detecting a size of a smallest character which is smallest among characters included in the input image,
wherein the one or more processors further perform the steps of:
adjusting the display size of the input image based on (i) a size of the smallest character included in the input image and (ii) the distance,
adjusting the display size of the content based on the display size of the input image thus adjusted, and
causing the input image to be displayed, in the display size which has been adjusted by the input image display size and content display size adjusting steps, on the displaying unit along with the content.

7. The display apparatus as set forth in claim 1, wherein the one or more processors further perform the steps of:
detecting a distance from said display apparatus to a user; and
detecting a size of a smallest character which is smallest among characters included in the input image,
wherein, in the adjusting step, the one or more processors further perform the steps of:

adjusting the display size of the input image based on (i) a size of the smallest character included in the input image and (ii) the distance, adjusting the display size of the content based on (i) a size of the smallest character included in the content and (ii) the distance, and causing the input image to be displayed, in the display size which has been adjusted by the input image display size and content display size adjusting steps, on the displaying unit along with the content.

8. The display apparatus as set forth in claim 6, wherein the one or more processors further perform the steps of:
identifying the user who uses said display apparatus,
wherein, in the adjusting step, the one or more processors further perform the step of:
further adjusting the display size of the input image based on a standard character size which has been set in advance by the identified user.

9. The display apparatus as set forth in claim 1, wherein the one or more processors further perform the steps of:
detecting, from the input image, a character region that includes a character;
detecting a size of a smallest character among characters included in the input image, the character size detecting section (i) calculating lengths of widths of the character region in a row direction and in a column direction and (ii) detecting, as the size of the smallest character, a length of a shortest one of the widths thus calculated; and
judging whether the input image is a moving image or a still image,
wherein the one or more processors further perform the steps of:
in a case where the input image has been determined to be a still image by the judging step, detecting the character region only once when the input image has been inputted,
in a case where the input image has been determined to be a moving image, detecting the character region and the character size detecting section detecting the size of the smallest character alternately, and
detecting, out of character regions included in the input image, only a character region that is included in a specific range.

10. The display apparatus as set forth in claim 1, wherein:
the external apparatus is a portable terminal; and
said display apparatus accepts, from the portable terminal, input of the input image and data that indicates a size of a smallest character included in the input image,
wherein the one or more processors further perform the step of:
detecting the size of the smallest character based on the data.

11. A television receiver comprising a display apparatus recited in claim 1.

12. A non-transitory computer-readable recording medium in which a program for causing a computer to serve as sections of a display apparatus recited in claim 1 is recorded.

13. The display apparatus as set forth in claim 1, wherein in the adjusting step, the one or more processors further perform the step of:
adjusting (i) the location at which the content is displayed on the displaying unit and (ii) the location at which the input image is displayed on the displaying unit based on a relation in size between the aspect ratio of the content and the aspect ratio of the input image.

14. The display apparatus as set forth in claim 1, wherein the one or more processors further perform the steps of:
detecting, from the input image, a character region that includes a character; and
detecting a size of a smallest character among characters included in the input image, and (i) calculating length of width of the character region in a row direction and in a column direction and (ii) detecting, as the size of the smallest character, a length of a shortest one of the width thus calculated.

15. The display apparatus as set forth in claim 14, wherein in the character detecting step, the one or more processors further perform the step of:
detecting, out of character regions included in the input image, only a character region that is included in a specific range.

16. A display apparatus comprising:
one or more processors that perform the steps of:
causing a content and an input image to be displayed in respective different regions of a displaying unit, independently without overlapping one another, the input image being inputted from an external apparatus; and
adjusting a display size of the content and a display size of the input image so that the content and the input image are displayed in the respective different regions of the displaying unit,
wherein, in the adjusting step, the one or more processors further perform the step of:
adjusting, based on data relating to a horizontal length and a vertical length of the content and data relating to a horizontal length and a vertical length of the input image, (i) a location at which the content is displayed on the displaying unit and (ii) a location at which the input image is displayed on the displaying unit.

17. A display apparatus comprising:
one or more processors that perform the steps of:
adjusting a display size of a content and a display size of an input image so as to cause the content and the input image to be displayed in respective different regions of a displaying unit, independently without overlapping one another, the input image being inputted from an external apparatus,
wherein, in the adjusting step, the one or more processors further perform the steps of:
in a case where the display section causes the input image and the content to be displayed so that the input image is vertically longer than the content, causing the input image and the content to be displayed while being arranged in a horizontal direction, and
in a case where the display section causes the input image and the content to be displayed so that the input image is horizontally longer than the content, causing the input image and the content to be displayed while being arranged in a vertical direction.

18. The display apparatus as set forth in claim 17, wherein:
in the adjusting step, the one or more processors further perform the step of:
further causing the content and the input image to be displayed on the displaying unit so that one end of the input image contacts with one end of the displaying unit, one end of the content contacts with another end, which faces the one end, of the displaying unit, and another end of the content contacts with or faces another end of the input image.

19. The display apparatus as set forth in claim 17, wherein:

in the adjusting step, the one or more processors further perform the step of:

causing the content and the input image to be displayed on the displaying unit so that one end of the input image contacts with one end of the displaying unit, one end of the content contacts with another end, which faces the one end, of the displaying unit, and a part including another end of the content overlaps with a part including another end of the input image.

20. A display method of a display apparatus, the display method comprising the steps of:

displaying a content whose display size has been adjusted and an input image whose display size has been adjusted so that the content and the input image are displayed in respective different regions of a displaying unit, independently without overlapping one another, the input image being inputted from an external apparatus, in the displaying step, in a case where the input image and the content are displayed so that the input image is vertically longer than the content, the input image and the content being displayed while being arranged in a horizontal direction, and in the displaying step, in a case where the input image and the content are displayed so that the input image is horizontally longer than the content, the input image and the content being displayed while being arranged in a vertical direction.

* * * * *